United States Patent

Shibayama

(10) Patent No.: US 10,678,034 B2
(45) Date of Patent: Jun. 9, 2020

(54) VARIABLE MAGNIFICATION OPTICAL SYSTEM, OPTICAL APPARATUS, AND METHOD FOR MANUFACTURING VARIABLE MAGNIFICATION OPTICAL SYSTEM

(71) Applicant: Nikon Corporation, Minato-ku, Tokyo (JP)

(72) Inventor: Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 280 days.

(21) Appl. No.: 15/545,705

(22) PCT Filed: Jan. 29, 2016

(86) PCT No.: PCT/JP2016/052762
§ 371 (c)(1),
(2) Date: Nov. 22, 2017

(87) PCT Pub. No.: WO2016/121966
PCT Pub. Date: Aug. 4, 2016

(65) Prior Publication Data
US 2018/0196241 A1 Jul. 12, 2018

(30) Foreign Application Priority Data

Jan. 30, 2015 (JP) ................................. 2015-017913
Jan. 30, 2015 (JP) ................................. 2015-017914
Jan. 30, 2015 (JP) ................................. 2015-017915

(51) Int. Cl.
*G02B 15/20* (2006.01)
*G02B 9/60* (2006.01)
(Continued)

(52) U.S. Cl.
CPC ............... *G02B 15/20* (2013.01); *G02B 9/60* (2013.01); *G02B 15/177* (2013.01);
(Continued)

(58) Field of Classification Search
CPC ...... G02B 15/20; G02B 9/60; G02B 27/0037; G02B 15/14
(Continued)

(56) References Cited

U.S. PATENT DOCUMENTS

2002/0015235 A1   2/2002 Hirose
2005/0036206 A1*  2/2005 Wada .................. G02B 15/177
                                                          359/676
(Continued)

FOREIGN PATENT DOCUMENTS

JP   H11-231220 A    8/1999
JP   2001-324677 A   11/2001
(Continued)

OTHER PUBLICATIONS

Partial Supplementary European Search Report dated Sep. 24, 2018, in European Patent Application No. 16743569.2.
(Continued)

*Primary Examiner* — James R Greece
(74) *Attorney, Agent, or Firm* — SGPatents PLLC

(57) ABSTRACT

A variable magnification optical system includes, in order from an object: a first lens group (G1) having a negative refractive power; a second lens group (G2); a third lens group (G3); a fourth lens group (G4) having a negative refractive power; and a fifth lens group (G5) having a positive refractive power, the system performing varying magnification by changing the distance between the first and second lens groups, the distance between the second and third lens groups, the distance between the third and fourth lens groups, and the distance between the fourth and fifth lens groups, and the fourth lens group including a 42nd lens group (G42) configured to be movable so as to have a (Continued)

component in a direction orthogonal to an optical axis and a 41st lens group (G41) disposed at an object-side of the 42nd lens group.

27 Claims, 39 Drawing Sheets

(51) Int. Cl.
    *G02B 15/177* (2006.01)
    *G02B 27/64* (2006.01)
    *G02B 27/00* (2006.01)
    *G02B 13/18* (2006.01)

(52) U.S. Cl.
    CPC ....... *G02B 27/0037* (2013.01); *G02B 27/646* (2013.01); *G02B 13/18* (2013.01)

(58) Field of Classification Search
    USPC .......................................... 359/676, 680–683
    See application file for complete search history.

(56) References Cited

U.S. PATENT DOCUMENTS

| | | |
|---|---|---|
| 2007/0229972 A1 | 10/2007 | Satori |
| 2009/0002842 A1 | 1/2009 | Souma |
| 2010/0194930 A1 | 8/2010 | Miyazaki et al. |
| 2010/0238560 A1 | 9/2010 | Fujimoto |
| 2012/0026589 A1* | 2/2012 | Tanaka ................... G02B 1/115 359/581 |
| 2014/0211082 A1 | 7/2014 | Imaoka |
| 2015/0253551 A1 | 9/2015 | Obama et al. |

FOREIGN PATENT DOCUMENTS

| | | |
|---|---|---|
| JP | 2009-008845 A | 1/2009 |
| JP | 2010-211102 A | 9/2010 |
| JP | 2010-217535 A | 9/2010 |
| JP | 5358229 B2 | 12/2013 |
| JP | 2014-160229 A | 9/2014 |
| WO | WO 2014/065264 A1 | 5/2014 |

OTHER PUBLICATIONS

International Search Report from International Patent Application No. PCT/JP2016/052762, dated Apr. 26, 2016.
Written Opinion of the International Searching Authority from International Patent Application No. PCT/JP2016/052762, dated Apr. 26, 2016.
Office Action dated Jun. 25, 2019, in Japanese Patent Application No. 2018-221926.
Office Action dated Jul. 31, 2018 in Japanese Patent Application No. 2016-572206.
Office Action dated May 5, 2019, in Chinese Patent Application No. 201680015607.4.
Extended European Search Report dated Jan. 24, 2019, in European Patent Application No. 16743569.2.
Decision of Refusal dated Jan. 28, 2020, in Japanese Patent Application No. 2018-221926.
Office Action dated Mar. 5, 2020, in Indian Patent Application No. 201717030443.

* cited by examiner

FIG. 4
(a)
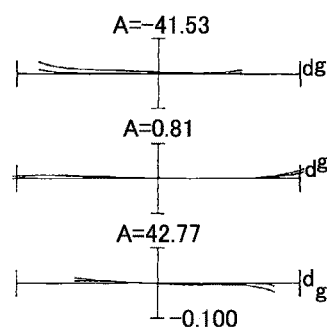
LATERAL ABERRATION
(b)
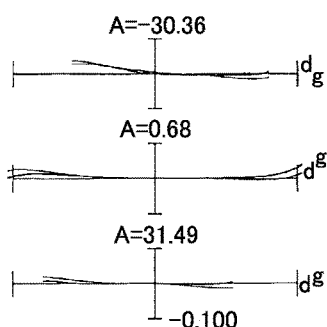
LATERAL ABERRATION
(c)
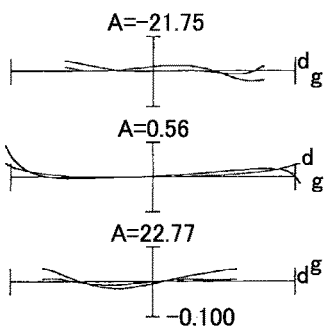
LATERAL ABERRATION FIG. 8
(a) 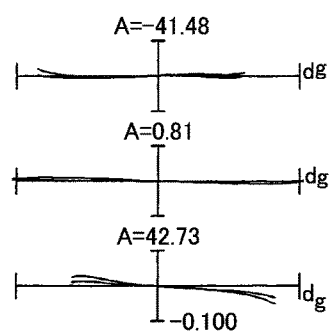
LATERAL ABERRATION
(b) 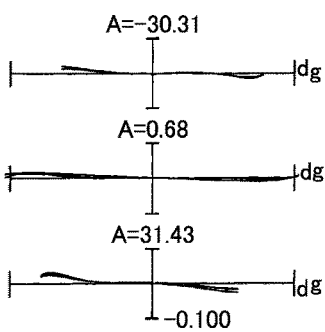
LATERAL ABERRATION
(c) 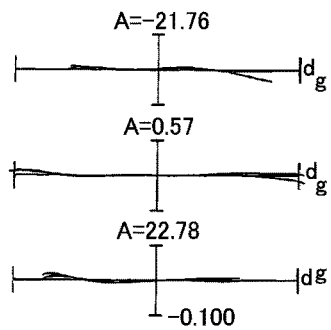
LATERAL ABERRATION

FIG. 12
(a)
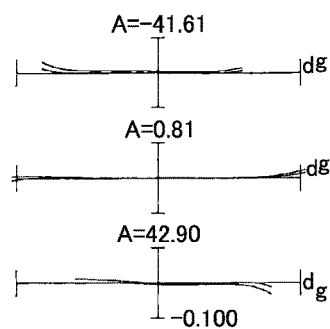
LATERAL ABERRATION
(b)
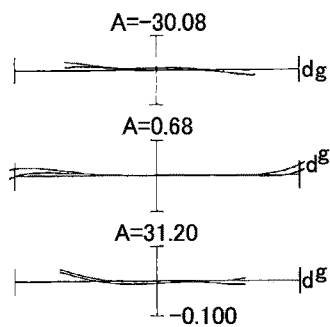
LATERAL ABERRATION
(c)
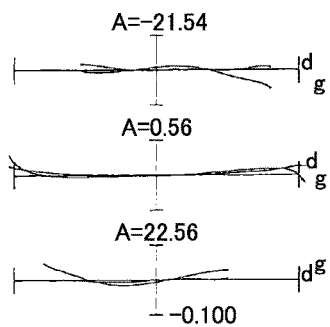
LATERAL ABERRATION

FIG. 16
(a)
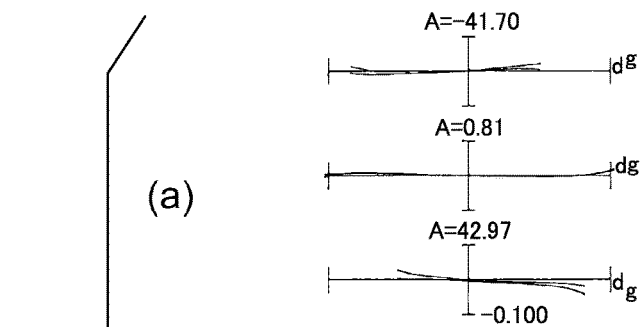
LATERAL ABERRATION
(b)
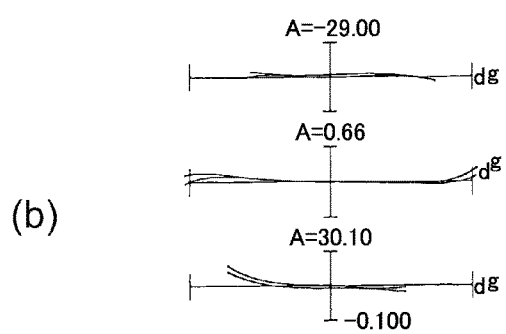
LATERAL ABERRATION
(c)
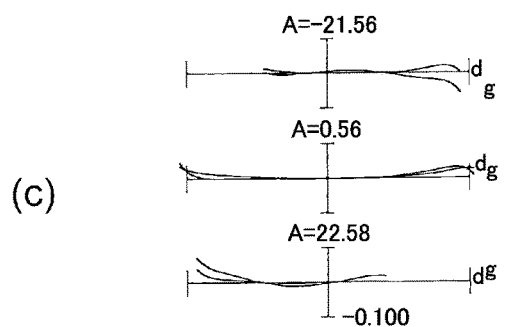
LATERAL ABERRATION

FIG. 20
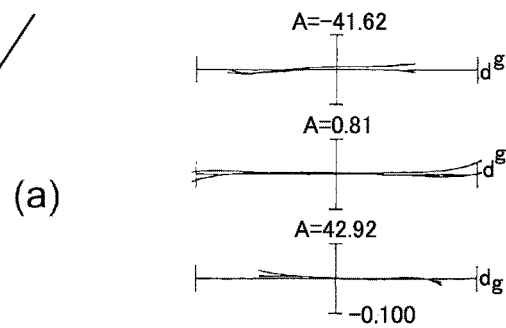
(a)
LATERAL ABERRATION
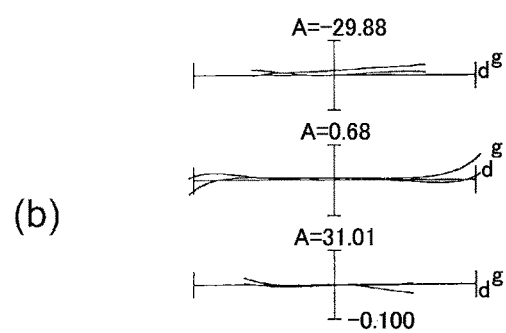
(b)
LATERAL ABERRATION
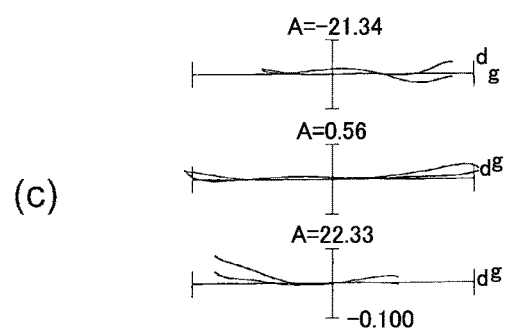
(c)
LATERAL ABERRATION FIG. 24
(a) 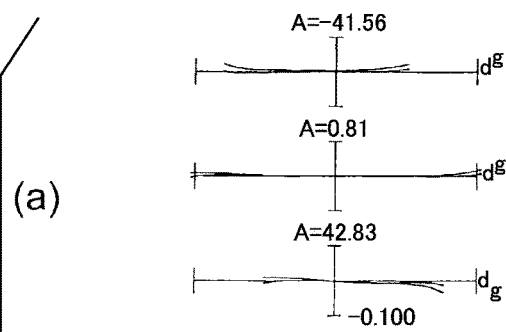
LATERAL ABERRATION
(b) 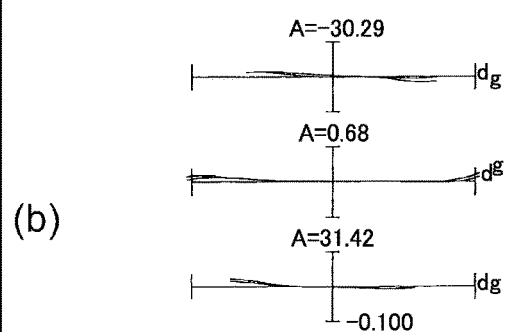
LATERAL ABERRATION
(c) 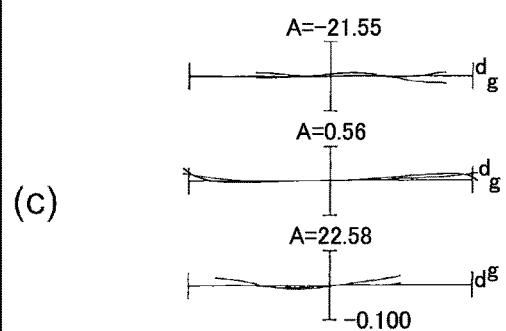
LATERAL ABERRATION

FIG. 28
(a)
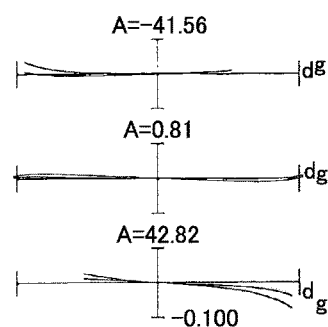
LATERAL ABERRATION
(b)
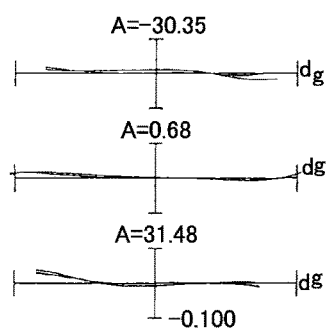
LATERAL ABERRATION
(c)
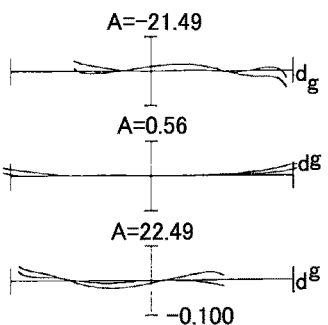
LATERAL ABERRATION

FIG. 32
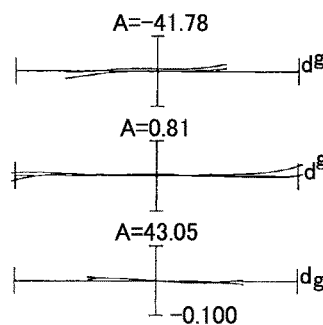
(a)
LATERAL ABERRATION
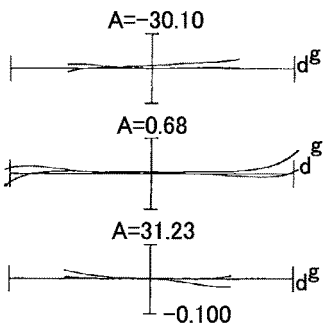
(b)
LATERAL ABERRATION
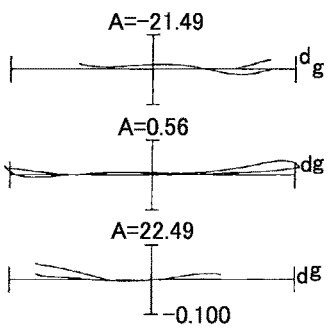
(c)
LATERAL ABERRATION

VARIABLE MAGNIFICATION OPTICAL SYSTEM, OPTICAL APPARATUS, AND METHOD FOR MANUFACTURING VARIABLE MAGNIFICATION OPTICAL SYSTEM

TECHNICAL FIELD

The present invention relates to a variable magnification optical system, an optical apparatus, and a method for manufacturing the variable magnification optical system.

TECHNICAL BACKGROUND

Conventionally, a variable magnification optical system having a wide angle of view including a camera shake compensation mechanism has been proposed (for example, see Patent Documents 1 and 2).

RELATED ART DOCUMENTS

Patent Document

Patent Document 1:
 Japanese Patent Application, Publication No. 2014-160229
Patent Document 2:
 Japanese Patent Application, Publication No. H11-231220

SUMMARY OF INVENTION

Technical Problem

In recent years, there has been an increasing demand for a variable magnification optical system which has a satisfactory optical performance and a wide angle of view or a small F-value.

Solution to Problem

According to an aspect of the present invention, there is provided a variable magnification optical system including, in order from an object: a first lens group having a negative refractive power; a second lens group; a third lens group; a fourth lens group having a negative refractive power; and a fifth lens group having a positive refractive power, wherein the system performs varying magnification by changing the distance between the first lens group and the second lens group, the distance between the second lens group and the third lens group, the distance between the third lens group and the fourth lens group, and the distance between the fourth lens group and the fifth lens group, and the fourth lens group includes a 42nd lens group configured to be movable so as to have a component in a direction orthogonal to an optical axis and a 41st lens group disposed at an object-side of the 42nd lens group.

According to another aspect of the present invention, there is provided a variable magnification optical system including, in order from an object: a first lens group having a negative refractive power; a second lens group having a positive refractive power; a third lens group having a positive refractive power; a fourth lens group having a negative refractive power; and a fifth lens group having a positive refractive power, the system performing varying magnification by changing the distances between the respective lens groups, the fourth lens group including a 42nd lens group configured to be movable so as to have a component in a direction orthogonal to an optical axis and a 41st lens group which is disposed at an object-side of the 42nd lens group and of which the position in the direction orthogonal to the optical axis during image blur correction is immovable.

According to another aspect of the present invention, there is provided an optical apparatus having the above-described variable magnification optical system mounted thereon.

According to another aspect of the present invention, there is provided a method for manufacturing a variable magnification optical system, wherein the variable magnification optical system includes, in order from an object: a first lens group having a negative refractive power; a second lens group; a third lens group; a fourth lens group having a negative refractive power; and a fifth lens group having a positive refractive power, the system performing varying magnification by changing the distance between the first lens group and the second lens group, the distance between the second lens group and the third lens group, the distance between the third lens group and the fourth lens group, and the distance between the fourth lens group and the fifth lens group, and wherein the method includes: arranging the respective lenses in a lens barrel such that the fourth lens group includes a 42nd lens group configured to be movable so as to have a component in a direction orthogonal to an optical axis and a 41st lens group disposed at an object-side of the 42nd lens group.

According to another aspect of the present invention, there is provided a method for manufacturing a variable magnification optical system, wherein the variable magnification optical system includes, in order from an object: a first lens group having a negative refractive power; a second lens group having a positive refractive power; a third lens group having a positive refractive power; a fourth lens group having a negative refractive power; and a fifth lens group having a positive refractive power, the system performing varying magnification by changing the distances between the respective lens groups, and wherein the method includes: arranging the respective lenses in a lens barrel such that the fourth lens group includes a 42nd lens group configured to be movable so as to have a component in a direction orthogonal to an optical axis and a 41st lens group which is disposed at an object-side of the 42nd lens group and of which the position in the direction orthogonal to the optical axis during image blur correction is immovable.

According to another aspect of the present invention, there is provided a variable magnification optical system including, in order from an object: a first lens group having a negative refractive power; a second lens group having a positive refractive power; a third lens group; a fourth lens group; and a fifth lens group having a positive refractive power, wherein the system performs varying magnification by changing the distance between the first lens group and the second lens group, the distance between the second lens group and the third lens group, the distance between the third lens group and the fourth lens group, and the distance between the fourth lens group and the fifth lens group, at least a portion of the fourth lens group is configured to be movable so as to have a component in a direction orthogonal to an optical axis, and the system satisfies the following conditional expressions.

$$-0.400 < (D34T - D34W)/(D23T - D23W) < 1.000$$

$$-0.400 < f4/f3 < 0.450$$

where

D34T: an air distance between the third and fourth lens groups in a telephoto end state D34W: an air distance between the third and fourth lens groups in a wide-angle end state D23T: an air distance between the second and third lens groups in a telephoto end state D23W: an air distance between the second and third lens groups in a wide-angle end state f4: a focal length of the fourth lens group f3: a focal length of the third lens group According to another aspect of the present invention, there is provided a variable magnification optical system including, in order from an object: a first lens group having a negative refractive power; a second lens group having a positive refractive power; a third lens group; a fourth lens group having a negative refractive power; and a fifth lens group having a positive refractive power, the system performing varying magnification by changing the distances between the respective lens groups, wherein at least a portion of the fourth lens group is configured to be movable so as to have a component in a direction orthogonal to an optical axis, and the system satisfies the following conditional expressions.

$$-0.400 < (D34T - D34W)/(D23T - D23W) < 1.000$$

$$-0.400 < f4/f3 < 0.450$$

where

D34T: an air distance between the third and fourth lens groups in a telephoto end state D34W: an air distance between the third and fourth lens groups in a wide-angle end state D23T: an air distance between the second and third lens groups in a telephoto end state D23W: an air distance between the second and third lens groups in a wide-angle end state f4: a focal length of the fourth lens group f3: a focal length of the third lens group According to another aspect of the present invention, there is provided an optical apparatus having the above-described variable magnification optical system mounted thereon.

According to another aspect of the present invention, there is provided a method for manufacturing a variable magnification optical system, wherein the variable magnification optical system includes, in order from an object: a first lens group having a negative refractive power; a second lens group having a positive refractive power; a third lens group; a fourth lens group; and a fifth lens group having a positive refractive power, the system performing varying magnification by changing the distance between the first lens group and the second lens group, the distance between the second lens group and the third lens group, the distance between the third lens group and the fourth lens group, and the distance between the fourth lens group and the fifth lens group, wherein at least a portion of the fourth lens group is configured to be movable so as to have a component in a direction orthogonal to an optical axis, and wherein the method includes: arranging the respective lenses in a lens barrel so as to satisfy the following conditional expressions.

$$-0.400 < (D34T - D34W)/(D23T - D23W) < 1.000$$

$$-0.400 < f4/f3 < 0.450$$

where

D34T: an air distance between the third and fourth lens groups in a telephoto end state D34W: an air distance between the third and fourth lens groups in a wide-angle end state D23T: an air distance between the second and third lens groups in a telephoto end state D23W: an air distance between the second and third lens groups in a wide-angle end state f4: a focal length of the fourth lens group f3: a focal length of the third lens group According to another aspect of the present invention, there is provided a method for manufacturing a variable magnification optical system, wherein the variable magnification optical system includes, in order from an object: a first lens group having a negative refractive power; a second lens group having a positive refractive power; a third lens group; a fourth lens group having a negative refractive power; and a fifth lens group having a positive refractive power, the system performing varying magnification by changing the distances between the respective lens groups, wherein at least a portion of the fourth lens group is configured to be movable so as to have a component in a direction orthogonal to an optical axis, and wherein the method includes: arranging the respective lenses in a lens barrel so as to satisfy the following conditional expressions.

$$-0.400 < (D34T - D34W)/(D23T - D23W) < 1.000$$

$$-0.400 < f4/f3 < 0.450$$

where

D34T: an air distance between the third and fourth lens groups in a telephoto end state D34W: an air distance between the third and fourth lens groups in a wide-angle end state D23T: an air distance between the second and third lens groups in a telephoto end state D23W: an air distance between the second and third lens groups in a wide-angle end state f4: a focal length of the fourth lens group f3: a focal length of the third lens group According to another aspect of the present invention, there is provided a variable magnification optical system including, in order from an object: a first lens group having a negative refractive power; a second lens group having a positive refractive power; a third lens group having a positive refractive power; a fourth lens group; a fifth lens group having a negative refractive power; and a sixth lens group having a positive refractive power, wherein the system performs varying magnification by changing the distance between the first lens group and the second lens group, the distance between the second lens group and the third lens group, the distance between the third lens group and the fourth lens group, the distance between the fourth lens group and the fifth lens group, and the distance between the fifth lens group and the sixth lens group, and at least a portion of any one lens group among the first to sixth lens groups is configured to be movable so as to have a component in a direction orthogonal to an optical axis.

According to another aspect of the present invention, there is provided a variable magnification optical system including, in order from an object: a first lens group having a negative refractive power; a second lens group having a positive refractive power; a third lens group having a positive refractive power; a fourth lens group; a fifth lens group having a negative refractive power; and a sixth lens group having a positive refractive power, the system performing varying magnification by changing the distances between the respective lens groups, wherein at least a portion of any one lens group among the first to sixth lens groups is configured to be movable so as to have a component in a direction orthogonal to an optical axis.

According to another aspect of the present invention, there is provided an optical apparatus having the above-described variable magnification optical system mounted thereon.

According to another aspect of the present invention, there is provided a method for manufacturing a variable magnification optical system, wherein the variable magnification optical system includes, in order from an object: a first lens group having a negative refractive power; a second lens group having a positive refractive power; a third lens group having a positive refractive power; a fourth lens group; a fifth lens group having a negative refractive power; and a sixth lens group having a positive refractive power, the system performing varying magnification by changing the distance between the first lens group and the second lens group, the distance between the second lens group and the third lens group, the distance between the third lens group and the fourth lens group, the distance between the fourth lens group and the fifth lens group, and the distance between the fifth lens group and the sixth lens group, and wherein the method includes: arranging the respective lenses in a lens barrel such that at least a portion of any one lens group among the first to sixth lens groups is configured to be movable so as to have a component in a direction orthogonal to an optical axis.

According to another aspect of the present invention, there is provided a method for manufacturing a variable magnification optical system, wherein the variable magnification optical system includes, in order from an object: a first lens group having a negative refractive power; a second lens group having a positive refractive power; a third lens group having a positive refractive power; a fourth lens group; a fifth lens group having a negative refractive power; and a sixth lens group having a positive refractive power, the system performing varying magnification by changing the distances between the respective lens groups, and wherein arranging the respective lenses in a lens barrel such that at least a portion of any one lens group among the first to sixth lens groups is configured to be movable so as to have a component in a direction orthogonal to an optical axis.

BRIEF DESCRIPTION OF THE DRAWINGS

FIG. 4 shows graphs illustrating lateral aberrations of the variable magnification optical system according to Example 1 after image blur correction was performed upon focusing on an object at infinity, wherein parts (a), (b), and (c) are in the wide-angle end state, the intermediate focal length state, and the telephoto end state, respectively.

FIG. 8 shows graphs illustrating lateral aberrations of the variable magnification optical system according to Example 2 after image blur correction was performed upon focusing on an object at infinity, wherein parts (a), (b), and (c) are in the wide-angle end state, the intermediate focal length state, and the telephoto end state, respectively.

FIG. 12 shows graphs illustrating lateral aberrations of the variable magnification optical system according to Example 3 after image blur correction was performed upon focusing on an object at infinity, wherein parts (a), (b), and (c) are in the wide-angle end state, the intermediate focal length state, and the telephoto end state, respectively.

FIG. 16 shows graphs illustrating lateral aberrations of the variable magnification optical system according to Example 4 after image blur correction was performed upon focusing on an object at infinity, wherein parts (a), (b), and (c) are in the wide-angle end state, the intermediate focal length state, and the telephoto end state, respectively.

FIG. 20 shows graphs illustrating lateral aberrations of the variable magnification optical system according to Example 5 after image blur correction was performed upon focusing on an object at infinity, wherein parts (a), (b), and (c) are in the wide-angle end state, the intermediate focal length state, and the telephoto end state, respectively.

FIG. 24 shows graphs illustrating lateral aberrations of the variable magnification optical system according to Example 6 after image blur correction was performed upon focusing on an object at infinity, wherein parts (a), (b), and (c) are in the wide-angle end state, the intermediate focal length state, and the telephoto end state, respectively.

FIG. 28 shows graphs illustrating lateral aberrations of the variable magnification optical system according to Example 7 after image blur correction was performed upon focusing on an object at infinity, wherein parts (a), (b), and (c) are in the wide-angle end state, the intermediate focal length state, and the telephoto end state, respectively.

FIG. 32 shows graphs illustrating lateral aberrations of the variable magnification optical system according to Example 8 after image blur correction was performed upon focusing on an object at infinity, wherein parts (a), (b), and (c) are in the wide-angle end state, the intermediate focal length state, and the telephoto end state, respectively.

DESCRIPTION OF EMBODIMENTS

Figure 1:
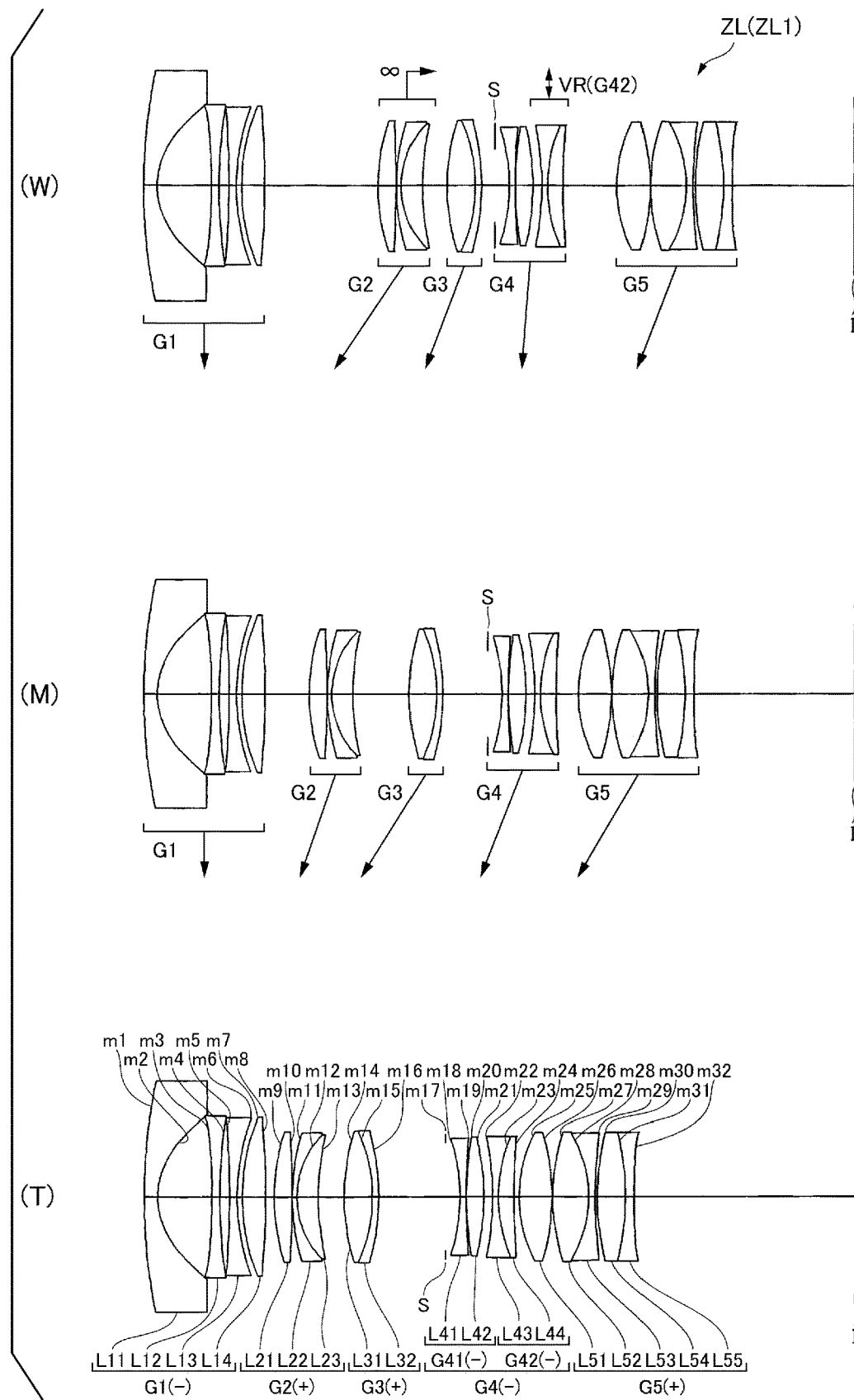
FIG. 1 is a cross-sectional view of a variable magnification optical system according to Example 1, wherein parts (W), (M), and (T) are in a wide-angle end state, an intermediate focal length state, and a telephoto end state, respectively.

An embodiment will now be described with reference to the drawings. FIG. 1 illustrates an example of a configuration of a variable magnification optical system (variable power optical system) ZL. In other examples, the number of lens groups, a lens configuration of each lens group, and the like can be changed appropriately.

In an embodiment, a variable magnification optical system ZL includes, in order from an object, a first lens group G1 having a negative refractive power; a second lens group G2; a third lens group G3; a fourth lens group G4 having a negative refractive power; and a fifth lens group G5 having a positive refractive power, the system performing varying magnification (varying power) by changing the distance between the first and second lens groups G1 and G2, the distance between the second and third lens groups G2 and G3, the distance between the third and fourth lens groups G3 and G4, and the distance between the fourth and fifth lens groups G4 and G5, wherein the fourth lens group G4 includes a 42nd lens group G42 configured to be movable so as to have a component in the direction orthogonal to the optical axis and a 41st lens group G41 disposed at an object-side of the 42nd lens group G42. In an example, at least one of the second lens group G2 and the third lens group G3 has a positive refractive power.

Alternatively, a variable magnification optical system ZL includes, in order from an object, a first lens group G1 having a negative refractive power, a second lens group G2 having a positive refractive power, a third lens group G3 having a positive refractive power, a fourth lens group G4 having a negative refractive power, and a fifth lens group G5 having a positive refractive power, the system performing varying magnification by changing the distances between the respective lens groups, wherein the fourth lens group G4 includes a 42nd lens group G42 configured to be movable so as to have a component in the direction orthogonal to the optical axis in order to correct image blur as a vibration-reduction lens group VR and a 41st lens group G41 which is disposed at an object-side of the 42nd lens group G42 and of which the position in the direction orthogonal to the optical axis during image blur correction is immovable.

As described above, the variable magnification optical system has lens groups having negative, positive, positive, negative, and positive refractive powers and changes the distances between the respective lens groups. Therefore, it is possible to implement a variable magnification optical system having a wide angle of view. Moreover, the fourth lens group G4 is configured to have, in order from the object, the 41st lens group G41 and the 42nd lens group G42, and the 42nd lens group G42 is moved so as to have a component in the direction orthogonal to the optical axis to perform image blur correction. Therefore, it is possible to suppress the occurrence of eccentric coma aberration and one-sided blur during image blur correction and to obtain satisfactory imaging performance.

The 41st lens group G41 may have a positive refractive power or a negative refractive power.

The fourth lens group G4 may have one or more lenses (which are immovable during image blur correction) at an image-side of the 42nd lens group G42.

In the variable magnification optical system ZL, it is preferable that the 42nd lens group G42 have a negative refractive power.

When the 42nd lens group G42 has a negative refractive power, it is possible to correct tilting (one-sided blur) of the image plane and the occurrence of eccentric aberration (particularly eccentric coma aberration) satisfactorily when the 42nd lens group G42 is moved so as to have the component in the direction orthogonal to the optical axis in order to correct image blur.

Preferably, the variable magnification optical system ZL satisfies Conditional Expression (1) below.

$$0.700 < f42/f4 < 1.700 \quad (1)$$

where
f42: a focal length of the 42nd lens group G42
f4: a focal length of the fourth lens group G4

Conditional Expression (1) is a conditional expression for defining the focal length of the 42nd lens group G42 which is a vibration-reduction lens group VR with respect to the focal length of the fourth lens group G4. When Conditional Expression (1) is satisfied, it is possible to control a moving distance of the 42nd lens group G42 moved during image blur correction appropriately while obtaining satisfactory imaging performance during image blur correction.

When the focal length ratio exceeds the upper limit value of Conditional Expression (1), the focal length of the 42nd lens group G42 is increased and the moving distance of the 42nd lens group G42 during image blur correction becomes too large. Due to this, the size of an image blur correction mechanism may increase.

In order to obtain the effect reliably, it is preferable that the upper limit value of Conditional Expression (1) be set to 1.600. In order to obtain the effect more reliably, it is preferable that the upper limit value of Conditional Expression (1) be set to 1.500.

When the focal length ratio is smaller than the lower limit value of Conditional Expression (1), the focal length of the 42nd lens group G42 is decreased, the occurrence of one-sided blur or eccentric coma aberration occurring during image blur correction increases, and it is difficult to maintain satisfactory imaging performance during image blur correction.

In order to obtain the effect reliably, it is preferable that the lower limit value of Conditional Expression (1) be set to 0.800. In order to obtain the effect more reliably, it is preferable that the lower limit value of Conditional Expression (1) be set to 0.900.

Preferably, the variable magnification optical system ZL satisfies Conditional Expression (2) below.

$$-0.400 < f4/f41 < 0.500 \quad (2)$$

where
f4: a focal length of the fourth lens group G4
f41: a focal length of the 41st lens group G41

Conditional Expression (2) is a conditional expression for defining the focal length of the 41st lens group G41 with respect to the focal length of the fourth lens group G4. When Conditional Expression (2) is satisfied, it is possible to control a moving distance of the 42nd lens group G42 moved during image blur correction appropriately while obtaining satisfactory imaging performance during image blur correction.

When the focal length ratio exceeds the upper limit value of Conditional Expression (2), the negative refractive power of the 41st lens group G42 is increased and the refractive power of the 42nd lens group G42 is weakened relatively. As a result, the moving distance of the 42nd lens group G42 during image blur correction becomes too large and the size of the image blur correction mechanism increases.

In order to obtain the effect reliably, it is preferable that the upper limit value of Conditional Expression (2) be set to 0.400. In order to obtain the effect more reliably, it is preferable that the upper limit value of Conditional Expression (2) be set to 0.300.

When the focal length ratio is smaller than the lower limit value of Conditional Expression (2), the positive refractive power of the 41st lens group G41 is increased and the negative refractive power of the 42nd lens group G42 is strengthened relatively. As a result, the occurrence of one-sided blur or eccentric coma aberration occurring during image blur correction increases and it is not possible to maintain satisfactory imaging performance during image blur correction.

In order to obtain the effect reliably, it is preferable that the lower limit value of Conditional Expression (2) be set to −0.300. In order to obtain the effect more reliably, it is preferable that the lower limit value of Conditional Expression (2) be set to −0.200.

Preferably, the variable magnification optical system ZL satisfies Conditional Expression (3) below.

$$0.200 < f1/f4 < 0.900 \quad (3)$$

where
f1: a focal length of the first lens group G1
f4: a focal length of the fourth lens group G4

Conditional Expression (3) is a conditional expression for satisfactorily correcting curvature of field and coma aberration while obtaining a wide angle of view (a half-angle of view of approximately 50° or more) in the wide-angle end state.

If the focal length ratio exceeds the upper limit value of Conditional Expression (3), the focal length of the first lens group G1 is increased and it is difficult to obtain a wide angle of view (a half-angle of view of approximately 50° or more) in the wide-angle end state. In some cases, a total length and a lens diameter of the first lens group G1 are increased undesirably.

In order to obtain the effect reliably, it is preferable that the upper limit value of Conditional Expression (3) be set to 0.750. In order to obtain the effect more reliably, it is preferable that the upper limit value of Conditional Expression (3) be set to 0.600.

If the focal length ratio is smaller than the lower limit value of Conditional Expression (3), the focal length of the first lens group G1 is decreased and it is difficult to correct curvature of field and coma aberration and to obtain satisfactory imaging performance.

In order to obtain the effect reliably, it is preferable that the lower limit value of Conditional Expression (3) be set to 0.300. In order to obtain the effect more reliably, it is preferable that the lower limit value of Conditional Expression (3) be set to 0.350.

In the variable magnification optical system ZL, it is preferable that the 41st lens group G41 have a negative lens and a positive lens.

According to this configuration, it is possible to correct one-sided blur and eccentric coma aberration when the 42nd lens group G42 is moved to perform image blur correction and to secure imaging performance upon varying magnification (particularly, it is possible to suppress fluctuation of spherical aberration, coma aberration, and astigmatism).

In the variable magnification optical system ZL, it is preferable that the 42nd lens group G42 be constituted by a cemented lens including a positive lens and a negative lens.

According to this configuration, it is possible to effectively correct eccentric coma aberration and one-sided blur when the 42nd lens group G42 is moved to perform image blur correction. Moreover, it is possible to decrease the size and the weight of a lens that moves for image blur correction and to effectively decrease the size of an image blur correction mechanism and the entire lens system.

The 42nd lens group G42 may include two lenses (separated from a bonding surface) instead of bonding a positive lens and a negative lens as described above.

In the variable magnification optical system ZL, it is preferable that the lens surface closest to an image, of the 42nd lens group G42 be an aspherical surface.

According to this configuration, it is possible to effectively correct eccentric coma aberration and one-sided blur when the 42nd lens group G42 is moved to perform image blur correction.

Preferably, the variable magnification optical system ZL satisfies Conditional Expression (4) below.

$$1.100 < A(T3.5)/A(T4.0) < 5.000 \quad (4)$$

where
A(T3.5): an asphericity at a point on the aspherical surface where light corresponding to F-value of 3.5 passes through the aspherical surface in a telephoto end state
A(T4.0): an asphericity at a point on the aspherical surface where light corresponding to F-value of 4.0 passes through the aspherical surface in a telephoto end state The asphericity refers to an amount of sag, with respect to an approximately spherical surface, in the aspherical surface along the optical axis.

Conditional Expression (4) is a Conditional Expression for defining an appropriate value of the asphericity of the aspherical surface closest to an image, of the 42nd lens group G42. When Conditional Expression (4) is satisfied, it is possible to satisfactorily correct one-sided blur and eccentric coma aberration when the 42nd lens group G42 is moved to perform image blur correction.

When the asphericity ratio exceeds the upper limit value of Conditional Expression (4), the asphericity of the 42nd lens group G42 becomes too large and it is difficult to correct one-sided blur and eccentric coma aberration when the 42nd lens group G42 is moved to perform image blur correction.

In order to obtain the effect reliably, it is preferable that the upper limit value of Conditional Expression (4) be set to 4.000. In order to obtain the effect more reliably, it is preferable that the upper limit value of Conditional Expression (4) be set to 3.000.

When the asphericity ratio is smaller than the lower limit value of Conditional Expression (4), the asphericity of the 42nd lens group G42 is insufficient and it is difficult to correct one-sided blur and eccentric coma aberration when the 42nd lens group G42 is moved to perform image blur correction.

In order to obtain the effect reliably, it is preferable that the lower limit value of Conditional Expression (4) be set to 1.250. In order to obtain the effect more reliably, it is preferable that the lower limit value of Conditional Expression (4) be set to 1.400.

In the variable magnification optical system ZL, it is preferable that the first lens group G1 be immovable in relation to the image plane upon varying magnification, for example.

According to this configuration, it is possible to effectively simplify a varying magnification mechanism and to increase the durability of a lens barrel.

In the variable magnification optical system ZL, it is preferable that focusing be performed by moving the second lens group G2 in the optical axis direction as a focusing lens group.

According to this configuration, it is possible to decrease the size and the weight of a focusing lens group and to decrease the size of an entire lens system and to increase a focusing speed during autofocus.

In this way, it is possible to implement the variable magnification optical system ZL which has a wide angle of view and in which various aberrations are corrected satisfactorily.

Figure 33:
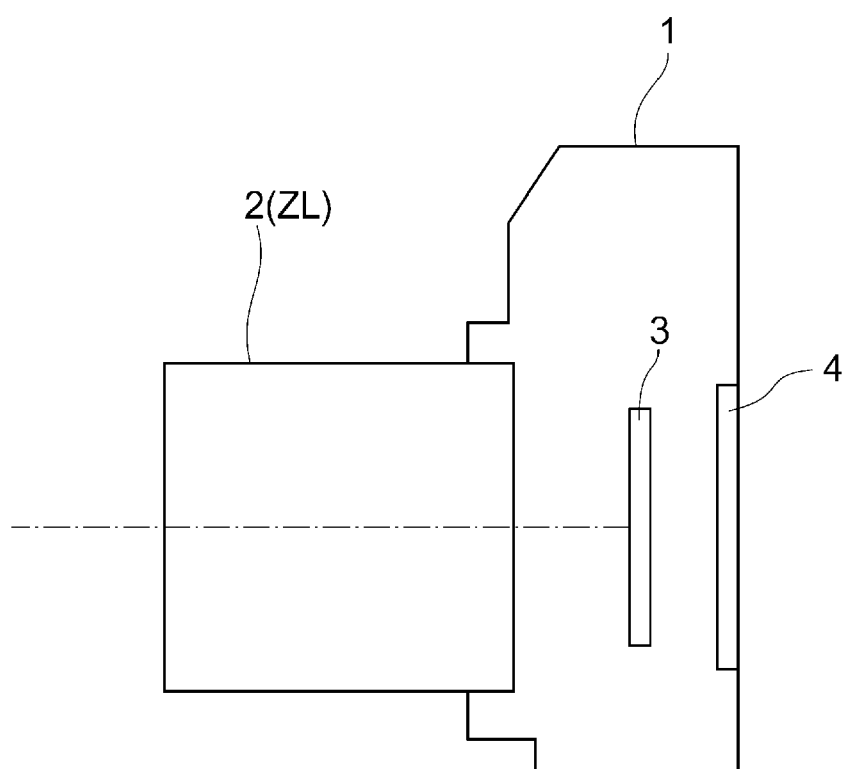
FIG. 33 is a diagram illustrating an example of a configuration of a camera having a variable magnification optical system mounted thereon.

Next, a camera (an optical apparatus) having the above-described variable magnification optical system ZL will be described with reference to the drawings. FIG. 33 illustrates an example of a configuration of a camera having a variable magnification optical system mounted thereon.

As illustrated in FIG. 33, a camera 1 is an interchangeable lens camera (a so-called mirrorless camera) having the above-described variable magnification optical system ZL as an image capturing lens 2. In this camera, light from an object (a subject) which is not illustrated is collected by the image capturing lens 2 and forms a subject image on an image plane of the imaging unit 3 via an optical low-pass filter (OLPF) which is not illustrated. The subject image is photoelectrically converted by a photoelectric conversion element provided in the imaging unit 3, whereby the image of the subject is generated. This image is displayed on an electronic view finder (EVF) 4 provided in the camera 1. In this way, a photographer can observe the subject via the EVF 4. Moreover, when a release button (not illustrated) is pressed by the photographer, the image of the subject generated by the imaging unit 3 is stored in a memory (not illustrated). In this way, the photographer can capture an image of the subject using the camera 1.

As can be understood from respective examples to be described later, the variable magnification optical system ZL mounted on the camera 1 as the image capturing lens 2 has a wide angle of view and has a satisfactory optical performance such that various aberrations are corrected satisfactorily due to its characteristic lens configuration. Therefore, according to the camera 1, it is possible to implement an optical apparatus which has a wide angle of view and has a satisfactory optical performance such that various aberrations are corrected satisfactorily.

Although a mirrorless camera has been described as an example of the camera 1, the camera is not limited to this. For example, the same effect as the camera 1 can be obtained even when the above-described variable magnification optical system ZL is mounted on a single-lens reflex camera which has a quick return mirror on a camera body and views a subject using a finder optical system.

Figure 34:
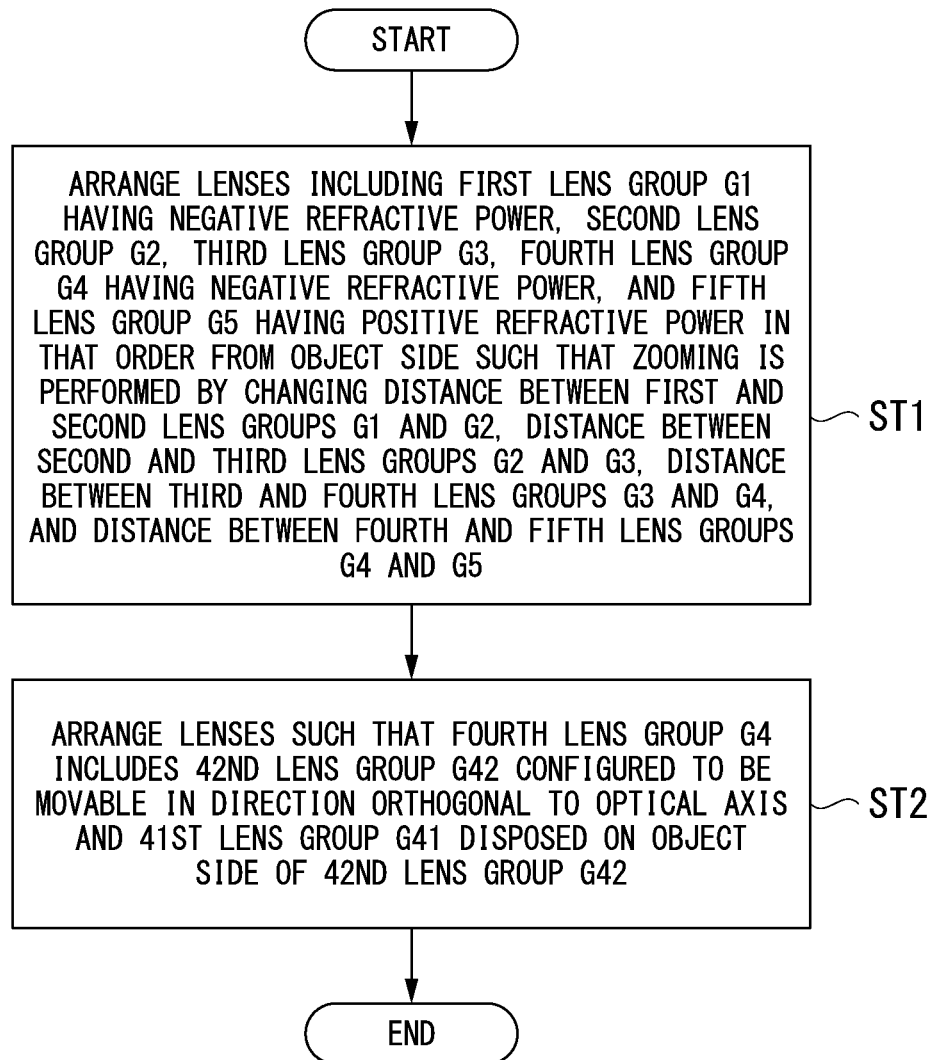
FIG. 34 is a diagram illustrating an outline of an example of a method for manufacturing a variable magnification optical system.
Figure 35:
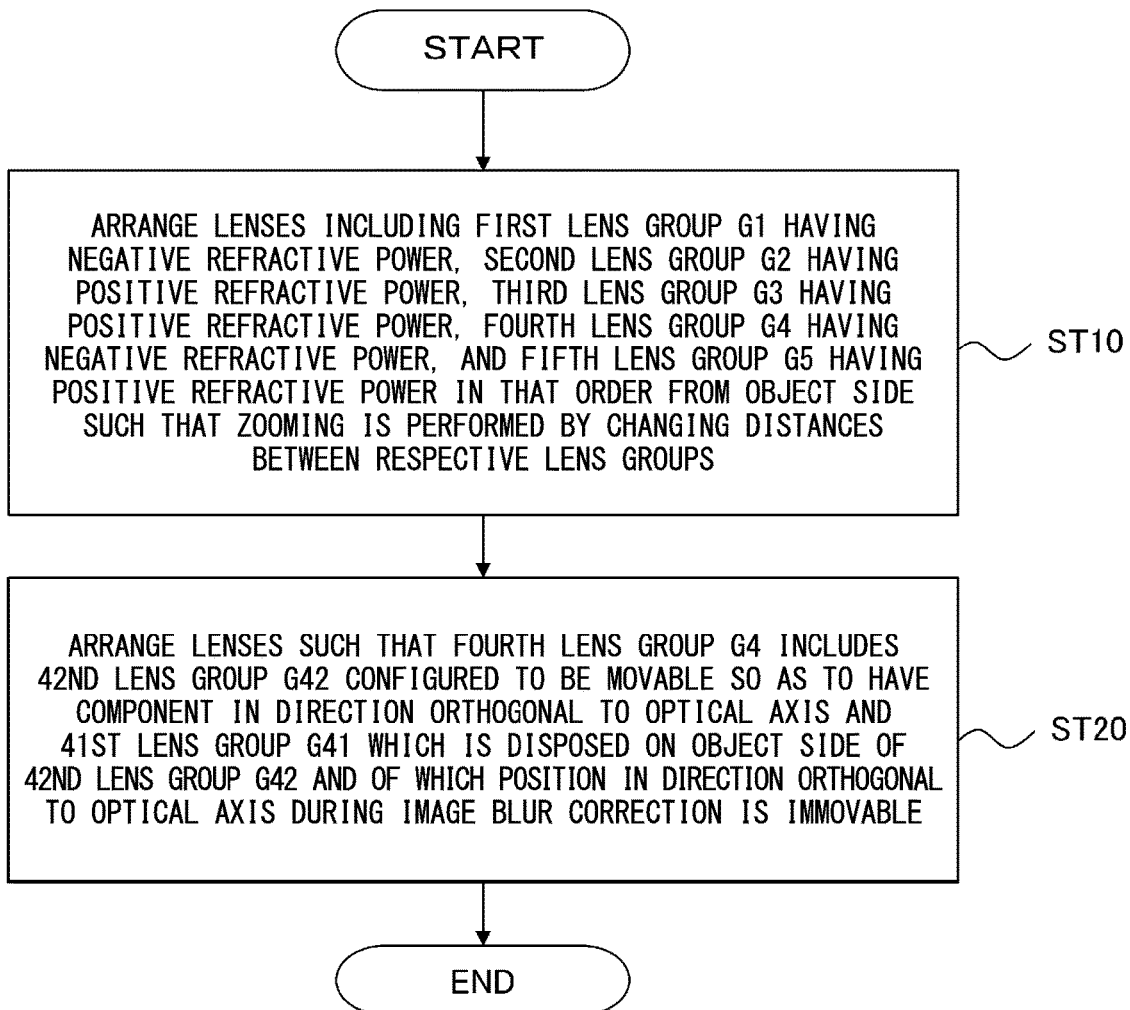
FIG. 35 is a diagram illustrating an outline of an example of a method for manufacturing a variable magnification optical system.

Next, an example of a method for manufacturing the above-described variable magnification optical system ZL will be described. FIGS. 34 and 35 illustrate an example of a method for manufacturing the variable magnification optical system ZL.

In the example illustrated in FIG. 34, first, respective lenses including a first lens group G1 having a negative refractive power; a second lens group G2; a third lens group G3; a fourth lens group G4 having a negative refractive power; and a fifth lens group G5 having a positive refractive power are arranged, in order from an object, in a lens barrel such that varying magnification is performed by changing the distance between the first and second lens groups G1 and G2, the distance between the second and third lens groups G2 and G3, the distance between the third and fourth lens groups G3 and G4, and the distance between the fourth and fifth lens groups G4 and G5 (step ST1). The respective lenses are arranged such that the fourth lens group G4 includes a 42nd lens group G42 configured to be movable so as to have a component in the direction orthogonal to the optical axis and a 41st lens group G41 disposed at an object-side of the 42nd lens group G42 (step ST2).

In the example illustrated in FIG. 35, first, respective lenses including a first lens group G1 having a negative refractive power, a second lens group G2 having a positive refractive power, a third lens group G3 having a positive refractive power, a fourth lens group G4 having a negative refractive power, and a fifth lens group G5 having a positive refractive power are arranged, in order from an object, in a lens barrel, the system performing varying magnification by changing the distances between the respective lens groups (step ST10). The respective lenses are arranged such that the fourth lens group G4 includes a 42nd lens group G42 configured to be movable so as to have a component in the direction orthogonal to the optical axis in order to correct image blur and a 41st lens group G41 which is disposed at an object-side of the 42nd lens group G42 and of which the position in the direction orthogonal to the optical axis during image blur correction is immovable (step ST20).

According to an example of a lens arrangement, as illustrated in FIG. 1, a negative meniscus lens L11 having a concave surface oriented toward an image side, a biconcave lens L12, a biconcave lens L13, and a biconvex lens L14 are arranged, in order from the object, to form the first lens group G1. A biconvex lens L21 and a cemented lens including a negative meniscus lens L22 having a concave surface oriented toward the image side and a positive meniscus lens L23 having a convex surface oriented toward the object side are arranged, in order from the object, to form the second lens group G2. A cemented lens including a biconvex lens L31 and a negative meniscus lens L32 having a concave surface oriented toward the object side arranged, in order from the object, forms the third lens group G3. A biconcave lens L41, a biconvex lens L42, and a cemented lens including a biconcave lens L43 and a positive meniscus lens L44 having a convex surface oriented toward the object side are arranged, in order from the object, to form the fourth lens group G4. A biconvex lens L51, a cemented lens including a biconvex lens L52 and a biconcave lens L53, and a cemented lens including a biconvex lens L54 and a biconcave lens L55 are arranged, in order from the object, to form the fifth lens group G5. Moreover, in the fourth lens group G4, the lenses ranging from the biconcave lens L41 to the biconvex lens L42 form the 41st lens group G41 and the cemented lens including the biconcave lens L43 and the positive meniscus lens L44 having the convex surface oriented toward the object side forms the 42nd lens group G42 (the vibration-reduction lens group (VR)). The respective lens groups prepared in this manner are arranged in the above-described order to manufacture the variable magnification optical system ZL.

According to the above-described manufacturing method, it is possible to manufacture the variable magnification optical system ZL which has a wide angle of view and in which various aberrations are corrected satisfactorily.

Hereinafter, respective examples will be described with reference to the drawings.

Figure 5:
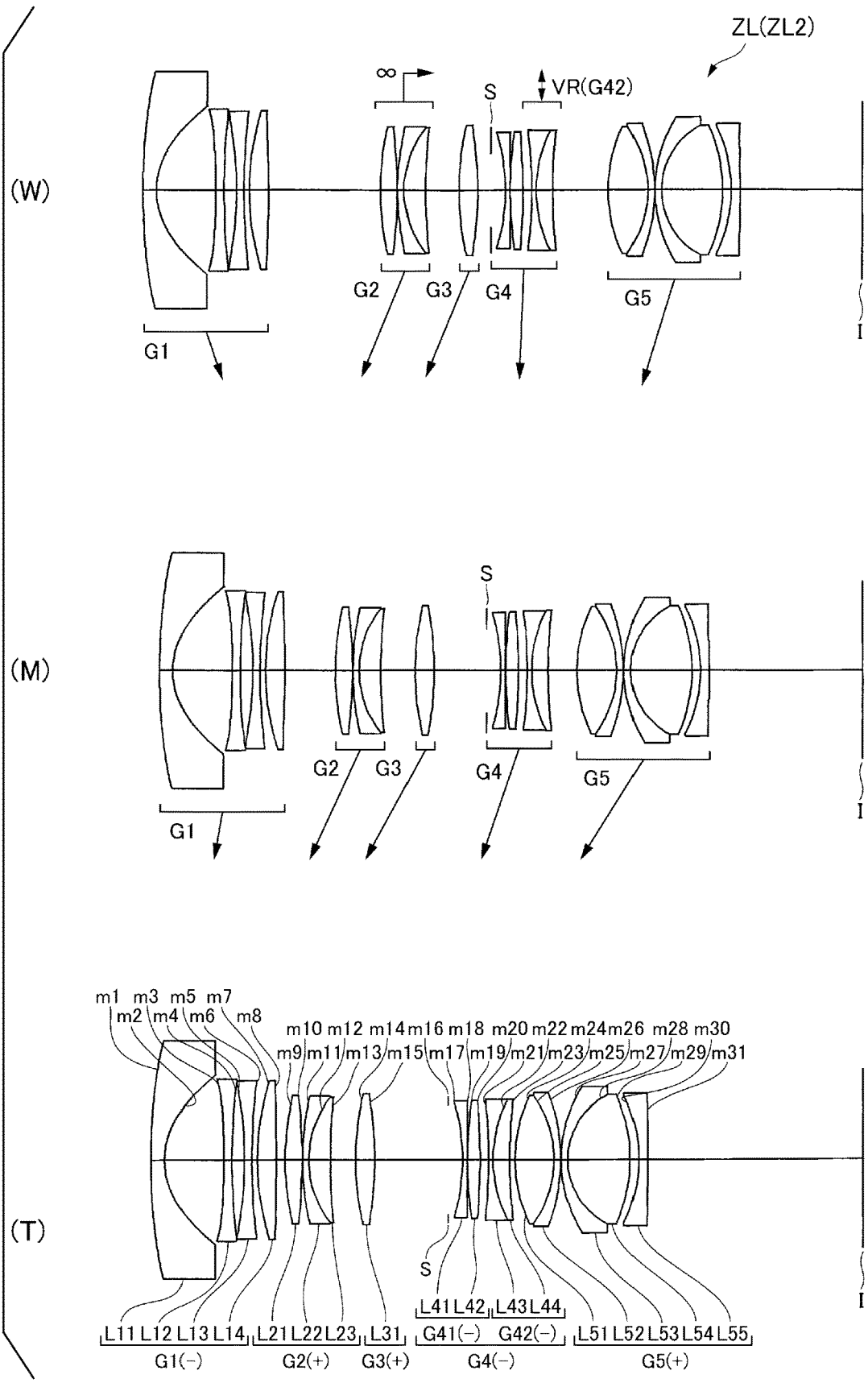
FIG. 5 is a cross-sectional view of a variable magnification optical system according to Example 2, wherein parts (W), (M), and (T) are in a wide-angle end state, an intermediate focal length state, and a telephoto end state, respectively.

FIGS. 1 and 5 are cross-sectional views illustrating the configuration and the refractive power allocation of variable magnification optical systems ZL (ZL1 to ZL2) according to respective examples. In the lower part of the cross-sectional views of the variable magnification optical systems ZL1 to ZL2, the moving directions along the optical axis of each lens group upon varying magnification from the wide-angle end state (W) to the telephoto end state (T) via the intermediate focal length state (M) are indicated by arrows. In the upper part of the cross-sectional views of the variable magnification optical systems ZL1 to ZL2, the moving direction of the focusing lens group upon focusing from an object at infinity to an object at a close distance is indicated by an arrow and the state of the vibration-reduction lens group VR when correcting image blur is also illustrated.

Respective reference symbols in FIG. 1 associated with Example 1 are used independently in respective examples in order to avoid complication of description due to an increased number of reference symbol characters. Therefore, even when components in diagrams associated with other examples are denoted by the same reference symbols as used in FIG. 1, these components do not necessarily have the same configuration as those of other examples.

Tables 1 and 2 illustrated below are tables of respective specifications of Examples 1 and 2.

In the respective examples, the d-line (wavelength: 587.562 nm) and the g-line (wavelength: 435.835 nm) are selected as an aberration characteristics calculation target.

In [Lens Specification] in tables, a surface number indicates a sequence number of an optical surface from an object side along a traveling direction of light, R indicates a radius of curvature of each optical surface, D indicates a surface distance which is the distance on the optical axis from each optical surface to the next optical surface (or an image plane), nd indicates a refractive index for the d-line, of a material of an optical member, and vd indicates the Abbe number for the d-line, of a material of an optical member. Moreover, Di indicates a surface distance between an i-th surface and an (i+1)th surface and Aperture stop indicates an aperture stop S. When the optical surface is an aspherical surface, a mark "*" is assigned to the surface number and a paraxial radius of curvature is shown in the radius of curvature column R.

In [Aspheric Data] in tables, the shape of an aspherical surface shown in [Lens Specification] is expressed by Equation (a) below. X(y) indicates the distance along the optical axis direction from a tangential plane at the vertex of an aspherical surface to a position on the aspherical surface at a height y, R indicates a radius of curvature (a paraxial radius of curvature) of a reference spherical surface, κ indicates a conic constant, and Ai indicates an aspheric coefficient at degree i. "E-n" indicates "×10$^{-n}$". For example, 1.234E−05=1.234×10$^{-5}$. An aspheric coefficient A2 at degree 2 is 0 and is not illustrated.

$$X(y)=(y^2/R)/\{1+(1-\kappa \times y^2/R^2)^{1/2}\}+A4 \times y^4+A6 \times y^6+A8 \times y^8+A10 \times y^{10} \quad (a)$$

In [Various Data] in tables, f indicates a focal length of an entire lens system, FNo indicates the F-number, ω indicates a half-angle of view (unit: °), Y indicates the maximum image height, BF indicates the distance (an air-conversion length) from the last lens surface to the image plane I on the optical axis upon focusing on an object at infinity, and TL indicates the sum of BF and the distance from the frontmost lens surface to the last lens surface on the optical axis upon focusing on an object at infinity.

In [Variable Distance Data] in tables, Di indicates a surface distance between an i-th surface and an (i+1)th surface, D0 indicates an axial air distance between an object plane and a lens surface closest to an object, of the first lens group G1, f indicates the focal length of an entire lens system, and β indicates an imaging magnification.

In [Lens Group Data] in tables, the starting surface and the focal length of the lens groups are shown.

In [Conditional Expression Correspondence Values] in tables, values corresponding to Conditional Expressions (5) to (8) are illustrated.

Hereinafter, "mm" is generally used as the unit of the focal length f, the radius of curvature R, the surface distance D, and other lengths and the like described in all specification values unless particularly stated otherwise. However, the unit is not limited to this since an equivalent optical performance is obtained even when the optical system is proportionally expanded or reduced. Moreover, the unit is not limited to "mm" and other appropriate units may be used.

The above description of tables is common to all examples, and description thereof will not be provided below.

Example 1

Example 1 will be described with reference to FIGS. 1 to 4 and Table 1. As illustrated in FIG. 1, a variable magnification optical system ZL (ZL1) according to Example 1 is constituted by, in order from an object, a first lens group G1 having a negative refractive power; a second lens group G2 having a positive refractive power; a third lens group G3 having a positive refractive power; a fourth lens group G4 having a negative refractive power; and a fifth lens group G5 having a positive refractive power.

The first lens group G1 is constituted by, in order from the object, a negative meniscus lens L11 having a concave surface oriented toward the image side, a biconcave lens L12, a biconcave lens L13, and a biconvex lens L14. The negative meniscus lens L11 has an aspherical surface on both sides thereof. Moreover, the biconcave lens L12 has an aspherical object-side surface.

The second lens group G2 is constituted by, in order from the object, a biconvex lens L21 and a cemented lens including a negative meniscus lens L22 having a concave surface oriented toward the image side and a positive meniscus lens L23 having a convex surface oriented toward the object side.

The third lens group G3 is constituted by a cemented lens including, in order from the object, a biconvex lens L31 and a negative meniscus lens L32 having a concave surface oriented toward the object side.

The fourth lens group G4 is constituted by, in order from the object, a 41st lens group G41 having a negative refractive power and a 42nd lens group G42 having a negative refractive power. The 41st lens group G41 is constituted by, in order from the object, a biconcave lens L41 and a biconvex lens L42. The 42nd lens group G42 is constituted by a cemented lens including, in order from the object, a biconcave lens L43 and a positive meniscus lens L44 having a convex surface oriented toward the object side. The positive meniscus lens L44 has an aspherical image-side surface.

The fifth lens group G5 is constituted by, in order from the object, a biconvex lens L51, a cemented lens including a biconvex lens L52 and a biconcave lens L53, and a cemented lens including a biconvex lens L54 and a biconcave lens L55. The biconcave lens L55 has an aspherical image-side surface.

An aperture stop S is provided between the third lens group G3 and the fourth lens group G4, and the aperture stop S forms the fourth lens group G4.

Varying magnification from the wide-angle end state to the telephoto end state is performed by fixing the first lens group G1 in relation to the image plane, moving the second lens group G2 toward the object side, moving the third lens group G3 toward the object side, moving the fourth lens group G4 toward the object side, and moving the fifth lens group G5 toward the object side such that the distances between the respective lens groups (the distance between the first and second lens groups G1 and G2, the distance between the second and third lens groups G2 and G3, the distance between the third and fourth lens groups G3 and G4, and the distance between the fourth and fifth lens groups G4 and G5) are changed. The aperture stop S is moved toward the object side integrally with the fourth lens group G4.

Focusing from an object at infinity to an object at a close distance is performed by moving the second lens group G2 toward the image side.

When image blur occurs, image blur correction (vibration reduction) on the image plane I is performed by moving the 42nd lens group G42 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 41st lens group G41 positioned at an object-side of the 42nd lens group G42 is immovable during image blur correction.

In Example 1, in the wide-angle end state, since the vibration reduction coefficient is −0.74 and the focal length is 16.40 mm, the moving distance of the vibration-reduction lens group VR for correcting the rotation blur of 0.81° is −0.31 mm. In the intermediate focal length state, since the vibration reduction coefficient is −0.90 and the focal length is 23.50 mm, the moving distance of the vibration-reduction lens group VR for correcting the rotation blur of 0.68° is −0.31 mm. In the telephoto end state, since the vibration reduction coefficient is −1.16 and the focal length is 34.00 mm, the moving distance of the vibration-reduction lens group VR for correcting the rotation blur of 0.57° is −0.29 mm.

Table 1 illustrates the values of respective specifications of Example 1. Surface numbers 1 to 32 in Table 1 correspond to optical surfaces of m1 to m32 illustrated in FIG. 1.

TABLE 1

[Lens Specification]

| Surface number | R | D | nd | νd |
|---|---|---|---|---|
| *1 | 144.72719 | 3.000 | 1.76690 | 46.9 |
| *2 | 16.78385 | 12.144 | 1.00000 | |
| *3 | −146.50988 | 1.700 | 1.76690 | 46.9 |
| 4 | 112.07990 | 2.219 | 1.00000 | |
| 5 | −201.75172 | 1.700 | 1.49700 | 81.7 |
| 6 | 50.54104 | 1.200 | 1.00000 | |
| 7 | 47.54818 | 5.221 | 1.75520 | 27.6 |
| 8 | −219.28043 | (D8) | 1.00000 | |
| 9 | 46.75733 | 3.989 | 1.64769 | 33.7 |
| 10 | −272.45513 | 0.100 | 1.00000 | |
| 11 | 50.36118 | 1.000 | 1.84666 | 23.8 |
| 12 | 19.87141 | 4.835 | 1.60342 | 38.0 |
| 13 | 62.52826 | (D13) | 1.00000 | |
| 14 | 48.51662 | 6.297 | 1.49700 | 81.7 |
| 15 | −35.93964 | 1.400 | 1.84666 | 23.8 |
| 16 | −54.11218 | (D16) | 1.00000 | |
| 17 | (Aperture stop) | 3.263 | 1.00000 | |
| 18 | −42.29429 | 1.300 | 1.90366 | 31.3 |
| 19 | 142.58723 | 0.100 | 1.00000 | |
| 20 | 81.26353 | 3.890 | 1.84666 | 23.8 |
| 21 | −56.98684 | 2.000 | 1.00000 | |
| 22 | −67.55578 | 1.300 | 1.80400 | 46.6 |
| 23 | 33.77804 | 3.516 | 1.80518 | 25.4 |
| *24 | 150.14014 | (D24) | 1.00000 | |
| 25 | 32.07862 | 7.401 | 1.49700 | 81.7 |
| 26 | −48.27408 | 0.100 | 1.00000 | |
| 27 | 44.80816 | 8.054 | 1.49700 | 81.7 |
| 28 | −28.00000 | 1.500 | 1.74950 | 35.2 |
| 29 | 112.01929 | 0.500 | 1.00000 | |
| 30 | 60.44099 | 6.300 | 1.49700 | 81.7 |
| 31 | −60.00000 | 2.000 | 1.80610 | 41.0 |
| *32 | 983.65534 | (D32) | 1.00000 | |

[Aspheric Data]

| Surface | κ | A4 | A6 | A8 | A10 |
|---|---|---|---|---|---|
| 1 | 1.00000e+00 | 2.21315e−06 | −2.13704e−09 | −5.22294e−12 | 7.89630e−15 |
| 2 | 0.00000e+00 | 9.86610e−06 | −4.32155e−09 | 1.14702e−10 | −3.66795e−13 |
| 3 | 1.00000e+00 | −2.67699e−06 | 1.28816e−10 | 4.17268e−11 | −1.97814e−13 |
| 24 | 1.00000e+00 | −1.85215e−06 | 1.82819e−10 | 7.49821e−12 | −1.11725e−14 |
| 32 | 1.00000e+00 | 1.67690e−05 | 8.61235e−09 | 1.61417e−11 | 9.86306e−15 |

[Variable Data]

| | W | M | T |
|---|---|---|---|
| f | 16.40 | 23.50 | 34.00 |
| FNo | 2.85 | 2.84 | 2.85 |
| ω | 53.9 | 40.6 | 30.1 |
| Y | 20.00 | 20.00 | 20.00 |
| TL | 159.619 | 159.618 | 159.618 |
| BF | 27.426 | 36.177 | 49.659 |

TABLE 1-continued

[Variable Distance Data]

| | Focusing on infinity | | | Focusing on close point | | |
|---|---|---|---|---|---|---|
| | W | M | T | W | M | T |
| D0 | ∞ | ∞ | ∞ | 340.38 | 340.38 | 340.38 |
| β | — | — | — | −0.0451 | −0.0649 | −0.0941 |
| f | 16.40 | 23.50 | 34.00 | — | — | — |
| D8 | 25.600 | 10.000 | 2.000 | 27.097 | 11.678 | 3.852 |
| D13 | 5.565 | 12.410 | 5.867 | 4.069 | 10.733 | 4.016 |
| D16 | 3.000 | 9.997 | 14.864 | 3.000 | 9.997 | 14.864 |
| D24 | 12.000 | 5.006 | 1.200 | 12.000 | 5.006 | 1.200 |
| D32 | 27.426 | 36.177 | 49.659 | 27.426 | 36.177 | 49.659 |

[Lens Group Data]

| Lens group | Starting surface | Focal length |
|---|---|---|
| 1st lens group | 1 | −22.99 |
| 2nd lens group | 9 | 81.72 |
| 3rd lens group | 14 | 62.91 |
| 4th lens group | 17 | −50.13 |
| 41st lens group | 17 | −648.11 |
| 42nd lens group | 22 | −57.48 |
| 5th lens group | 25 | 38.14 |

[Conditional Expression Correspondence Values]

Conditional Expression (1) f42/f4 = 1.15
Conditional Expression (2) f4/f41 = 0.077
Conditional Expression (3) f1/f4 = 0.459
Conditional Expression (4) A(T3.5)/A(T4.0) = 1.735
(A(T3.5) = −0.0180, A(T4.0) = −0.0104)

It can be understood from Table 1 that the variable magnification optical system ZL1 according to Example 1 satisfies Conditional Expressions (1) to (4).

Figure 2:
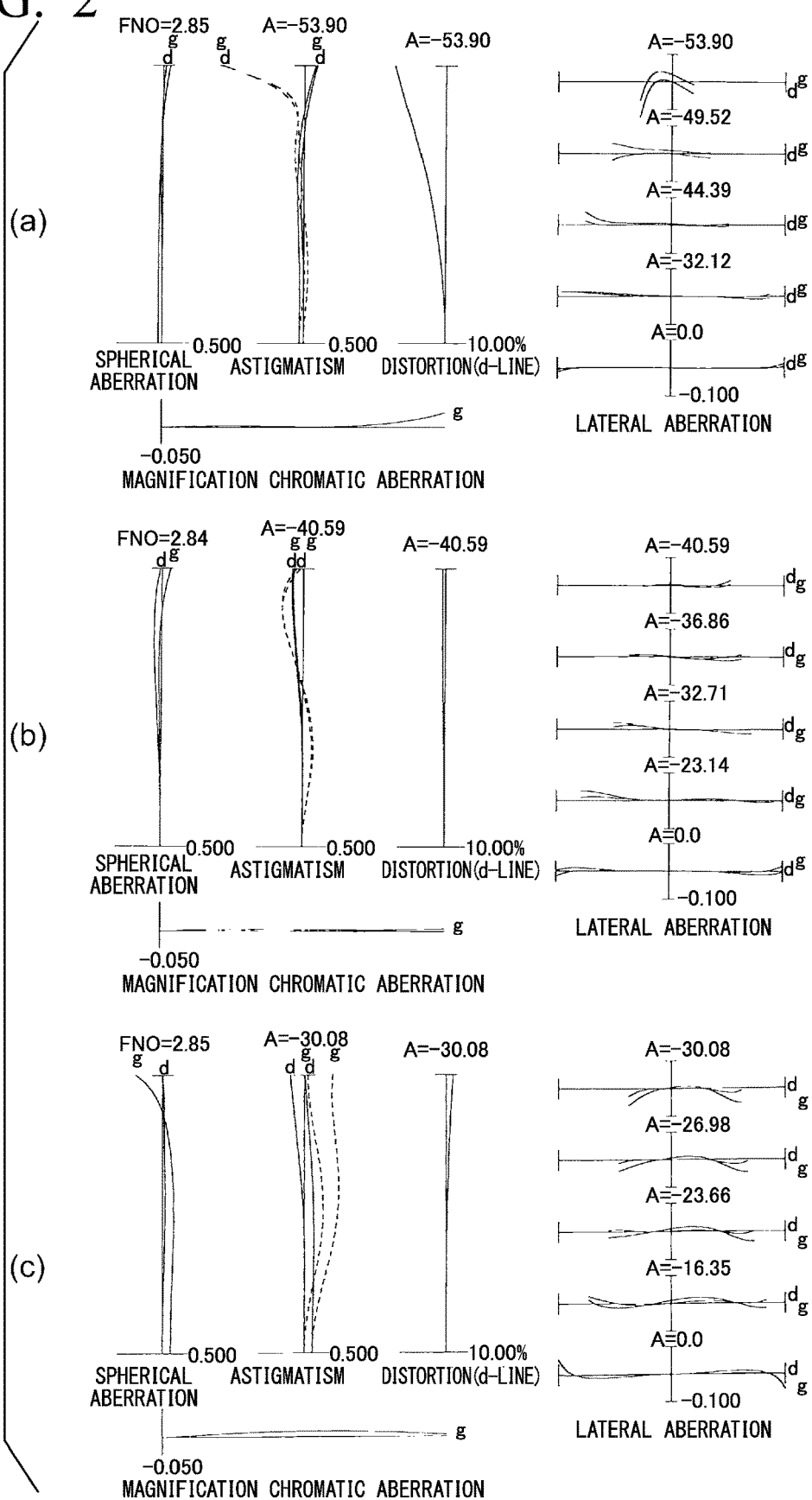
FIG. 2 shows graphs illustrating various aberrations of the variable magnification optical system according to Example 1 upon focusing on an object at infinity, wherein parts (a), (b), and (c) are in the wide-angle end state, the intermediate focal length state, and the telephoto end state, respectively.
Figure 3:
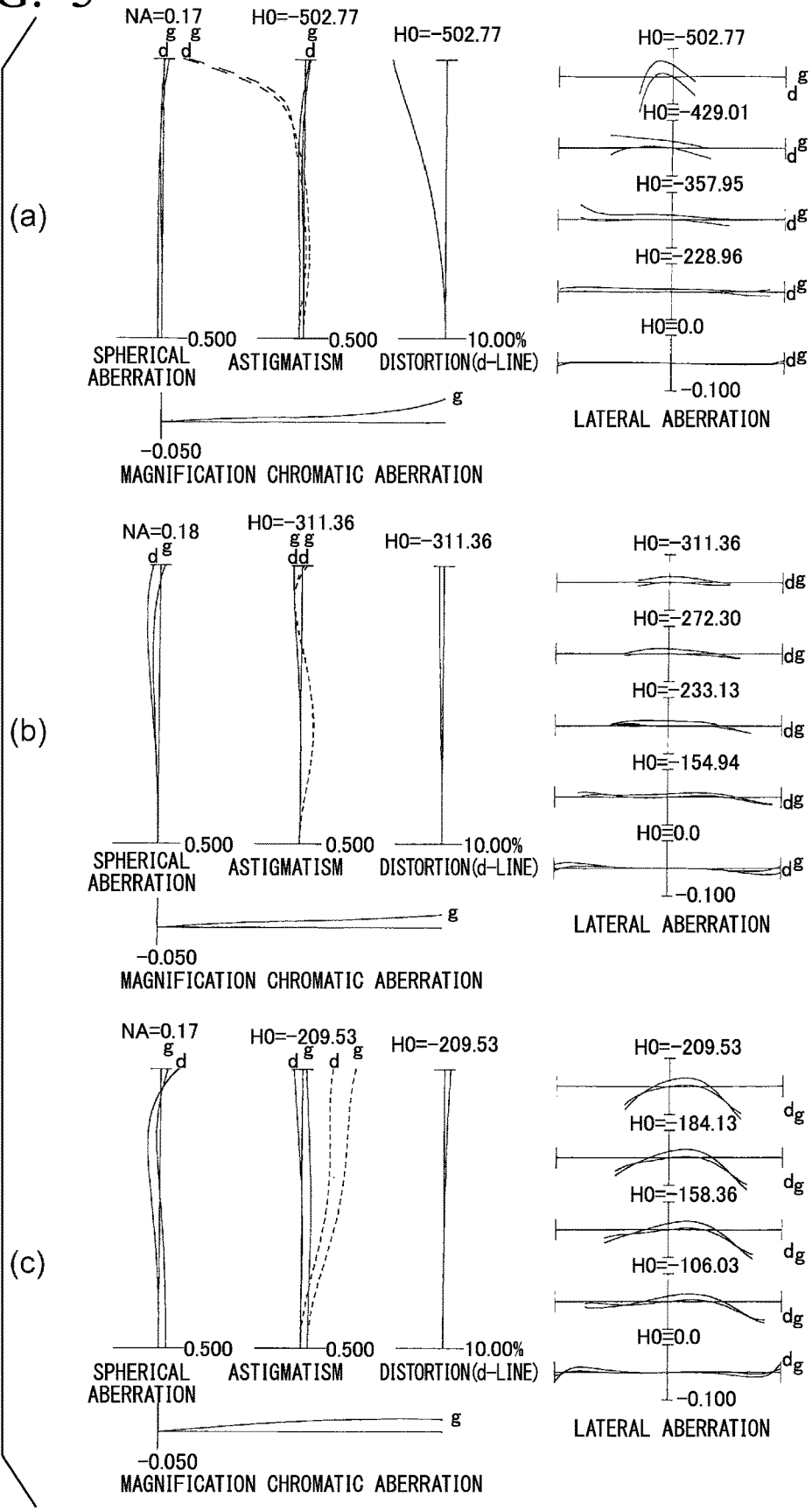
FIG. 3 shows graphs illustrating various aberrations of the variable magnification optical system according to Example 1 upon focusing on an object at a close point, wherein parts (a), (b), and (c) are in the wide-angle end state, the intermediate focal length state, and the telephoto end state, respectively.

FIG. 2 shows graphs illustrating various aberrations (spherical aberration, astigmatism, distortion, magnification chromatic aberration (lateral chromatic aberration), and lateral aberration) upon focusing on an object at infinity, of the variable magnification optical system ZL1 according to Example 1, in which part (a) illustrates the wide-angle end state, part (b) illustrates the intermediate focal length state, and part (c) illustrates the telephoto end state. FIG. 3 shows graphs illustrating various aberrations (spherical aberration, astigmatism, distortion, magnification chromatic aberration, and lateral aberration) upon focusing on an object at a close point, of the variable magnification optical system ZL1 according to Example 1, in which part (a) illustrates the wide-angle end state, part (b) illustrates the intermediate focal length state, and part (c) illustrates the telephoto end state. FIG. 4 shows graphs illustrating lateral aberration of the variable magnification optical system ZL1 according to Example 1 when image blur correction is performed upon focusing on an object at infinity, in which part (a) illustrates the wide-angle end state, part (b) illustrates the intermediate focal length state, and part (c) illustrates the telephoto end state.

In the graphs illustrating respective aberrations, FNO indicates the F-number, NA indicates a numerical aperture, A indicates a half-angle of view (unit: °) at each image height, and H0 indicates an object height. d indicates aberration at the d-line and g indicates aberration at the g-line. Moreover, aberrations without these characters indicate aberrations at the d-line. In the graphs illustrating the spherical aberration upon focusing on an object at infinity, the F-number values corresponding to the maximum aperture are illustrated. In the graphs illustrating the spherical aberration upon focusing on an object at a close point, the numerical aperture values corresponding to the maximum aperture are illustrated. In the graphs illustrating the astigmatism, a solid line indicates the sagittal image plane and a broken line indicates the meridional image plane.

The same reference symbols as in this example are used in the aberration graphs of respective examples to be described later.

It can be understood from FIGS. 2 to 4 that the variable magnification optical system ZL1 according to Example 1 has a satisfactory optical performance such that various aberrations are satisfactorily corrected in states ranging from the wide-angle end state to the telephoto end state and from the focusing-on-infinity state to the focusing-on-close-point state. Moreover, it can be understood that the variable magnification optical system ZL1 has an excellent imaging performance upon image blur correction.

Example 2

Example 2 will be described with reference to FIGS. 5 to 8 and Table 2. As illustrated in FIG. 5, a variable magnification optical system ZL (ZL2) according to Example 2 is constituted by, in order from an object, a first lens group G1 having a negative refractive power; a second lens group G2 having a positive refractive power; a third lens group G3 having a positive refractive power; a fourth lens group G4 having a negative refractive power; and a fifth lens group G5 having a positive refractive power.

The first lens group G1 is constituted by, in order from the object, a negative meniscus lens L11 having a concave surface oriented toward the image side, a biconcave lens L12, a biconcave lens L13, and a biconvex lens L14. The negative meniscus lens L11 has an aspherical surface on both sides thereof. Moreover, the biconcave lens L12 has an aspherical object-side surface.

The second lens group G2 is constituted by, in order from the object, a biconvex lens L21 and a cemented lens including a negative meniscus lens L22 having a concave surface oriented toward the image side and a positive meniscus lens L23 having a convex surface oriented toward the object side.

The third lens group G3 is constituted by a biconvex lens L31.

The fourth lens group G4 is constituted by, in order from the object, a 41st lens group G41 having a negative refractive power and a 42nd lens group G42 having a negative refractive power. The 41st lens group G41 is constituted by, in order from the object, a biconcave lens L41 and a biconvex lens L42. The 42nd lens group G42 is constituted by a cemented lens including, in order from the object, a biconcave lens L43 and a positive meniscus lens L44 having a convex surface oriented toward the object side. The positive meniscus lens L44 has an aspherical image-side surface.

The fifth lens group G5 is constituted by, in order from the object, a cemented lens including a biconvex lens L51 and a negative meniscus lens L52 having a concave surface oriented toward the object side, a cemented lens including a negative meniscus lens L53 having a concave surface oriented toward the image side and a biconvex lens L54, and a negative meniscus lens L55 having a concave surface oriented toward the object side. The negative meniscus lens L55 has an aspherical image-side surface.

An aperture stop S is provided between the third lens group G3 and the fourth lens group G4, and the aperture stop S forms the fourth lens group G4.

Varying magnification from the wide-angle end state to the telephoto end state is performed by moving the first lens group G1 toward the image side and then moving the same toward the object side, moving the second lens group G2 toward the object side, moving the third lens group G3 toward the object side, moving the fourth lens group G4 toward the object side, and moving the fifth lens group G5 toward the object side such that the distances between the respective lens groups (the distance between the first and second lens groups G1 and G2, the distance between the second and third lens groups G2 and G3, the distance between the third and fourth lens groups G3 and G4, and the distance between the fourth and fifth lens groups G4 and G5) are changed. The aperture stop S is moved toward the object side integrally with the fourth lens group G4.

Focusing from an object at infinity to an object at a close distance is performed by moving the second lens group G2 toward the image side.

When image blur occurs, image blur correction (vibration reduction) on the image plane I is performed by moving the 42nd lens group G42 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 41st lens group G41 positioned at an object-side of the 42nd lens group G42 is immovable during image blur correction.

In Example 2, in the wide-angle end state, since the vibration reduction coefficient is −0.65 and the focal length is 16.40 mm, the moving distance of the vibration-reduction lens group VR for correcting the rotation blur of 0.81° is −0.36 mm. In the intermediate focal length state, since the vibration reduction coefficient is −0.76 and the focal length is 23.50 mm, the moving distance of the vibration-reduction lens group VR for correcting the rotation blur of 0.68° is −0.37 mm. In the telephoto end state, since the vibration reduction coefficient is −0.99 and the focal length is 34.00 mm, the moving distance of the vibration-reduction lens group VR for correcting the rotation blur of 0.57° is −0.34 mm.

Table 2 illustrates the values of respective specifications of Example 2. Surface numbers 1 to 31 in Table 2 correspond to optical surfaces of m1 to m31 illustrated in FIG. 5.

TABLE 2

[Lens Specification]

| Surface number | R | D | nd | vd |
|---|---|---|---|---|
| *1 | 155.70823 | 3.000 | 1.76690 | 46.9 |
| *2 | 16.71640 | 13.373 | 1.00000 | |
| *3 | −200.00000 | 1.800 | 1.76690 | 46.9 |
| 4 | 150.01535 | 2.786 | 1.00000 | |
| 5 | −91.03331 | 1.700 | 1.49782 | 82.6 |
| 6 | 143.99051 | 1.200 | 1.00000 | |
| 7 | 58.46345 | 4.345 | 1.75520 | 27.6 |
| 8 | −434.09219 | (D8) | 1.00000 | |
| 9 | 63.66223 | 3.791 | 1.57957 | 53.7 |
| 10 | −122.54394 | 0.100 | 1.00000 | |
| 11 | 62.33486 | 1.400 | 1.84666 | 23.8 |
| 12 | 22.85521 | 4.835 | 1.60342 | 38.0 |
| 13 | 130.87641 | (D13) | 1.00000 | |
| 14 | 64.13663 | 4.239 | 1.49782 | 82.6 |
| 15 | −84.26911 | (D15) | 1.00000 | |
| 16 | (Aperture stop) | 3.263 | 1.00000 | |
| 17 | −45.56608 | 1.000 | 1.80400 | 46.6 |
| 18 | 3172.25670 | 0.100 | 1.00000 | |
| 19 | 102.14214 | 2.827 | 1.84666 | 23.8 |
| 20 | −141.92393 | 2.000 | 1.00000 | |
| 21 | −108.76161 | 1.000 | 1.80400 | 46.6 |
| 22 | 29.84706 | 3.696 | 1.80518 | 25.4 |
| *23 | 110.49500 | (D23) | 1.00000 | |
| 24 | 33.41270 | 8.825 | 1.49782 | 82.6 |
| 25 | −24.42987 | 1.500 | 1.80440 | 39.6 |
| 26 | −40.93874 | 0.100 | 1.00000 | |

TABLE 2-continued

| | | | | |
|---|---|---|---|---|
| 27 | 30.63415 | 1.500 | 1.80100 | 34.9 |
| 28 | 16.29239 | 13.887 | 1.49782 | 82.6 |
| 29 | −35.27572 | 1.938 | 1.00000 | |
| 30 | −31.58375 | 2.000 | 1.80604 | 40.7 |
| *31 | −200.00000 | (D31) | 1.00000 | |

[Aspheric Data]

| Surface | κ | A4 | A6 | A8 | A10 |
|---|---|---|---|---|---|
| 1 | 1.00000e+00 | 1.06028e−06 | 1.59159e−09 | −7.12097e−12 | 6.57046e−15 |
| 2 | 0.00000e+00 | 6.61060e−06 | −1.49507e−09 | 8.61304e−11 | −2.65762e−13 |
| 3 | 1.00000e+00 | −3.92122e−06 | −4.32274e−09 | 3.03947e−11 | −1.42986e−13 |
| 23 | 1.00000e+00 | −1.67719e−06 | −3.27153e−09 | 3.18352e−11 | −8.33990e−14 |
| 31 | 1.00000e+00 | 8.89940e−06 | −7.38491e−09 | 2.38442e−11 | −1.86910e−13 |

[Various Data]

| | W | M | T |
|---|---|---|---|
| f | 16.40 | 23.50 | 34.00 |
| FNo | 2.90 | 2.89 | 2.89 |
| ω | 53.8 | 40.4 | 30.1 |
| Y | 20.00 | 20.00 | 20.00 |
| TL | 161.618 | 157.904 | 159.837 |
| BF | 27.338 | 34.304 | 48.377 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 338.38 | 342.10 | 340.16 |
| β | — | — | — | −0.0452 | −0.0644 | −0.0939 |
| f | 16.40 | 23.50 | 34.00 | — | — | — |
| D8 | 25.186 | 11.390 | 2.000 | 26.735 | 13.032 | 3.804 |
| D13 | 7.484 | 7.667 | 5.628 | 5.935 | 6.025 | 3.825 |
| D15 | 3.000 | 11.823 | 16.426 | 3.000 | 11.823 | 16.426 |
| D23 | 12.405 | 6.515 | 1.200 | 12.405 | 6.515 | 1.200 |
| D31 | 27.338 | 34.304 | 48.377 | 27.338 | 34.304 | 48.377 |

[Lens Group Data]

| Lens group | Starting surface | Focal distance |
|---|---|---|
| 1st lens group | 1 | −23.61 |
| 2nd lens group | 9 | 79.09 |
| 3rd lens group | 14 | 73.86 |
| 4th lens group | 16 | −53.41 |
| 41st lens group | 16 | −294.62 |
| 42nd lens group | 21 | −67.66 |
| 5th lens group | 24 | 38.67 |

[Conditional Expression Correspondence Values]

| | |
|---|---|
| Conditional Expression (1) | f42/f4 = 1.27 |
| Conditional Expression (2) | f4/f41 = 0.181 |
| Conditional Expression (3) | f1/f4 = 0.442 |
| Conditional Expression (4) | A(T3.5)/A(T4.0) = 1.759 |
| | (A(T3.5) = −0.0183, A(T4.0) = −0.0104) |

It can be understood from Table 2 that the variable magnification optical system ZL2 according to Example 2 satisfies Conditional Expressions (1) to (4).

Figure 6:
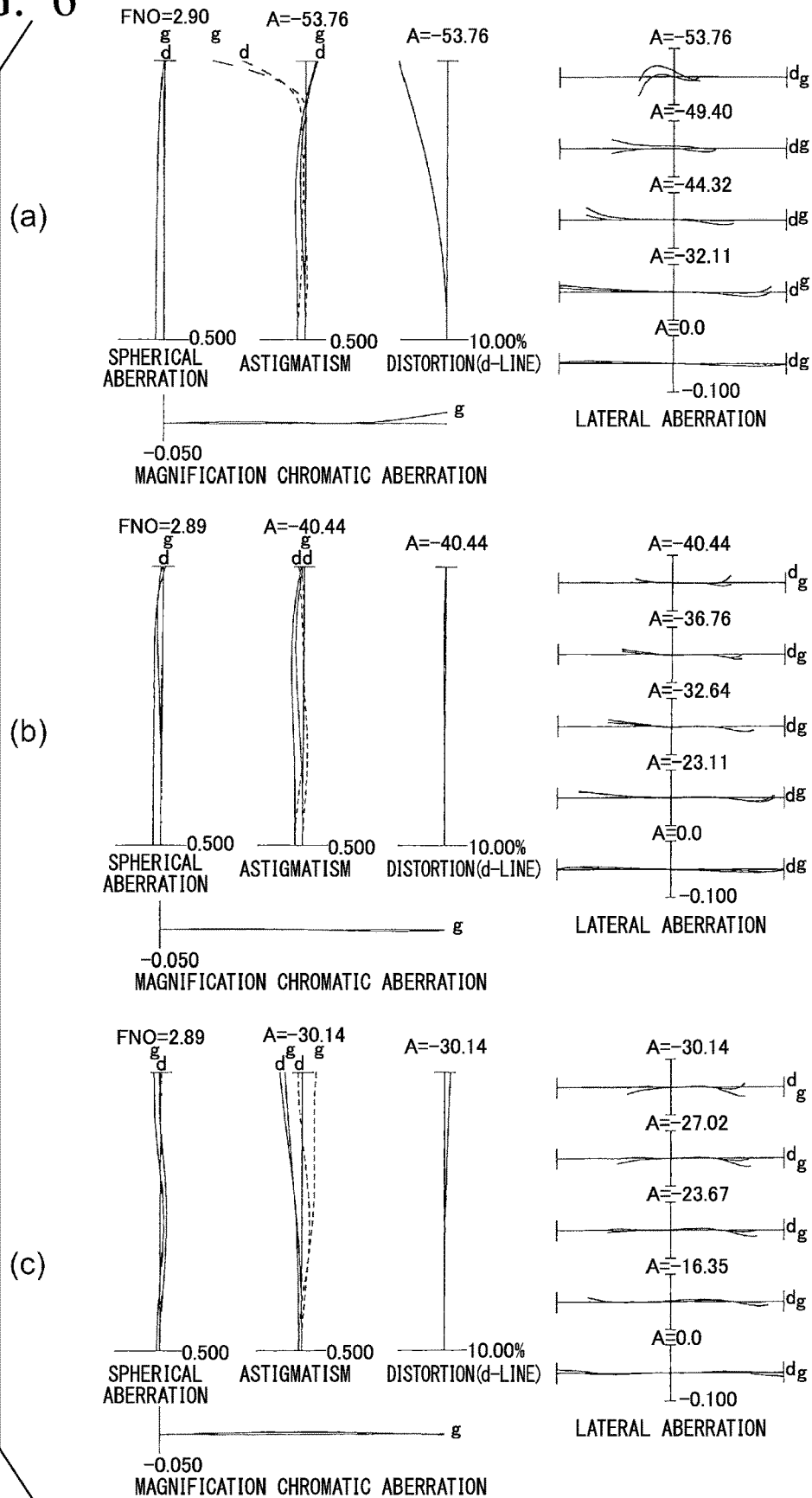
FIG. 6 shows graphs illustrating various aberrations of the variable magnification optical system according to Example 2 upon focusing on an object at infinity, wherein parts (a), (b), and (c) are in the wide-angle end state, the intermediate focal length state, and the telephoto end state, respectively.
Figure 7:
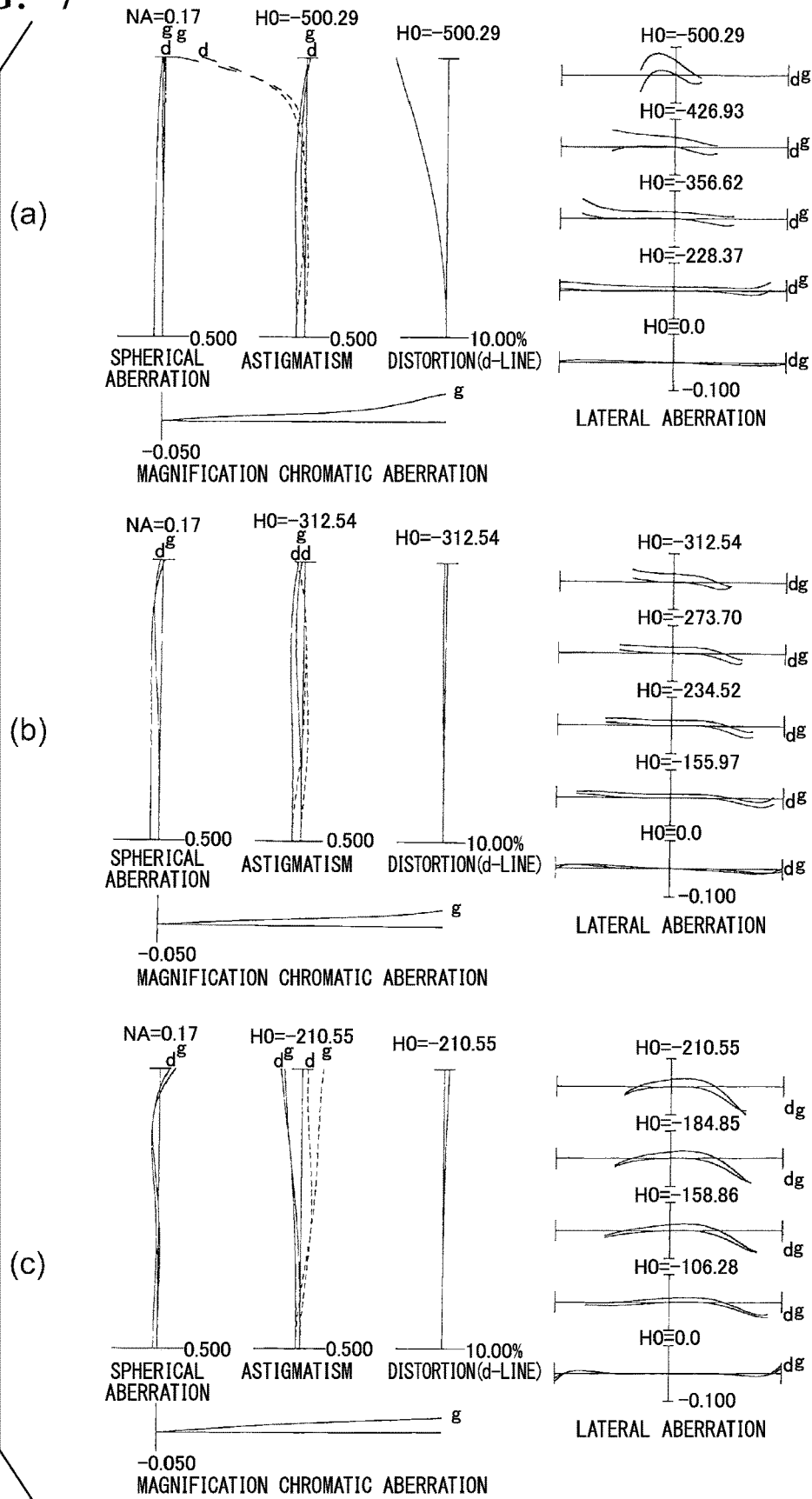
FIG. 7 shows graphs illustrating various aberrations of the variable magnification optical system according to Example 2 upon focusing on an object at a close point, wherein parts (a), (b), and (c) are in the wide-angle end state, the intermediate focal length state, and the telephoto end state, respectively.

FIG. 6 shows graphs illustrating various aberrations (spherical aberration, astigmatism, distortion, magnification chromatic aberration, and lateral aberration) upon focusing on an object at infinity, of the variable magnification optical system ZL2 according to Example 2, in which part (a) illustrates the wide-angle end state, part (b) illustrates the intermediate focal length state, and part (c) illustrates the telephoto end state. FIG. 7 shows graphs illustrating various aberrations (spherical aberration, astigmatism, distortion, magnification chromatic aberration, and lateral aberration) upon focusing on an object at a close point, of the variable magnification optical system ZL2 according to Example 2, in which part (a) illustrates the wide-angle end state, part (b) illustrates the intermediate focal length state, and part (c) illustrates the telephoto end state. FIG. 8 shows graphs illustrating lateral aberration of the variable magnification optical system ZL2 according to Example 2 when image blur correction is performed upon focusing on an object at infinity, in which part (a) illustrates the wide-angle end state, part (b) illustrates the intermediate focal length state, and part (c) illustrates the telephoto end state.

It can be understood from FIGS. 6 to 8 that the variable magnification optical system ZL2 according to Example 2 has a satisfactory optical performance such that various aberrations are satisfactorily corrected in states ranging from the wide-angle end state to the telephoto end state and from the focusing-on-infinity state to the focusing-on-close-point state. Moreover, it can be understood that the variable magnification optical system ZL2 has an excellent imaging performance upon image blur correction.

According to the above-described examples, it is possible to implement a variable magnification optical system which has a bright F-value of approximately F2.8 and such a wide angle of view that the half-angle of view is approximately 50° or more, and in which various aberrations are corrected satisfactorily.

While the present invention has been described by assigning reference symbols to elements of the embodiment for better understanding of the present invention, the aspect of the present invention is not limited to this. The following content can be appropriately employed within a range where the optical performance of the variable magnification optical system is not diminished.

Although the numbered examples of a five-group configuration have been illustrated as numbered examples of the variable magnification optical system ZL, the present invention is not limited to this and can be applied to other group configurations (for example, a six-group configuration or the like). Specifically, a configuration in which a lens or a lens group is added to the side closest to the object side and a configuration in which a lens or a lens group is added to the side closest to the image side may be employed. The first lens group G1 may be divided into a plurality of lens groups, and the respective lens groups may be moved along different trajectories upon varying magnification or one of them may be fixed. In the examples, although the 41st lens group G41 has a negative refractive power, the 41st lens group G41 may have a positive refractive power. Moreover, in the examples, although the 42nd lens group G42 has a negative refractive power, the 42nd lens group G42 may have a positive refractive power. A lens group refers to a portion having at least one lens isolated by air space which changes upon varying magnification or focusing.

In the variable magnification optical system ZL, a portion of a lens group, an entire lens group, or a plurality of lens groups may be moved in the optical axis direction as a focusing lens group in order to perform focusing from an object at infinity to an object at a close distance. Moreover, such a focusing lens group can be applied to autofocus and is also suitable for driving based on an autofocus motor (for example, an ultrasonic motor, a step motor, a voice coil motor, or the like). As described above, although it is most preferable that the entire second lens group G2 is configured as a focusing lens group, a portion of the second lens group G2 may be configured as a focusing lens group. Moreover, although the focusing lens group may include one single lens and one cemented lens described above, the number of lenses is not particularly limited and the focusing lens group may include one or more lens components.

In the variable magnification optical system ZL, an entire arbitrary lens group or a partial lens group may be moved so as to have a component in the direction orthogonal to the optical axis or may be rotated (oscillated) in an in-plane direction including the optical axis so as to function as a vibration-reduction lens group that corrects image blur occurring due to camera shake or the like. As described above, it is most preferable that a portion of the fourth lens group G4 is configured as the vibration-reduction lens group. Moreover, although the vibration-reduction lens group may be constituted by one cemented lens as described above, the number of lenses is not particularly limited and the vibration-reduction lens group may be constituted by one single lens or a plurality of lens components. Moreover, the vibration-reduction lens group may have a positive refractive power and it is preferable that the entire fourth lens group G4 have a negative refractive power.

In the variable magnification optical system ZL, the lens surface may be formed as a spherical surface or a flat surface and may be formed as an aspherical surface. When the lens surface is a spherical surface or a flat surface, it is possible to facilitate lens processing, assembly, and adjustment and to prevent deterioration of optical performance resulting from errors in the processing, assembly and adjustment. Moreover, deterioration of the rendering performance is little even when the image plane is shifted. When the lens surface is an aspherical surface, the aspherical surface may be an aspherical surface obtained by grinding a glass-molded aspherical surface obtained by molding glass into an aspherical surface, or a composite aspherical surface obtained by forming a resin on the surface of glass into an aspherical shape. Moreover, the lens surface may be a diffraction surface and may be a refractive index distributed lens (a GRIN lens) or a plastic lens.

In the variable magnification optical system ZL, it is preferable that the aperture stop S be disposed in the fourth lens group G4 so as to be integrated with the 41st lens group G41. However, the aperture stop S may be configured so as to be movable separately from the 41st lens group G41. Moreover, the role of the aperture stop may be substituted by the frame of a lens without providing a separate member as the aperture stop.

In the variable magnification optical system ZL, each lens surface may be coated with an anti-reflection film which has high transmittance in a wide wavelength region in order to decrease flare and ghosting and achieve satisfactory optical performance with high contrast. The type of the anti-reflection film may be selected appropriately. Moreover, the number of anti-reflection films and the position thereof may be selected appropriately. In Examples 1 and 2, it is preferable that any one of the image-side surface of the lens L11, the object-side surface of the lens L12, the image-side surface of the lens L12, the image-side surface of the lens L13, and the object-side surface of the lens L14 of the first lens group G1 or a plurality of surfaces be coated with an anti-reflection film which has high transmittance in a wavelength region.

The variable magnification ratio (variable power ratio) of the variable magnification optical system ZL may be between approximately 1.5 and 2.5, for example. Moreover, the focal length (a value converted in terms of a 35-mm thick plate) in the wide-angle end state of the variable magnification optical system ZL may be between approximately 15 and 20 mm, for example. Moreover, the F-value in the wide-angle end state of the variable magnification optical system ZL may be between approximately 2.7 and 3.5, for example. Moreover, the F-value in the telephoto end state of the variable magnification optical system ZL may be between approximately 2.7 and 3.5, for example. Furthermore, when the focusing state of the variable magnification optical system ZL changes from the wide-angle end state to the telephoto end state, the F-value may be approximately constant (a variation is equal to or smaller than 10 percent of the F-value in the telephoto end state).

Figure 9:
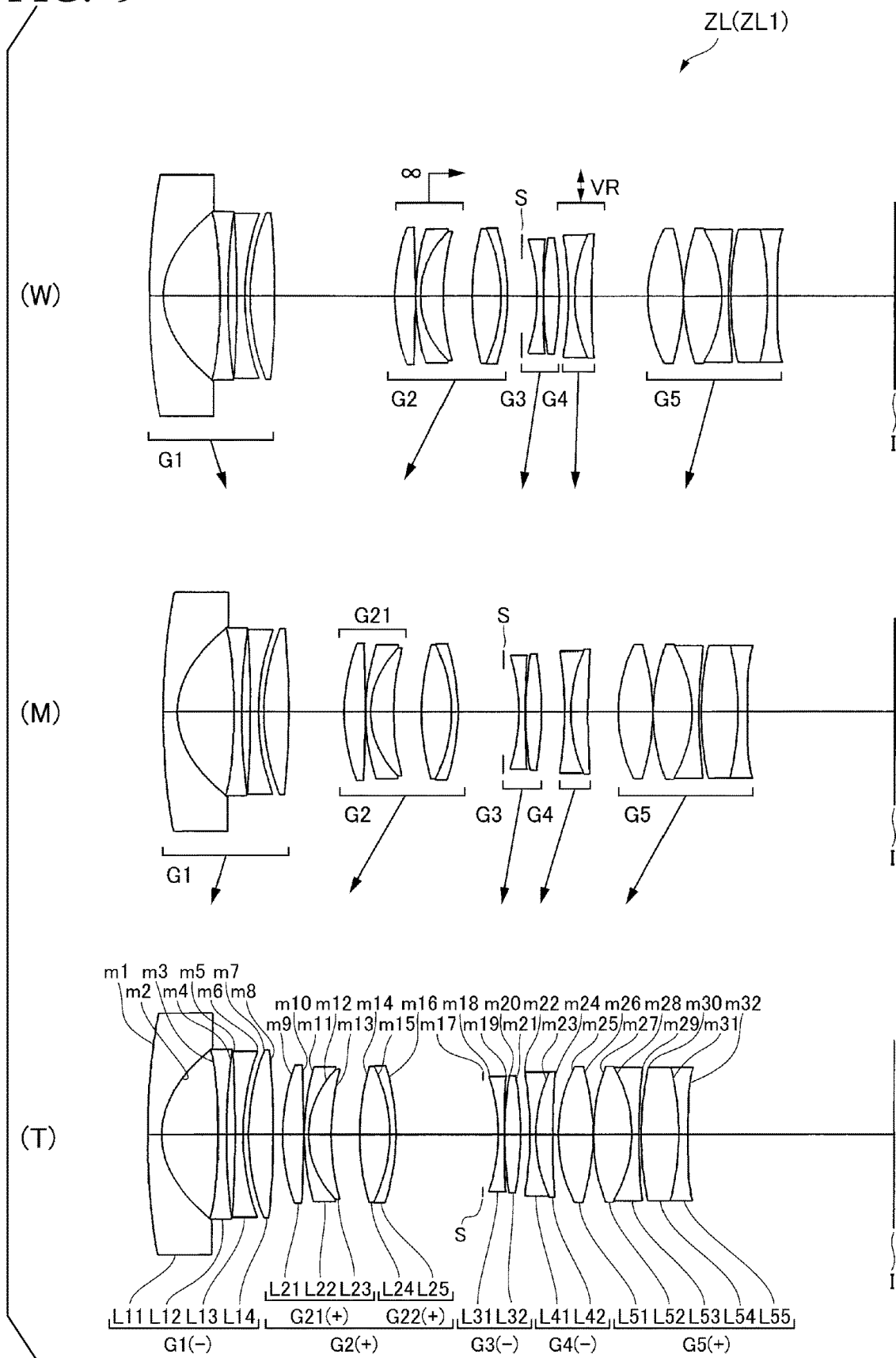
FIG. 9 is a cross-sectional view of a variable magnification optical system according to Example 3, wherein parts (W), (M), and (T) are in a wide-angle end state, an intermediate focal length state, and a telephoto end state, respectively.

Another embodiment will now be described with reference to the drawings. FIG. 9 illustrates an example of a configuration of a variable magnification optical system ZL. In other examples, the number of lens groups, a lens configuration of each lens group, and the like can be changed appropriately.

In an embodiment, a variable magnification optical system includes, in order from an object, a first lens group G1 having a negative refractive power, a second lens group G2 having a positive refractive power, a third lens group G3, a fourth lens group G4, and a fifth lens group G5 having a positive refractive power, the system performing varying magnification by changing the distance between the first and second lens groups G1 and G2, the distance between the second and third lens groups G2 and G3, the distance between the third and fourth lens groups G3 and G4, and the distance between the fourth and fifth lens groups G4 and G5, and at least a portion of the fourth lens group G4 is configured to be movable so as to have a component in the direction orthogonal to an optical axis. In an example, the fourth lens group G4 has a negative refractive power.

Alternatively, a variable magnification optical system ZL may include, in order from an object, a first lens group G1 having a negative refractive power, a second lens group G2 having a positive refractive power, a third lens group G3, a fourth lens group G4 having a negative refractive power, and a fifth lens group G5 having a positive refractive power, the system performing varying magnification by changing the distances between the respective lens groups, and at least a portion of the fourth lens group G4 may be configured to be movable so as to have a component in the direction orthogonal to an optical axis in order to correct image blur as a vibration-reduction lens group VR.

The variable magnification optical system has the first lens group G1 having a negative refractive power, the second lens group G2 having a positive refractive power, the third lens group G3, the fourth lens group G4 having a negative refractive power, and the fifth lens group G5 having a positive refractive power and changes the distances between the respective lens groups. Therefore, it is possible to implement a variable magnification optical system having a wide angle of view. Moreover, at least a portion of the fourth lens group G4 having a negative refractive power is moved so as to have a component in the direction orthogonal to the optical axis to perform image blur correction. Therefore, it is possible to suppress the occurrence of eccentric coma aberration (decentering coma aberration) and one-sided blur during image blur correction and to obtain satisfactory imaging performance.

The third lens group G3 may have a positive refractive power or a negative refractive power.

The fourth lens group G4 may include one or more lenses which are immovable during image blur correction in addition to the vibration-reduction lens group VR.

The variable magnification optical system ZL satisfies Conditional Expressions (5) and (6) below.

$$-0.400<(D34T-D34W)/(D23T-D23W)<1.000 \quad (5)$$

$$-0.400<f4/f3<0.450 \quad (6)$$

where

D34T: an air distance between the third and fourth lens groups G3 and G4 in a telephoto end state D34W: an air distance between the third and fourth lens groups G3 and G4 in a wide-angle end state D23T: an air distance between the second and third lens groups G2 and G3 in a telephoto end state D23W: an air distance between the second and third lens groups G2 and G3 in a wide-angle end state f4: a focal length of the fourth lens group G4 f3: a focal length of the third lens group G3

Conditional Expression (5) is a conditional expression for defining an appropriate ratio between a change in the distance between the third and fourth lens groups G3 and G4 and a change in the distance between the second and third lens groups G2 and G3 upon varying magnification from the wide-angle end state to the telephoto end state. When Conditional Expression (5) is satisfied, it is possible to obtain a bright F-value (approximately F2.8 to F3.5) and to satisfactorily correct various aberrations including spherical aberration while maintaining a varying magnification effect.

If the ratio exceeds the upper limit value of Conditional Expression (5), the ratio of a change in the distance between the third and fourth lens groups G3 and G4 to a change in the distance between the second and third lens groups G2 and G3 increases toward the positive side whereas the change in the distance between the second and third lens groups G2 and G3 decreases relatively, and the varying magnification effect decreases. As a result, it is difficult to secure a variable magnification ratio and a wide angle of view.

In order to obtain the effect reliably, it is preferable that the upper limit value of Conditional Expression (5) be set to 0.800. In order to obtain the effect more reliably, it is preferable that the upper limit value of Conditional Expression (5) be set to 0.600.

If the ratio is smaller than the lower limit value of Conditional Expression (5), the ratio of a change in the distance between the third and fourth lens groups G3 and G4 to a change in the distance between the second and third lens groups G2 and G3 increases toward the negative side whereas the change in the distance between the second and third lens groups G2 and G3 decreases relatively, and the varying magnification effect decreases. As a result, it is difficult to secure a variable magnification ratio and a wide angle of view.

In order to obtain the effect reliably, it is preferable that the lower limit value of Conditional Expression (5) be set to −0.300. In order to obtain the effect more reliably, it is preferable that the lower limit value of Conditional Expression (5) be set to −0.200.

Conditional Expression (6) is a conditional expression for defining an appropriate focal length ratio between the fourth and third lens groups G4 and G3. When Conditional Expression (6) is satisfied, it is possible to control a moving distance of the fourth lens group G4 moved during image blur correction appropriately while obtaining satisfactory imaging performance during image blur correction.

If the focal length ratio exceeds the upper limit value of Conditional Expression (6), the negative refractive power of the third lens group G3 increases, the negative refractive power of the fourth lens group G4 decreases, and the moving distance of the fourth lens group G4 moved during image blur correction increases. As a result, the size of an image blur correction mechanism is increased and the size of the entire lens is increased.

In order to obtain the effect reliably, it is preferable that the upper limit value of Conditional Expression (6) be set to 0.400. In order to obtain the effect more reliably, it is preferable that the upper limit value of Conditional Expression (6) be set to 0.350.

If the focal length ratio is smaller than the lower limit value of Conditional Expression (6), the positive refractive power of the third lens group G3 increases, the negative refractive power of the fourth lens group G4 increases, and the occurrence of eccentric aberration when the fourth lens group G4 is moved so as to have a component in the direction orthogonal to the optical axis during image blur correction increases. As a result, the occurrence of one-sided blur or eccentric coma aberration occurring during image blur correction increases, and it is difficult to maintain satisfactory imaging performance.

In order to obtain the effect reliably, it is preferable that the lower limit value of Conditional Expression (6) be set to −0.350. In order to obtain the effect more reliably, it is preferable that the lower limit value of Conditional Expression (6) be set to −0.300.

Preferably, the variable magnification optical system ZL satisfies Conditional Expression (7) below.

$$0.200 < f1/f4 < 0.900 \quad (7)$$

where f1: a focal length of the first lens group G1

Conditional Expression (7) is a conditional expression for satisfactorily correcting curvature of field and coma aberration while obtaining a wide angle of view (a half-angle of view of approximately 50° or more) in the wide-angle end state.

If the focal length ratio exceeds the upper limit value of Conditional Expression (7), the focal length of the first lens group G1 is increased and it is difficult to obtain a wide angle of view (a half-angle of view of approximately 50° or more) in the wide-angle end state. In some cases, a total length and a lens diameter of the first lens group G1 are increased undesirably.

In order to obtain the effect reliably, it is preferable that the upper limit value of Conditional Expression (7) be set to 0.800. In order to obtain the effect more reliably, it is preferable that the upper limit value of Conditional Expression (7) be set to 0.700.

If the focal length ratio is smaller than the lower limit value of Conditional Expression (7), the focal length of the first lens group G1 is decreased and it is difficult to correct curvature of field and coma aberration and to obtain satisfactory imaging performance.

In order to obtain the effect reliably, it is preferable that the lower limit value of Conditional Expression (7) be set to 0.250. In order to obtain the effect more reliably, it is preferable that the lower limit value of Conditional Expression (7) be set to 0.300.

In the variable magnification optical system ZL, it is preferable that the third lens group G3 have a negative lens and a positive lens.

According to this configuration, it is possible to effectively correct eccentric coma aberration and one-sided blur when the fourth lens group G4 is moved to perform image blur correction. Moreover, it is possible to effectively correct various aberrations including spherical aberration and astigmatism upon varying magnification.

In the variable magnification optical system ZL, it is preferable that the fourth lens group G4 be constituted by a cemented lens including a positive lens and a negative lens.

According to this configuration, it is possible to effectively correct eccentric coma aberration and one-sided blur when the fourth lens group G4 is moved to perform image blur correction. Moreover, it is possible to decrease the size and the weight of a lens that moves for image blur correction and to effectively decrease the size of an image blur correction mechanism and the entire lens.

The fourth lens group G4 may include two lenses (separated from a bonding surface) instead of bonding a positive lens and a negative lens as described above.

In the variable magnification optical system ZL, it is preferable that the lens surface closest to an image, of the fourth lens group G4 be an aspherical surface.

According to this configuration, it is possible to effectively correct eccentric coma aberration and one-sided blur when the fourth lens group G4 is moved to perform image blur correction.

Preferably, the variable magnification optical system ZL satisfies Conditional Expression (8) below.

$$1.100 < A(T3.5)/A(T4.0) < 5.000 \quad (8)$$

where

A(T3.5): an asphericity at a point on the aspherical surface where light corresponding to F-value of 3.5 passes through the aspherical surface in a telephoto end state A(T4.0): an asphericity at a point on the aspherical surface where light corresponding to F-value of 4.0 passes through the aspherical surface in a telephoto end state The asphericity refers to an amount of sag, with respect to an approximately spherical surface, in the aspherical surface along the optical axis.

Conditional Expression (8) is a Conditional Expression for defining an appropriate value of the asphericity of the aspherical surface closest to an image, of the fourth lens group G4. When Conditional Expression (8) is satisfied, it is possible to satisfactorily correct one-sided blur and eccentric coma aberration when the fourth lens group G4 is moved to perform image blur correction.

When the asphericity ratio exceeds the upper limit value of Conditional Expression (8), the asphericity of the fourth lens group G4 becomes too large and it is difficult to correct one-sided blur and eccentric coma aberration when the fourth lens group G4 is moved to perform image blur correction.

In order to obtain the effect reliably, it is preferable that the upper limit value of Conditional Expression (8) be set to 4.000. In order to obtain the effect more reliably, it is preferable that the upper limit value of Conditional Expression (8) be set to 3.000.

When the asphericity ratio is smaller than the lower limit value of Conditional Expression (8), the asphericity of the fourth lens group G4 is insufficient and it is difficult to correct one-sided blur and eccentric coma aberration when the fourth lens group G4 is moved to perform image blur correction.

In order to obtain the effect reliably, it is preferable that the lower limit value of Conditional Expression (8) be set to 1.250. In order to obtain the effect more reliably, it is preferable that the lower limit value of Conditional Expression (8) be set to 1.400.

In the variable magnification optical system ZL, it is preferable that the third lens group G3 be immovable in relation to the image plane upon varying magnification similarly to Example 4 to be described later, for example.

According to this configuration, it is possible to simplify a varying magnification mechanism and to effectively decrease the size and the cost and to secure an imaging performance due to a reduced eccentric error. Moreover, this effect is significant when a diaphragm is integrated with the third lens group G3.

In the variable magnification optical system ZL, it is preferable that the fourth lens group G4 be immovable in relation to the image plane upon varying magnification similarly to Example 5 to be described later, for example.

According to this configuration, it is possible to simplify a varying magnification mechanism and to effectively decrease the size and the cost. Moreover, since the fourth lens group G4 is a vibration-reduction lens group VR, it is not necessary to move an image blur correction mechanism in the optical axis direction and it is possible to particularly effectively reduce the entire lens size.

In the variable magnification optical system ZL, it is preferable that focusing be performed by moving the second lens group G2 in the optical axis direction as a focusing lens group.

According to this configuration, it is possible to decrease the size and the weight of a focusing lens group and to decrease the size of an entire lens system and to increase a focusing speed during autofocus.

In this way, it is possible to implement the variable magnification optical system ZL which has a bright F-value and a wide angle of view and in which various aberrations are corrected satisfactorily.

The above-described variable magnification optical system ZL may be included in the camera (an optical apparatus) illustrated in FIG. 33.

As can be understood from respective examples to be described later, the variable magnification optical system ZL mounted on the camera 1 as the image capturing lens 2 has a bright F-value and a wide angle of view and has a satisfactory optical performance such that various aberrations are corrected satisfactorily due to its characteristic lens configuration. Therefore, according to the camera 1, it is possible to implement an optical apparatus which has a bright F-value and a wide angle of view and has a satisfactory optical performance such that various aberrations are corrected satisfactorily.

Although a mirrorless camera has been described as an example of the camera 1, the camera is not limited to this. For example, the same effect as the camera 1 can be obtained even when the above-described variable magnification optical system ZL is mounted on a single-lens reflex camera which has a quick return mirror on a camera body and views a subject using a finder optical system.

Figure 36:
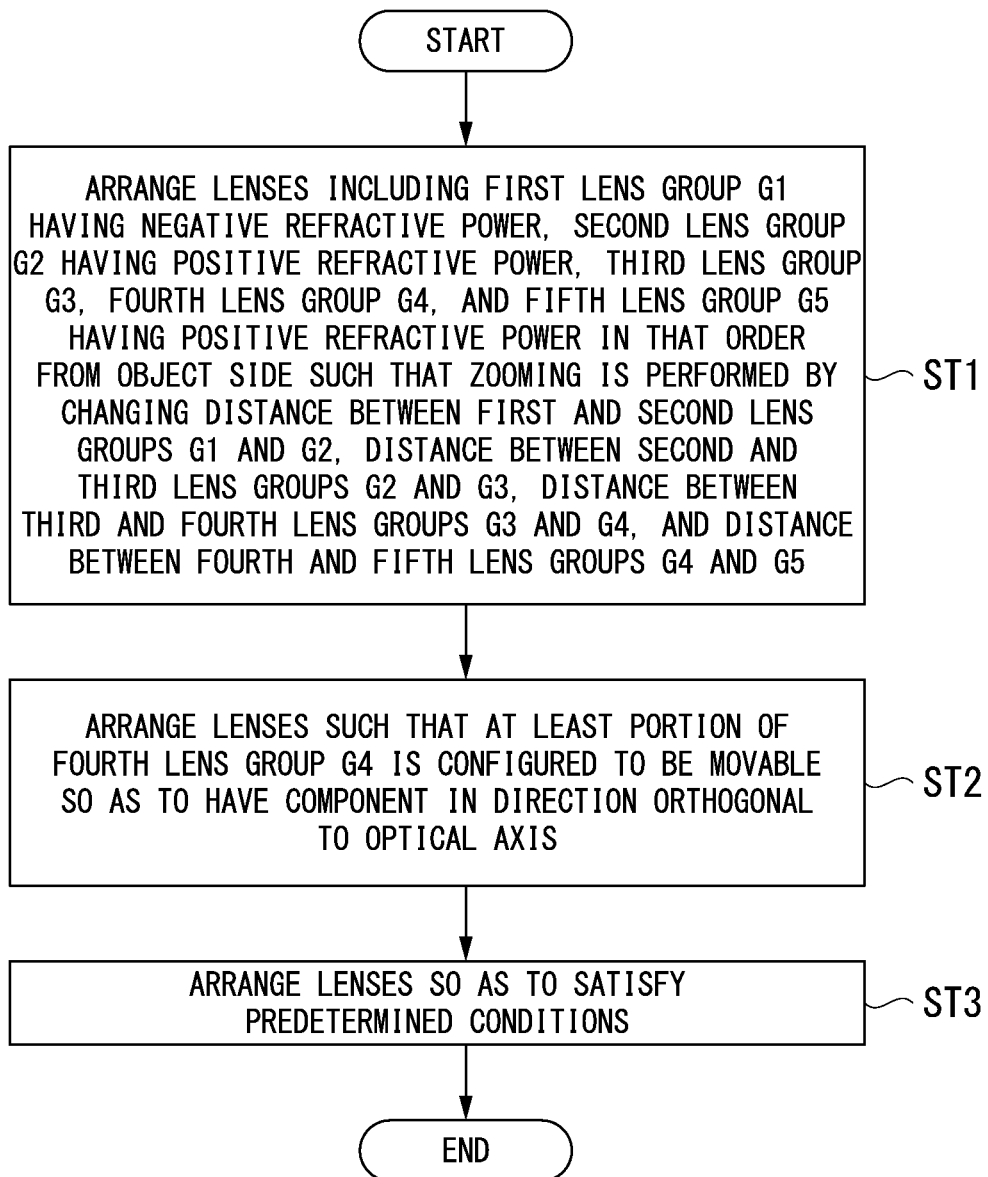
FIG. 36 is a diagram illustrating an outline of another example of a method for manufacturing a variable magnification optical system.
Figure 37:
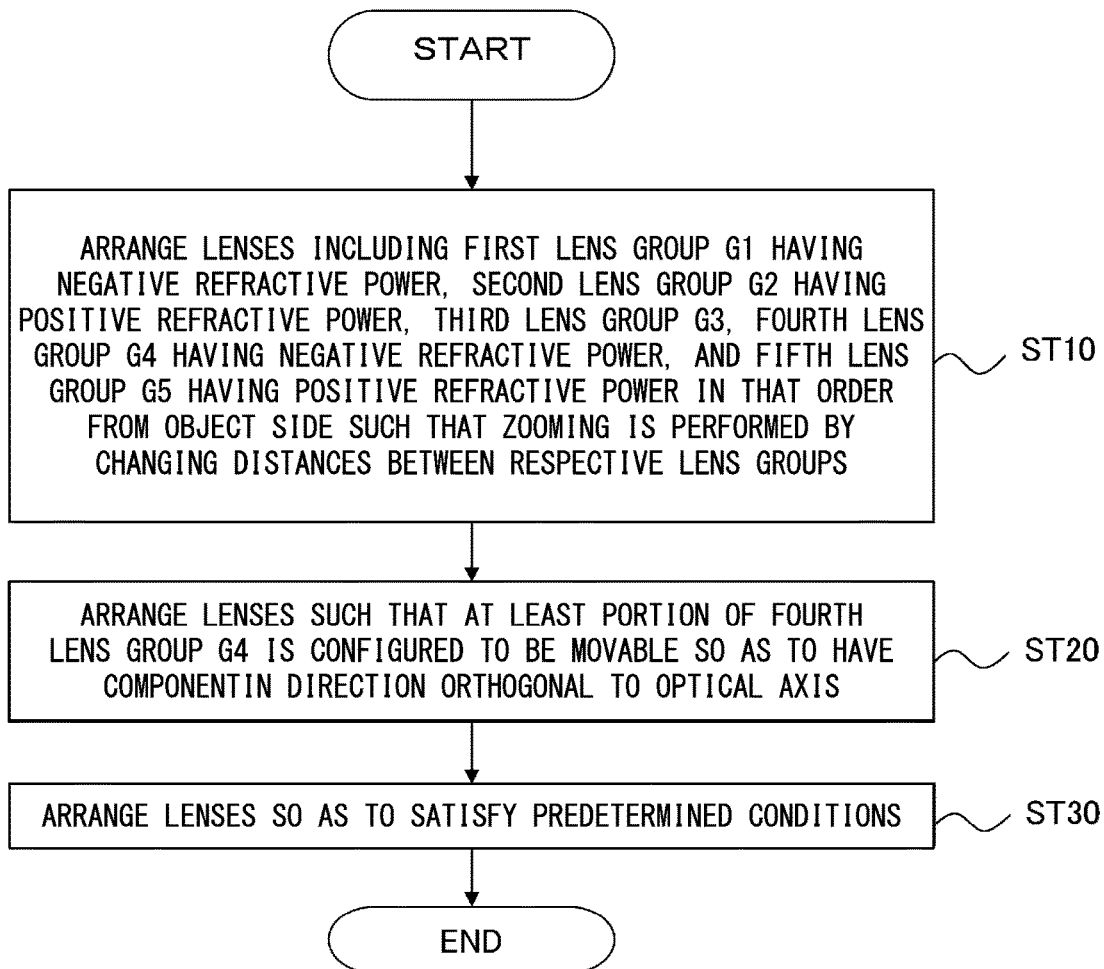
FIG. 37 is a diagram illustrating an outline of another example of a method for manufacturing a variable magnification optical system.

Next, an example of a method for manufacturing the above-described variable magnification optical system ZL will be described. FIGS. 36 and 37 illustrate an example of a method for manufacturing the variable magnification optical system ZL.

In the example illustrated in FIG. 36, first, respective lenses including a first lens group G1 having a negative refractive power; a second lens group G2 having a positive refractive power; a third lens group G3; a fourth lens group G4; and a fifth lens group G5 having a positive refractive power are arranged, in order from an object, in a lens barrel such that varying magnification is performed by changing the distance between the first and second lens groups G1 and G2, the distance between the second and third lens groups G2 and G3, the distance between the third and fourth lens groups G3 and G4, and the distance between the fourth and fifth lens groups G4 and G5 (step ST1). The respective lenses are arranged such that at least a portion of the fourth lens group G4 is configured to be movable so as to have a component in the direction orthogonal to the optical axis (step ST2). The respective lenses are arranged so as to satisfy Conditional Expressions (5) and (6) below (step ST3).

$$-0.400<(D34T-D34W)/(D23T-D23W)<1.000 \quad (5)$$

$$-0.400<f4/f3<0.450 \quad (6)$$

where
D34T: an air distance between the third and fourth lens groups G3 and G4 in a telephoto end state
D34W: an air distance between the third and fourth lens groups G3 and G4 in a wide-angle end state
D23T: an air distance between the second and third lens groups G2 and G3 in a telephoto end state
D23W: an air distance between the second and third lens groups G2 and G3 in a wide-angle end state
f4: a focal length of the fourth lens group G4
f3: a focal length of the third lens group G3

In the example illustrated in FIG. 37, first, respective lenses including a first lens group G1 having a negative refractive power, a second lens group G2 having a positive refractive power, a third lens group G3, a fourth lens group G4 having a negative refractive power, and a fifth lens group G5 having a positive refractive power are arranged, in order from an object, in a lens barrel such that varying magnification is performed by changing the distances between the respective lens groups (step ST10). The respective lenses are arranged such that at least a portion of the fourth lens group G4 is configured to be movable so as to have a component in the direction orthogonal to the optical axis in order to correct image blur (step ST20). The respective lenses are arranged so as to satisfy Conditional Expressions (5) and (6) below (step ST30).

$$-0.400<(D34T-D34W)/(D23T-D23W)<1.000 \quad (5)$$

$$-0.400<f4/f3<0.450 \quad (6)$$

where
D34T: an air distance between the third and fourth lens groups G3 and G4 in a telephoto end state
D34W: an air distance between the third and fourth lens groups G3 and G4 in a wide-angle end state
D23T: an air distance between the second and third lens groups G2 and G3 in a telephoto end state
D23W: an air distance between the second and third lens groups G2 and G3 in a wide-angle end state
f4: a focal length of the fourth lens group G4
f3: a focal length of the third lens group G3

According to an example of a lens arrangement, as illustrated in FIG. 9, a negative meniscus lens L11 having a concave surface oriented toward an image side, a biconcave lens L12, a biconcave lens L13, and a biconvex lens L14 are arranged, in order from the object, to form the first lens group G1. A biconvex lens L21, a cemented lens including a negative meniscus lens L22 having a concave surface oriented toward the image side and a positive meniscus lens L23 having a convex surface oriented toward the object side and a cemented lens including a biconvex lens L24 and a negative meniscus lens L25 having a concave surface oriented toward the object side are arranged, in order from the object, to form the second lens group G2. A biconcave lens L31 and a biconvex lens L32 are arranged, in order from the object, to form the third lens group G3. A cemented lens including a biconcave lens L41 and a positive meniscus lens L42 having a convex surface oriented toward the object side arranged in order from the object forms the fourth lens group G4. A biconvex lens L51, a cemented lens including a biconvex lens L52 and a biconcave lens L53, a biconvex lens L54, and a biconcave lens L55 are arranged, in order from the object, to form the fifth lens group G5. The respective lens groups prepared in this manner are arranged in the above-described order to manufacture the variable magnification optical system ZL.

According to the above-described manufacturing method, it is possible to manufacture the variable magnification optical system ZL which has a bright F-value and a wide angle of view and in which various aberrations are corrected satisfactorily.

Hereinafter, respective examples will be described with reference to the drawings.

Figure 13:
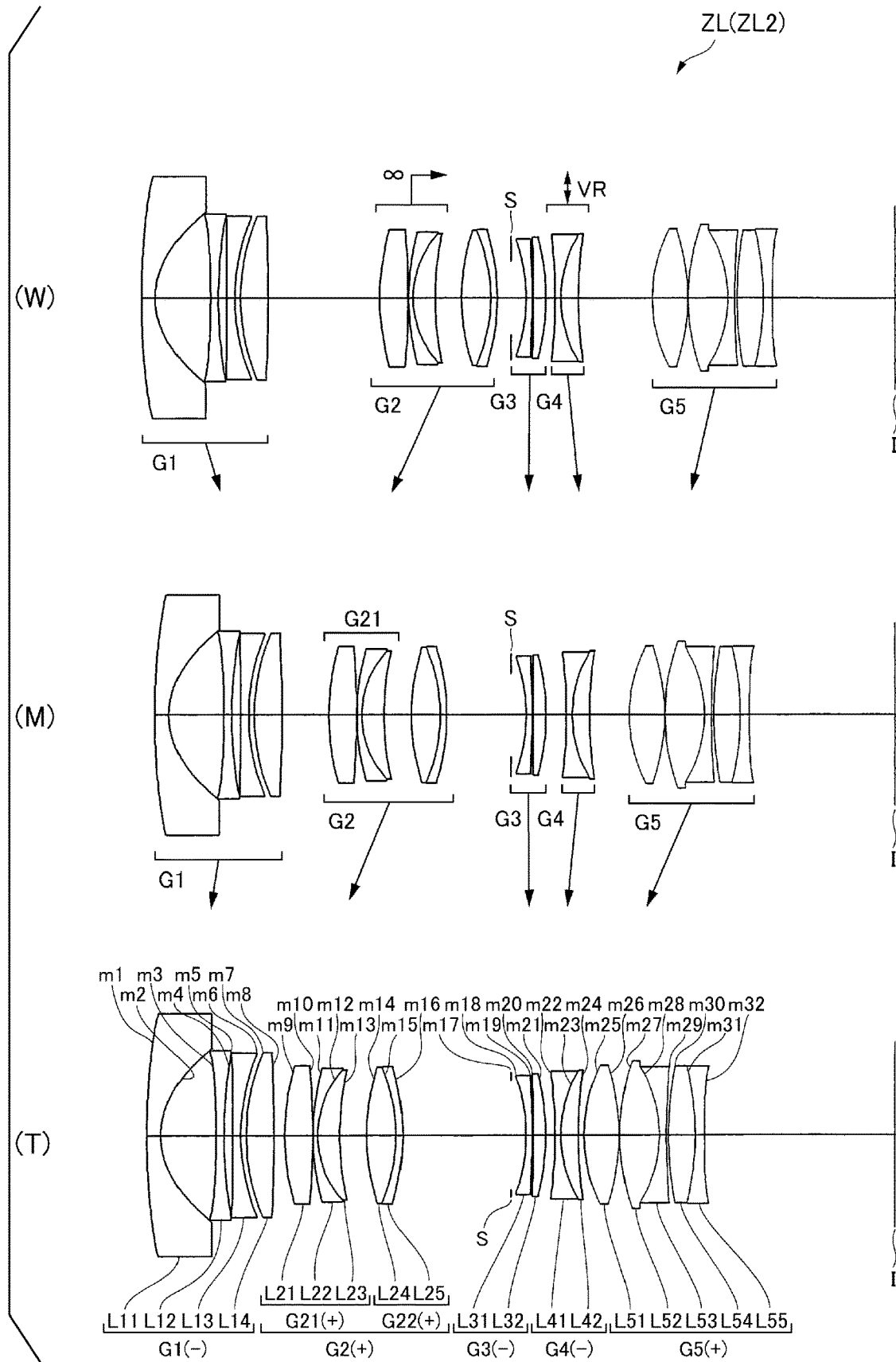
FIG. 13 is a cross-sectional views of a variable magnification optical system according to Example 4, wherein parts (W), (M), and (T) are in a wide-angle end state, an intermediate focal length state, and a telephoto end state, respectively.
Figure 17:
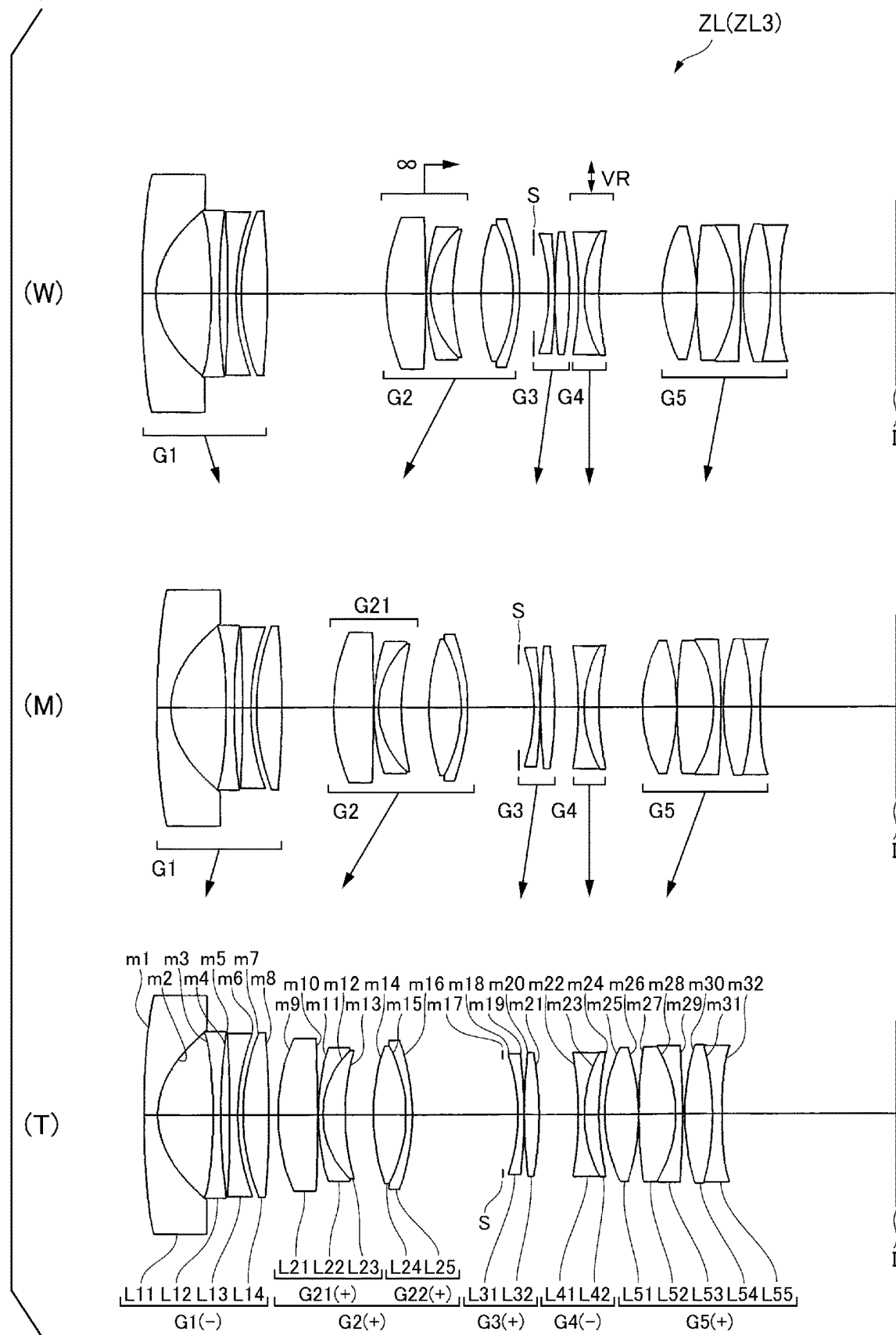
FIG. 17 is a cross-sectional view of a variable magnification optical system according to Example 5, wherein parts (W), (M), and (T) are in a wide-angle end state, an intermediate focal length state, and a telephoto end state, respectively.

FIGS. 9, 13, and 17 are cross-sectional views illustrating the configuration and the refractive power allocation of variable magnification optical systems ZL (ZL1 to ZL3) according to respective examples. In the lower part of the cross-sectional views of the variable magnification optical systems ZL1 to ZL3, the moving directions along the optical axis of each lens group upon varying magnification from the wide-angle end state (W) to the telephoto end state (T) via the intermediate focal length state (M) are indicated by arrows. In the upper part of the cross-sectional views of the variable magnification optical systems ZL1 to ZL3, the moving direction of the focusing lens group upon focusing from an object at infinity to an object at a close distance is indicated by an arrow and the state of the vibration-reduction lens group VR when correcting image blur is also illustrated.

Respective reference symbols in FIG. 9 associated with Example 3 are used independently in respective examples in order to avoid complication of description due to an increased number of reference symbol characters. Therefore, even when components in diagrams associated with other examples are denoted by the same reference symbols as used in FIG. 9, these components do not necessarily have the same configuration as those of other examples.

Tables 3 to 5 illustrated below are tables of respective specifications of Examples 3 to 5.

In the respective examples, the d-line (wavelength: 587.562 nm) and the g-line (wavelength: 435.835 nm) are selected as an aberration characteristics calculation target.

In [Lens Specification] in tables, a surface number indicates a sequence number of an optical surface from an object side along a traveling direction of light, R indicates a radius of curvature of each optical surface, D indicates a surface distance which is the distance on the optical axis from each optical surface to the next optical surface (or an image plane), nd indicates a refractive index for the d-line, of a material of an optical member, and vd indicates the Abbe number for the d-line, of a material of an optical member. Moreover, Di indicates a surface distance between an i-th surface and an (i+1)th surface and Aperture stop indicates an aperture stop S. When the optical surface is an aspherical surface, a mark "*" is assigned to the surface number and a paraxial radius of curvature is shown in the radius of curvature column R.

In [Aspheric Data] in tables, the shape of an aspherical surface shown in [Lens Specification] is expressed by Equation (a) below. X(y) indicates the distance along the optical axis direction from a tangential plane at the vertex of an aspherical surface to a position on the aspherical surface at a height y, R indicates a radius of curvature (a paraxial radius of curvature) of a reference spherical surface, κ indicates a conic constant, and Ai indicates an aspheric coefficient at degree i. "E-n" indicates "$\times 10^{-n}$". For example, 1.234E−05=$1.234 \times 10^{-5}$. An aspheric coefficient A2 at degree 2 is 0 and is not illustrated.

$$X(y)=(y^2/R)/\{1+(1-\kappa \times y^2/R^2)^{1/2}\}+A4 \times y^4+A6 \times y^6+A8 \times y^8+A10 \times y^{10} \quad (a)$$

In [Various Data] in tables, f indicates a focal length of an entire lens system, FNo indicates the F-number, ω indicates a half-angle of view (unit: °), Y indicates the maximum image height, BF indicates the distance (an air-conversion length) from the last lens surface to the image plane I on the optical axis upon focusing on an object at infinity, and TL indicates the sum of BF and the distance from the frontmost lens surface to the last lens surface on the optical axis upon focusing on an object at infinity.

In [Variable Distance Data] in tables, Di indicates a surface distance between an i-th surface and an (i+1)th surface, D0 indicates an axial air distance between an object plane and a lens surface closest to an object, of the first lens group G1, f indicates the focal length of an entire lens system, and β indicates an imaging magnification.

In [Lens Group Data] in tables, the starting surface and the focal length of the lens groups are shown.

In [Conditional Expression Correspondence Values] in tables, values corresponding to Conditional Expressions (5) to (8) are illustrated.

Hereinafter, "mm" is generally used as the unit of the focal length f, the radius of curvature R, the surface distance D, and other lengths and the like described in all specification values unless particularly stated otherwise. However, the unit is not limited to this since an equivalent optical performance is obtained even when the optical system is proportionally expanded or reduced. Moreover, the unit is not limited to "mm" and other appropriate units may be used.

The above description of tables is common to all examples, and description thereof will not be provided below.

Example 3

Example 3 will be described with reference to FIGS. 9 to 12 and Table 3. As illustrated in FIG. 9, a variable magnification optical system ZL (ZL1) according to Example 3 is constituted by, in order from an object, a first lens group G1 having a negative refractive power; a second lens group G2 having a positive refractive power; a third lens group G3 having a negative refractive power; a fourth lens group G4 having a negative refractive power; and a fifth lens group G5 having a positive refractive power.

The first lens group G1 is constituted by, in order from the object, a negative meniscus lens L11 having a concave surface oriented toward an image side, a biconcave lens L12, a biconcave lens L13, and a biconvex lens L14. The negative meniscus lens L11 has an aspherical surface on both sides thereof. Moreover, the biconcave lens L12 has an aspherical object-side surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by a cemented lens, in order from the object, including a biconvex lens L24 and a negative meniscus lens L25 having a concave surface oriented toward the object side.

The third lens group G3 is constituted by, in order from the object, a biconcave lens L31 and a biconvex lens L32.

The fourth lens group G4 is constituted by a cemented lens including, in order from the object, a biconcave lens L41 and a positive meniscus lens L42 having a convex surface oriented toward the object side. The positive meniscus lens L42 has an aspherical image-side surface.

The fifth lens group G5 is constituted by, in order from the object, a biconvex lens L51, a cemented lens including a biconvex lens L52 and a biconcave lens L53, and a cemented lens including a biconvex lens L54 and a biconcave lens L55. The biconcave lens L55 has an aspherical image-side surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the same toward the object side, moving the second lens group G2 toward the object side, moving the third lens group G3 toward the object side, moving the fourth lens group G4 toward the object side, and moving the fifth lens group G5 toward the object side such that the distances between the respective lens groups (the distance between the first and second lens groups G1 and G2, the distance between the second and third lens groups G2 and G3, the distance between the third and fourth lens groups G3 and G4, and the distance between the fourth and fifth lens groups G4 and G5) are changed. The aperture stop S is moved toward the object side integrally with the third lens group G3.

Focusing from an object at infinity to an object at a close distance is performed by moving the 21st lens group G21 toward the image side.

When image blur occurs, image blur correction (vibration reduction) on the image plane I is performed by moving the fourth lens group G4 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 3, in the wide-angle end state, since the vibration reduction coefficient is −0.64 and the focal length is 16.40 mm, the moving distance of the vibration-reduction lens group VR for correcting the rotation blur of 0.81° is −0.36 mm. In the intermediate focal length state, since the vibration reduction coefficient is −0.74 and the focal length is 23.50 mm, the moving distance of the vibration-reduction lens group VR for correcting the rotation blur of 0.68° is −0.38 mm. In the telephoto end state, since the vibration reduction coefficient is −0.95 and the focal length is 34.00 mm, the moving distance of the vibration-reduction lens group VR for correcting the rotation blur of 0.57° is −0.35 mm.

Table 3 illustrates the values of respective specifications of Example 3. Surface numbers 1 to 32 in Table 3 correspond to optical surfaces of m1 to m32 illustrated in FIG. 9.

TABLE 3

[Lens Specification]

| Surface number | R | D | nd | vd |
| --- | --- | --- | --- | --- |
| *1 | 168.38636 | 3.000 | 1.76690 | 46.9 |
| *2 | 16.71640 | 12.168 | 1.00000 | |
| *3 | −132.14592 | 1.700 | 1.76690 | 46.9 |
| 4 | 134.95206 | 1.900 | 1.00000 | |
| 5 | −243.29246 | 1.700 | 1.49700 | 81.7 |
| 6 | 51.76998 | 1.200 | 1.00000 | |
| 7 | 49.16596 | 5.282 | 1.75520 | 27.6 |
| 8 | −184.55701 | (D8) | 1.00000 | |
| 9 | 42.28900 | 4.491 | 1.64769 | 33.7 |
| 10 | −283.89703 | 0.100 | 1.00000 | |
| 11 | 49.70559 | 0.999 | 1.84666 | 23.8 |
| 12 | 19.12296 | 4.835 | 1.60342 | 38.0 |
| 13 | 52.76752 | (D13) | 1.00000 | |
| 14 | 53.11057 | 6.255 | 1.49700 | 81.7 |
| 15 | −33.51166 | 1.400 | 1.84666 | 23.8 |
| 16 | −47.05744 | (D16) | 1.00000 | |
| 17 | (Aperture stop) | 3.263 | 1.00000 | |
| 18 | −39.36811 | 1.300 | 1.90366 | 31.3 |
| 19 | 217.23501 | 0.099 | 1.00000 | |
| 20 | 80.07138 | 3.361 | 1.84666 | 23.8 |
| 21 | −72.96748 | (D21) | 1.00000 | |
| 22 | −75.94681 | 1.300 | 1.80400 | 46.6 |
| 23 | 32.26272 | 3.644 | 1.80518 | 25.4 |
| *24 | 182.89657 | (D24) | 1.00000 | |
| 25 | 31.94239 | 7.389 | 1.49700 | 81.7 |
| 26 | −48.60077 | 0.100 | 1.00000 | |
| 27 | 41.92922 | 8.209 | 1.49700 | 81.7 |
| 28 | −28.00000 | 1.500 | 1.74950 | 35.2 |
| 29 | 117.62625 | 0.518 | 1.00000 | |
| 30 | 67.34233 | 7.882 | 1.49700 | 81.7 |
| 31 | −60.00000 | 2.000 | 1.80610 | 41.0 |
| *32 | 468.65935 | (D32) | 1.00000 | |

[Aspheric Data]

| Surface | κ | A4 | A6 | A8 | A10 |
| --- | --- | --- | --- | --- | --- |
| 1 | 1.00000e+00 | 1.93012e−06 | −2.42361e−09 | −3.50001e−12 | 6.82597e−15 |
| 2 | 0.00000e+00 | 9.23814e−06 | −3.45504e−09 | 9.54947e−11 | −3.15535e−13 |
| 3 | 1.00000e+00 | −2.60282e−06 | −3.46987e−09 | 5.33701e−11 | −2.20299e−13 |
| 24 | 1.00000e+00 | −1.37016e−06 | −1.51547e−09 | 2.18954e−11 | −6.25589e−14 |
| 32 | 1.00000e+00 | 1.88211e−05 | 1.24803e−08 | 1.76466e−11 | 3.26274e−14 |

TABLE 3-continued

[Various Data]

|  | W | M | T |
|---|---|---|---|
| f | 16.40 | 23.50 | 34.00 |
| FNo | 2.88 | 2.85 | 2.87 |
| ω | 54.0 | 39.8 | 29.5 |
| Y | 20.00 | 20.00 | 20.00 |
| TL | 159.620 | 156.503 | 159.635 |
| BF | 25.339 | 31.627 | 44.226 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 340.38 | 343.50 | 340.37 |
| β | — | — | — | −0.0451 | −0.0643 | −0.0942 |
| f | 16.40 | 23.50 | 34.00 | — | — | — |
| D8 | 25.600 | 11.916 | 2.000 | 27.194 | 13.664 | 3.990 |
| D13 | 6.085 | 6.085 | 6.085 | 4.491 | 4.337 | 4.095 |
| D16 | 3.000 | 9.806 | 18.528 | 3.000 | 9.806 | 18.528 |
| D21 | 2.000 | 5.039 | 2.000 | 2.000 | 5.039 | 2.000 |
| D24 | 12.000 | 6.434 | 1.200 | 12.000 | 6.434 | 1.200 |
| D32 | 25.339 | 31.627 | 44.226 | 25.339 | 31.627 | 44.226 |

[Lens Group Data]

| Lens group | Starting surface | Focal distance |
|---|---|---|
| 1st lens group | 1 | −23.62 |
| 2nd lens group | 9 | 40.58 |
| 21st lens group | 9 | 84.14 |
| 22nd lens group | 14 | 60.13 |
| 3rd lens group | 17 | −235.40 |
| 4th lens group | 22 | −66.32 |
| 5th lens group | 25 | 37.85 |

[Conditional Expression Correspondence Values]

| | |
|---|---|
| Conditional Expression (5) | (D34T−D34W)/(D23T−D23W) = 0.000 |
| Conditional Expression (6) | f4/f3 = 0.282 |
| Conditional Expression (7) | f1/f4 = 0.356 |
| Conditional Expression (8) | A(T3.5)/A(T4.0) = 1.736 |
| | (A(T3.5) = −0.0112, A(T4.0) = −0.0065) |

It can be understood from Table 3 that the variable magnification optical system ZL1 according to Example 3 satisfies Conditional Expressions (5) to (8).

Figure 10:
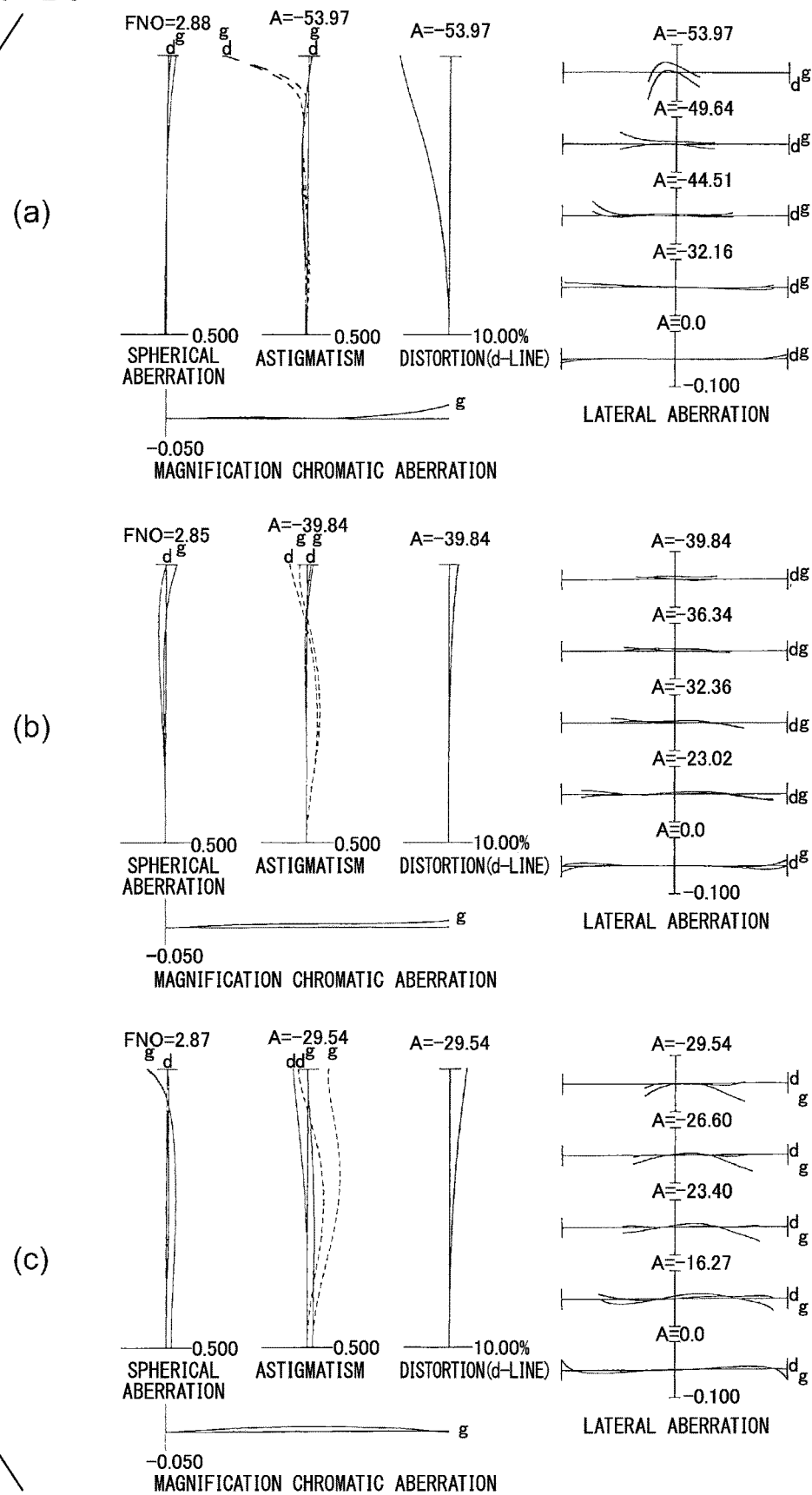
FIG. 10 shows graphs illustrating various aberrations of the variable magnification optical system according to Example 3 upon focusing on an object at infinity, wherein parts (a), (b), and (c) are in the wide-angle end state, the intermediate focal length state, and the telephoto end state, respectively.
Figure 11:
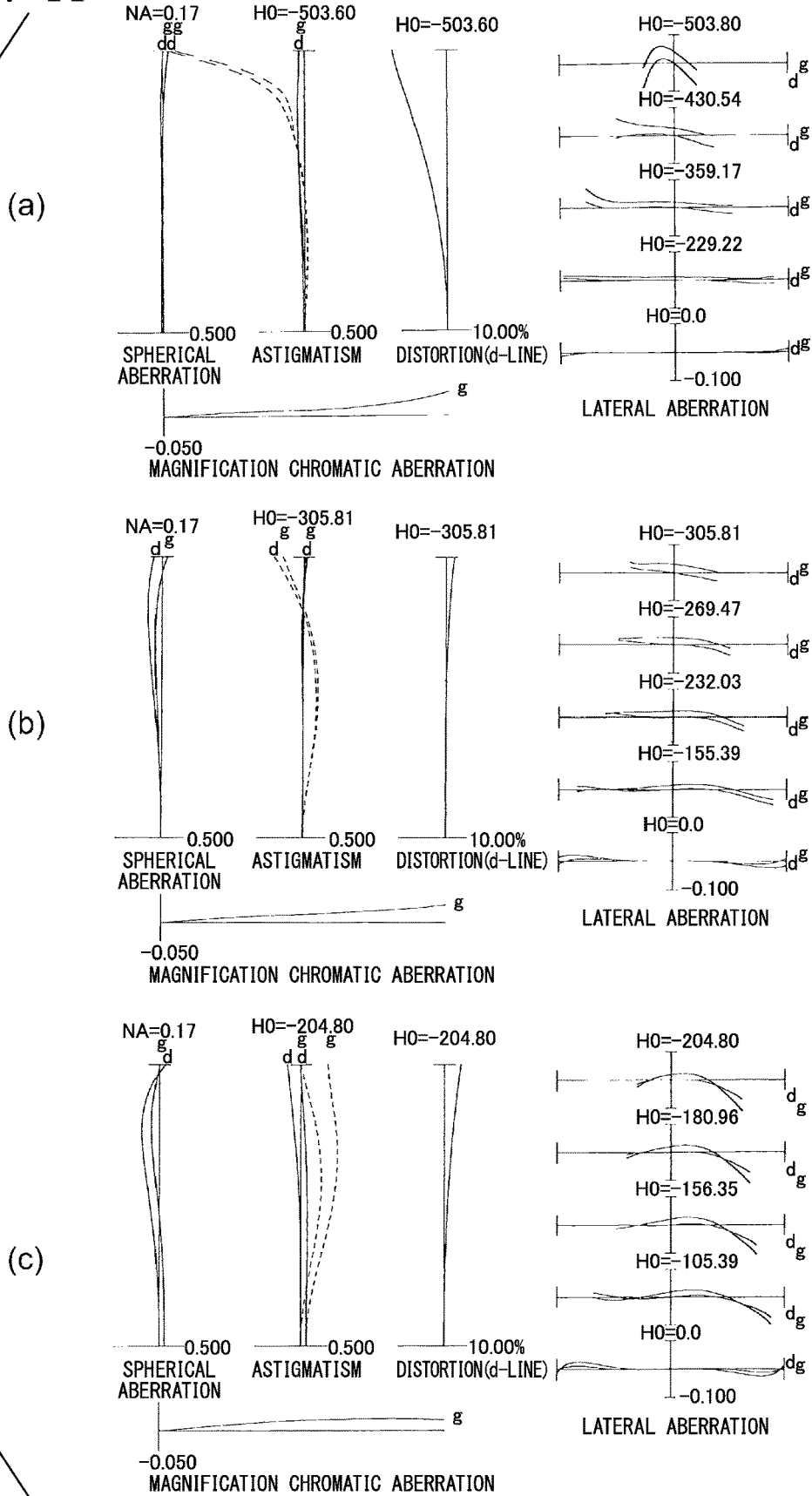
FIG. 11 shows graphs illustrating various aberrations of the variable magnification optical system according to Example 3 upon focusing on an object at a close point, wherein parts (a), (b), and (c) are in the wide-angle end state, the intermediate focal length state, and the telephoto end state, respectively.

FIG. 10 shows graphs illustrating various aberrations (spherical aberration, astigmatism, distortion, magnification chromatic aberration, and lateral aberration) upon focusing on an object at infinity, of the variable magnification optical system ZL1 according to Example 3, in which part (a) illustrates the wide-angle end state, part (b) illustrates the intermediate focal length state, and part (c) illustrates the telephoto end state. FIG. 11 shows graphs illustrating various aberrations (spherical aberration, astigmatism, distortion, magnification chromatic aberration, and lateral aberration) upon focusing on an object at a close point, of the variable magnification optical system ZL1 according to Example 3, in which part (a) illustrates the wide-angle end state, part (b) illustrates the intermediate focal length state, and part (c) illustrates the telephoto end state. FIG. 12 shows graphs illustrating lateral aberration of the variable magnification optical system ZL1 according to Example 3 when image blur correction is performed upon focusing on an object at infinity, in which part (a) illustrates the wide-angle end state, part (b) illustrates the intermediate focal length state, and part (c) illustrates the telephoto end state.

In the graphs illustrating respective aberrations, FNO indicates the F-number, NA indicates a numerical aperture, A indicates a half-angle of view (unit: °) at each image height, and H0 indicates an object height. d indicates aberration at the d-line and g indicates aberration at the g-line. Moreover, aberrations without these characters indicate aberrations at the d-line. In the graphs illustrating the spherical aberration upon focusing on an object at infinity, the F-number values corresponding to the maximum aperture are illustrated. In the graphs illustrating the spherical aberration upon focusing on an object at a close point, the numerical aperture values corresponding to the maximum aperture are illustrated. In the graphs illustrating the astigmatism, a solid line indicates the sagittal image plane and a broken line indicates the meridional image plane.

The same reference symbols as in this example are used in the aberration graphs of respective examples to be described later.

It can be understood from FIGS. 10 to 12 that the variable magnification optical system ZL1 according to Example 3 has a satisfactory optical performance such that various aberrations are satisfactorily corrected in states ranging from the wide-angle end state to the telephoto end state and from the focusing-on-infinity state to the focusing-on-close-point state. Moreover, it can be understood that the variable magnification optical system ZL1 has an excellent imaging performance upon image blur correction.

Example 4

Example 4 will be described with reference to FIGS. 13 to 16 and Table 4. As illustrated in FIG. 13, a variable magnification optical system ZL (ZL2) according to Example 4 is constituted by, in order from an object, a first lens group G1 having a negative refractive power; a second lens group G2 having a positive refractive power; a third lens group G3 having a negative refractive power; a fourth lens group G4 having a negative refractive power; and a fifth lens group G5 having a positive refractive power.

The first lens group G1 is constituted by, in order from the object, a negative meniscus lens L11 having a concave surface oriented toward the image side, a biconcave lens L12, a biconcave lens L13, and a biconvex lens L14. The negative meniscus lens L11 has an aspherical surface on both sides thereof. Moreover, the biconcave lens L12 has an aspherical object-side surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by a cemented lens including, in order from the object, a biconvex lens L24 and a negative meniscus lens L25 having a concave surface oriented toward the object side.

The third lens group G3 is constituted by, in order from the object, a negative meniscus lens L31 having a concave surface oriented toward the object side and a positive meniscus lens L32 having a convex surface oriented toward the image side.

The fourth lens group G4 is constituted by a cemented lens including, in order from the object, a biconcave lens L41 and a positive meniscus lens L42 having a convex surface oriented toward the object side. The positive meniscus lens L42 has an aspherical image-side surface.

The fifth lens group G5 is constituted by, in order from the object, a biconvex lens L51, a cemented lens including a biconvex lens L52 and a biconcave lens L53, and a cemented lens including a biconvex lens L54 and a biconcave lens L55. The biconcave lens L55 has an aspherical image-side surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the same toward the object side, moving the second lens group G2 toward the object side, fixing the third lens group G3 in relation to the image plane, moving the fourth lens group G4 toward the image side and then moving the same toward the object side, and moving the fifth lens group G5 toward the object side such that the distances between the respective lens groups (the distance between the first and second lens groups G1 and G2, the distance between the second and third lens groups G2 and G3, the distance between the third and fourth lens groups G3 and G4, and the distance between the fourth and fifth lens groups G4 and G5) are changed. The aperture stop S is fixed in relation to the image plane integrally with the third lens group G3.

Focusing from an object at infinity to an object at a close distance is performed by moving the 21st lens group G21 toward the image side.

When image blur occurs, image blur correction (vibration reduction) on the image plane I is performed by moving the fourth lens group G4 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 4, in the wide-angle end state, since the vibration reduction coefficient is −0.68 and the focal length is 16.40 mm, the moving distance of the vibration-reduction lens group VR for correcting the rotation blur of 0.81° is −0.34 mm. In the intermediate focal length state, since the vibration reduction coefficient is −0.76 and the focal length is 24.50 mm, the moving distance of the vibration-reduction lens group VR for correcting the rotation blur of 0.67° is −0.38 mm. In the telephoto end state, since the vibration reduction coefficient is −0.95 and the focal length is 34.00 mm, the moving distance of the vibration-reduction lens group VR for correcting the rotation blur of 0.57° is −0.35 mm.

Table 4 illustrates the values of respective specifications of Example 4. Surface numbers 1 to 32 in Table 4 correspond to optical surfaces of m1 to m32 illustrated in FIG. 13.

TABLE 4

| [Lens Specification] | | | | |
|---|---|---|---|---|
| Surface number | R | D | nd | vd |
| *1 | 193.25434 | 3.000 | 1.76690 | 46.9 |
| *2 | 17.13465 | 12.086 | 1.00000 | |
| *3 | −200.00000 | 1.700 | 1.76690 | 46.9 |
| 4 | 99.36571 | 1.934 | 1.00000 | |
| 5 | −702.67887 | 1.700 | 1.49700 | 81.7 |
| 6 | 45.42128 | 1.200 | 1.00000 | |
| 7 | 45.47188 | 6.037 | 1.75520 | 27.6 |
| 8 | −335.54839 | (D8) | 1.00000 | |
| 9 | 52.73871 | 6.048 | 1.64769 | 33.7 |
| 10 | −167.28882 | 0.100 | 1.00000 | |
| 11 | 55.01437 | 1.000 | 1.84666 | 23.8 |
| 12 | 20.79608 | 4.835 | 1.60342 | 38.0 |
| 13 | 68.48478 | (D13) | 1.00000 | |
| 14 | 48.68485 | 6.332 | 1.49700 | 81.7 |

TABLE 4-continued

| | | | | |
|---|---|---|---|---|
| 15 | −36.34788 | 1.400 | 1.84666 | 23.8 |
| 16 | −49.89711 | (D16) | 1.00000 | |
| 17 | (Aperture stop) | 3.263 | 1.00000 | |
| 18 | −37.12733 | 1.300 | 1.90366 | 31.3 |
| 19 | −213.84119 | 0.100 | 1.00000 | |
| 20 | −3697.41390 | 2.901 | 1.84666 | 23.8 |
| 21 | −52.57832 | (D21) | 1.00000 | |
| 22 | −113.43754 | 1.300 | 1.80400 | 46.6 |
| 23 | 27.30005 | 3.766 | 1.80518 | 25.4 |
| *24 | 90.97626 | (D24) | 1.00000 | |
| 25 | 32.82370 | 7.685 | 1.49700 | 81.7 |
| 26 | −46.49495 | 0.100 | 1.00000 | |
| 27 | 47.76928 | 8.611 | 1.49700 | 81.7 |
| 28 | −28.00000 | 1.500 | 1.74950 | 35.2 |
| 29 | 179.04198 | 0.500 | 1.00000 | |
| 30 | 80.91519 | 5.824 | 1.49700 | 81.7 |
| 31 | −60.00000 | 2.000 | 1.80610 | 41.0 |
| *32 | 728.12773 | (D32) | 1.00000 | |

[Aspheric Data]

| Surface | κ | A4 | A6 | A8 | A10 |
|---|---|---|---|---|---|
| 1 | 1.00000e+00 | 2.55253e−06 | −2.06216e−09 | −3.73822e−12 | 6.17187e−15 |
| 2 | 0.00000e+00 | 8.20822e−06 | −1.94550e−09 | 8.73648e−11 | −2.71723e−13 |
| 3 | 1.00000e+00 | −2.79582e−06 | −3.37193e−09 | 4.74900e−11 | −1.88234e−13 |
| 24 | 1.00000e+00 | −1.52089e−06 | 2.03534e−09 | 7.28188e−12 | −3.57628e−14 |
| 32 | 1.00000e+00 | 1.34254e−05 | 8.78505e−09 | −2.82571e−12 | 6.66429e−14 |

[Various Data]

| | W | M | T |
|---|---|---|---|
| f | 16.40 | 24.50 | 34.00 |
| FNo | 2.85 | 2.88 | 2.87 |
| ω | 53.9 | 38.5 | 29.6 |
| Y | 20.00 | 20.00 | 20.00 |
| TL | 163.818 | 160.810 | 162.492 |
| BF | 26.615 | 31.660 | 41.455 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 336.18 | 339.19 | 337.51 |
| β | — | — | — | −0.0456 | −0.0679 | −0.0949 |
| f | 16.40 | 24.50 | 34.00 | — | — | — |
| D8 | 24.176 | 10.171 | 2.298 | 25.710 | 11.867 | 4.175 |
| D13 | 5.770 | 5.770 | 5.770 | 4.235 | 4.074 | 3.893 |
| D16 | 3.000 | 14.001 | 23.546 | 3.000 | 14.001 | 23.546 |
| D21 | 2.035 | 4.457 | 2.000 | 2.035 | 4.457 | 2.000 |
| D24 | 16.000 | 8.528 | 1.200 | 16.000 | 8.528 | 1.200 |
| D32 | 26.615 | 31.660 | 41.455 | 26.615 | 31.660 | 41.455 |

[Lens Group Data]

| Lens group | Starting surface | Focal distance |
|---|---|---|
| 1st lens group | 1 | −23.00 |
| 2nd lens group | 9 | 39.44 |
| 21st lens group | 9 | 83.59 |
| 22nd lens group | 14 | 58.05 |
| 3rd lens group | 17 | −297.53 |
| 4th lens group | 22 | −62.23 |
| 5th lens group | 25 | 38.73 |

[Conditional Expression Correspondence Values]

Conditional Expression (5) (D34T−D34W)/(D23T−D23W) = −0.002
Conditional Expression (6) f4/f3 = 0.209
Conditional Expression (7) f1/f4 = 0.370
Conditional Expression (8) A(T3.5)/A(T4.0) = 1.694
(A(T3.5) = −0.0079, A(T4.0) = −0.0047)

It can be understood from Table 4 that the variable magnification optical system ZL2 according to Example 4 satisfies Conditional Expressions (5) to (8).

Figure 14:
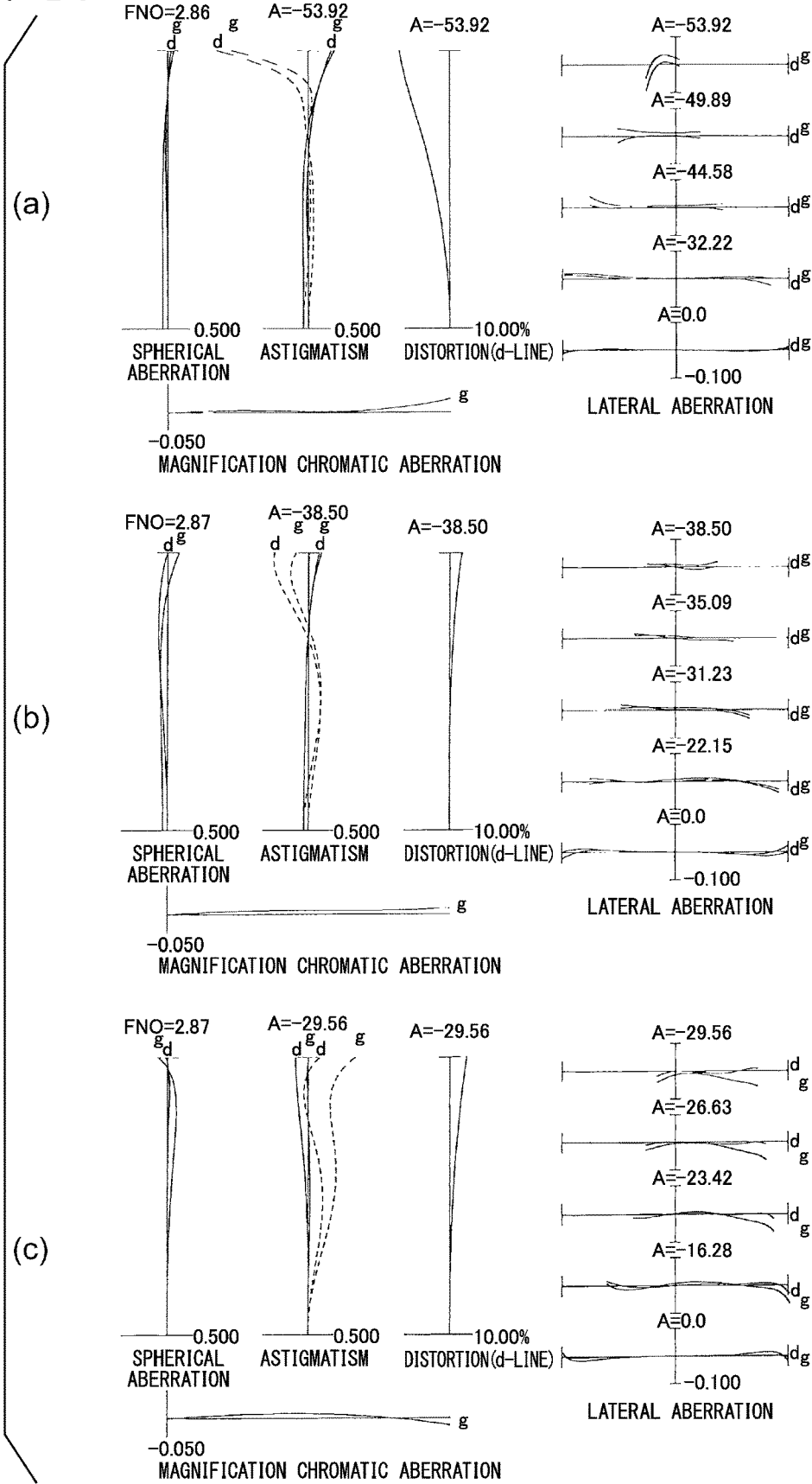
FIG. 14 shows graphs illustrating various aberrations of the variable magnification optical system according to Example 4 upon focusing on an object at infinity, wherein parts (a), (b), and (c) are in the wide-angle end state, the intermediate focal length state, and the telephoto end state, respectively.
Figure 15:
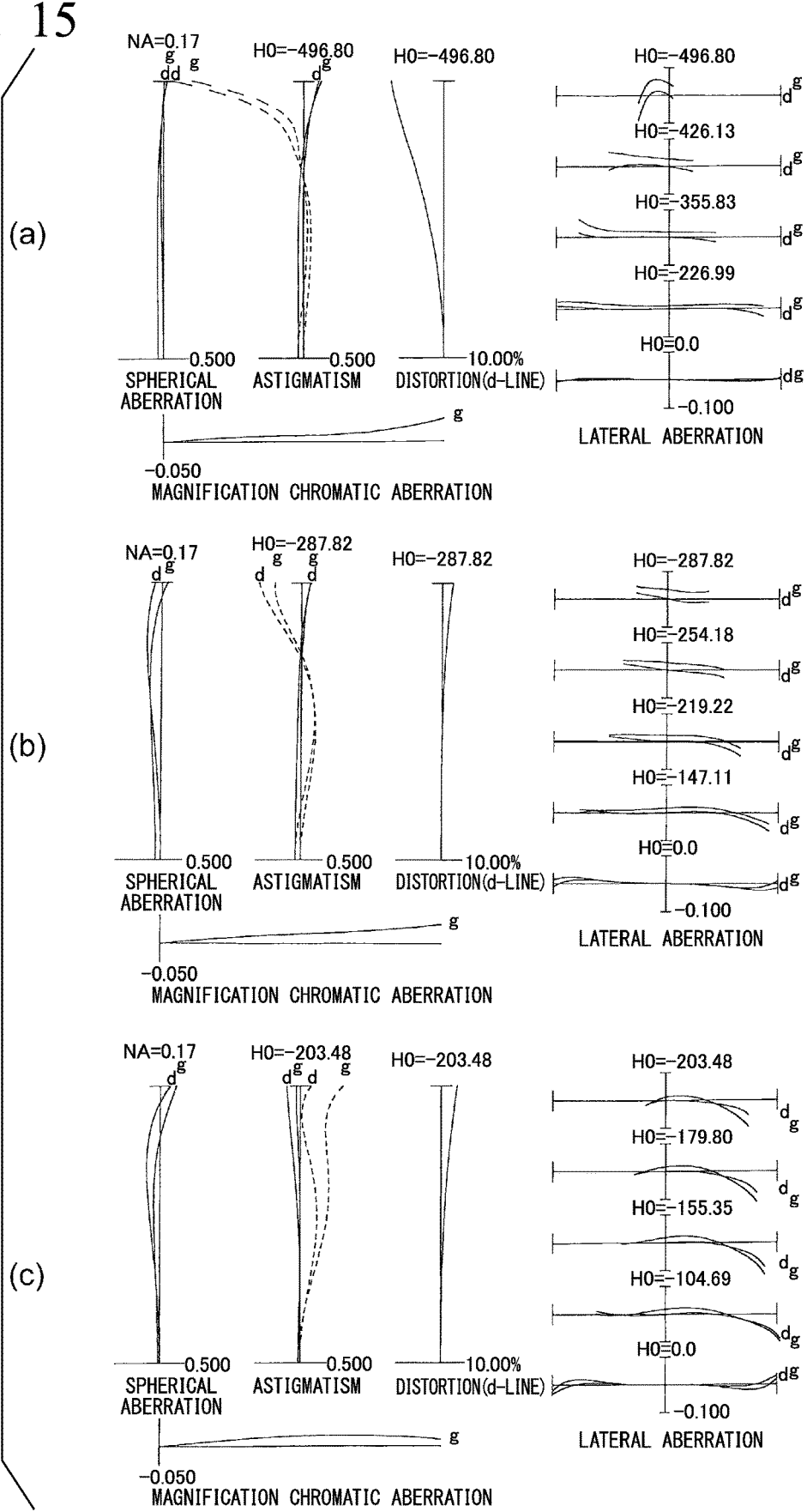
FIG. 15 shows graphs illustrating various aberrations of the variable magnification optical system according to Example 4 upon focusing on an object at a close point, wherein parts (a), (b), and (c) are in the wide-angle end state, the intermediate focal length state, and the telephoto end state, respectively.

FIG. 14 shows graphs illustrating various aberrations (spherical aberration, astigmatism, distortion, magnification chromatic aberration, and lateral aberration) upon focusing on an object at infinity, of the variable magnification optical system ZL2 according to Example 4, in which part (a) illustrates the wide-angle end state, part (b) illustrates the intermediate focal length state, and part (c) illustrates the telephoto end state. FIG. 15 shows graphs illustrating various aberrations (spherical aberration, astigmatism, distortion, magnification chromatic aberration, and lateral aberration) upon focusing on an object at a close point, of the variable magnification optical system ZL2 according to Example 4, in which part (a) illustrates the wide-angle end state, part (b) illustrates the intermediate focal length state, and part (c) illustrates the telephoto end state. FIG. 16 shows graphs illustrating lateral aberration of the variable magnification optical system ZL2 according to Example 4 when image blur correction is performed upon focusing on an object at infinity, in which part (a) illustrates the wide-angle end state, part (b) illustrates the intermediate focal length state, and part (c) illustrates the telephoto end state.

It can be understood from FIGS. 14 to 16 that the variable magnification optical system ZL2 according to Example 4 has a satisfactory optical performance such that various aberrations are satisfactorily corrected in states ranging from the wide-angle end state to the telephoto end state and from the focusing-on-infinity state to the focusing-on-close-point state. Moreover, it can be understood that the variable magnification optical system ZL2 has an excellent imaging performance upon image blur correction.

Example 5

Example 5 will be described with reference to FIGS. 17 to 20 and Table 5. As illustrated in FIG. 17, a variable magnification optical system ZL (ZL3) according to Example 5 is constituted by, in order from an object, a first lens group G1 having a negative refractive power; a second lens group G2 having a positive refractive power; a third lens group G3 having a positive refractive power; a fourth lens group G4 having a negative refractive power; and a fifth lens group G5 having a positive refractive power.

The first lens group G1 is constituted by, in order from the object, a negative meniscus lens L11 having a concave surface oriented toward the image side, a biconcave lens L12, a biconcave lens L13, and a biconvex lens L14. The negative meniscus lens L11 has an aspherical surface on both sides thereof. Moreover, the biconcave lens L12 has an aspherical object-side surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by a cemented lens including, in order from the object, a biconvex lens L24 and a negative meniscus lens L25 having a concave surface oriented toward the object side.

The third lens group G3 is constituted by, in order from the object, a negative meniscus lens L31 having a concave surface oriented toward the object side and a biconvex lens L32. The biconvex lens L32 has an aspherical image-side surface.

The fourth lens group G4 is constituted by a cemented lens including, in order from the object, a biconcave lens L41 and a positive meniscus lens L42 having a convex surface oriented toward the object side. The positive meniscus lens L42 has an aspherical image-side surface.

The fifth lens group G5 is constituted by, in order from the object, a biconvex lens L51, a cemented lens including a biconvex lens L52 and a negative meniscus lens L53 having a concave surface oriented toward the object side, and a cemented lens including a biconvex lens L54 and a biconcave lens L55. The biconvex lens L52 has an aspherical object-side surface. The biconcave lens L55 has an aspherical image-side surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the same toward the object side, moving the second lens group G2 toward the object side, moving the third lens group G3 toward the object side, fixing the fourth lens group G4 in relation to the image plane, and moving the fifth lens group G5 toward the object side such that the distances between the respective lens groups are changed. The aperture stop S is moved toward the object side integrally with the third lens group G3.

Focusing from an object at infinity to an object at a close distance is performed by moving the 21st lens group G21 toward the image side.

When image blur occurs, image blur correction (vibration reduction) on the image plane I is performed by moving the fourth lens group G4 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 5, in the wide-angle end state, since the vibration reduction coefficient is −1.03 and the focal length is 16.40 mm, the moving distance of the vibration-reduction lens group VR for correcting the rotation blur of 0.81° is −0.23 mm. In the intermediate focal length state, since the vibration reduction coefficient is −1.12 and the focal length is 23.50 mm, the moving distance of the vibration-reduction lens group VR for correcting the rotation blur of 0.68° is −0.25 mm. In the telephoto end state, since the vibration reduction coefficient is −1.37 and the focal length is 34.00 mm, the moving distance of the vibration-reduction lens group VR for correcting the rotation blur of 0.57° is −0.24 mm.

Table 5 illustrates the values of respective specifications of Example 5. Surface numbers 1 to 32 in Table 5 correspond to optical surfaces of m1 to m32 illustrated in FIG. 17.

TABLE 5

| [Lens Specification] | | | | |
|---|---|---|---|---|
| Surface number | R | D | nd | vd |
| *1 | 207.85739 | 3.000 | 1.76690 | 46.9 |
| *2 | 16.71640 | 12.075 | 1.00000 | |
| *3 | −126.64950 | 1.700 | 1.76690 | 46.9 |
| 4 | 138.69829 | 1.900 | 1.00000 | |
| 5 | −305.30737 | 1.700 | 1.49700 | 81.7 |
| 6 | 49.66923 | 1.200 | 1.00000 | |
| 7 | 48.16519 | 5.621 | 1.75520 | 27.6 |
| 8 | −201.97549 | (D8) | 1.00000 | |
| 9 | 42.04729 | 8.608 | 1.64769 | 33.7 |
| 10 | −374.37994 | 0.100 | 1.00000 | |
| 11 | 49.19749 | 1.000 | 1.84666 | 23.8 |
| 12 | 19.13552 | 4.835 | 1.60342 | 38.0 |
| 13 | 51.73593 | (D13) | 1.00000 | |
| 14 | 46.66560 | 6.999 | 1.49700 | 81.7 |
| 15 | −31.81612 | 1.400 | 1.84666 | 23.8 |
| 16 | −46.26169 | (D16) | 1.00000 | |
| 17 | (Aperture stop) | 3.263 | 1.00000 | |
| 18 | −41.32099 | 1.300 | 1.90366 | 31.3 |
| 19 | −114.37285 | 0.100 | 1.00000 | |
| 20 | 118.37175 | 3.171 | 1.84666 | 23.8 |
| *21 | −71.92314 | (D21) | 1.00000 | |
| 22 | −71.28950 | 1.300 | 1.80400 | 46.6 |
| 23 | 28.48969 | 3.132 | 1.80518 | 25.4 |
| *24 | 57.82940 | (D24) | 1.00000 | |
| 25 | 32.18491 | 7.336 | 1.49700 | 81.7 |
| 26 | −48.06359 | 0.100 | 1.00000 | |
| *27 | 101.54911 | 8.015 | 1.49700 | 81.7 |
| 28 | −28.00000 | 1.500 | 1.74950 | 35.2 |
| 29 | −184.91003 | 0.500 | 1.00000 | |
| 30 | 50.32451 | 6.043 | 1.49700 | 81.7 |
| 31 | −60.00000 | 2.000 | 1.80610 | 41.0 |
| *32 | 136.26267 | (D32) | 1.00000 | |

| [Aspheric Data] | | | | | |
|---|---|---|---|---|---|
| Surface | κ | A4 | A6 | A8 | A10 |
| 1 | 1.00000e+00 | 1.94090e−06 | −1.49023e−09 | −3.81067e−12 | 6.84376e−15 |
| 2 | 0.00000e+00 | 6.00339e−06 | 2.07998e−09 | 7.93413e−11 | −2.62472e−13 |
| 3 | 1.00000e+00 | −3.68171e−06 | −3.47017e−09 | 4.98784e−11 | −2.14759e−13 |
| 21 | 1.00000e+00 | 2.76768e−06 | −5.47451e−09 | 1.50258e−11 | −4.82676e−14 |
| 24 | 1.00000e+00 | −4.45941e−06 | 2.05441e−09 | 2.73993e−11 | −5.84691e−14 |
| 27 | 1.00000e+00 | 1.45862e−06 | −4.94280e−09 | −2.35002e−11 | 5.70437e−14 |
| 32 | 1.00000e+00 | 1.61827e−05 | 1.00472e−08 | −2.91720e−11 | 1.40466e−13 |

| [Various Data] | | | |
|---|---|---|---|
| | W | M | T |
| f | 16.40 | 23.50 | 34.00 |
| FNo | 2.81 | 2.81 | 2.87 |
| ω | 54.1 | 39.5 | 29.0 |
| Y | 20.00 | 20.00 | 20.00 |
| TL | 163.819 | 160.497 | 163.297 |
| BF | 25.292 | 29.551 | 37.861 |

| [Variable Distance Data] | | | | | | |
|---|---|---|---|---|---|---|
| | Focusing on infinity | | | Focusing on close point | | |
| | W | M | T | W | M | T |
| D0 | ∞ | ∞ | ∞ | 336.18 | 339.50 | 336.70 |
| β | — | — | — | −0.0457 | −0.0652 | −0.0954 |
| f | 16.40 | 23.50 | 34.00 | — | — | — |
| D8 | 25.802 | 11.237 | 2.000 | 27.363 | 12.989 | 4.002 |
| D13 | 6.063 | 6.063 | 6.063 | 4.502 | 4.311 | 4.061 |
| D16 | 3.000 | 11.092 | 19.651 | 3.000 | 11.092 | 19.651 |
| D21 | 2.000 | 5.157 | 8.625 | 2.000 | 5.157 | 8.625 |
| D24 | 13.764 | 9.499 | 1.200 | 13.764 | 9.499 | 1.200 |
| D32 | 25.292 | 29.551 | 37.861 | 25.292 | 29.551 | 37.861 |

TABLE 5-continued

[Lens Group Data]

| Lens group | Starting surface | Focal distance |
| --- | --- | --- |
| 1st lens group | 1 | −23.00 |
| 2nd lens group | 9 | 40.81 |
| 21st lens group | 9 | 86.19 |
| 22nd lens group | 14 | 56.83 |
| 3rd lens group | 17 | 181.29 |
| 4th lens group | 22 | −39.15 |
| 5th lens group | 25 | 37.83 |

[Conditional Expression Correspondence Values]

Conditional Expression (5)  (D34T−D34W)/(D23T−D23W) = 0.398
Conditional Expression (6)  f4/f3 = −0.216
Conditional Expression (7)  f1/f4 = 0.588
Conditional Expression (8)  A(T3.5)/A(T4.0) = 1.714
                            (A(T3.5) = −0.0169, A(T4.0) = −0.0099)

It can be understood from Table 5 that the variable magnification optical system ZL3 according to Example 5 satisfies Conditional Expressions (5) to (8).

Figure 18:
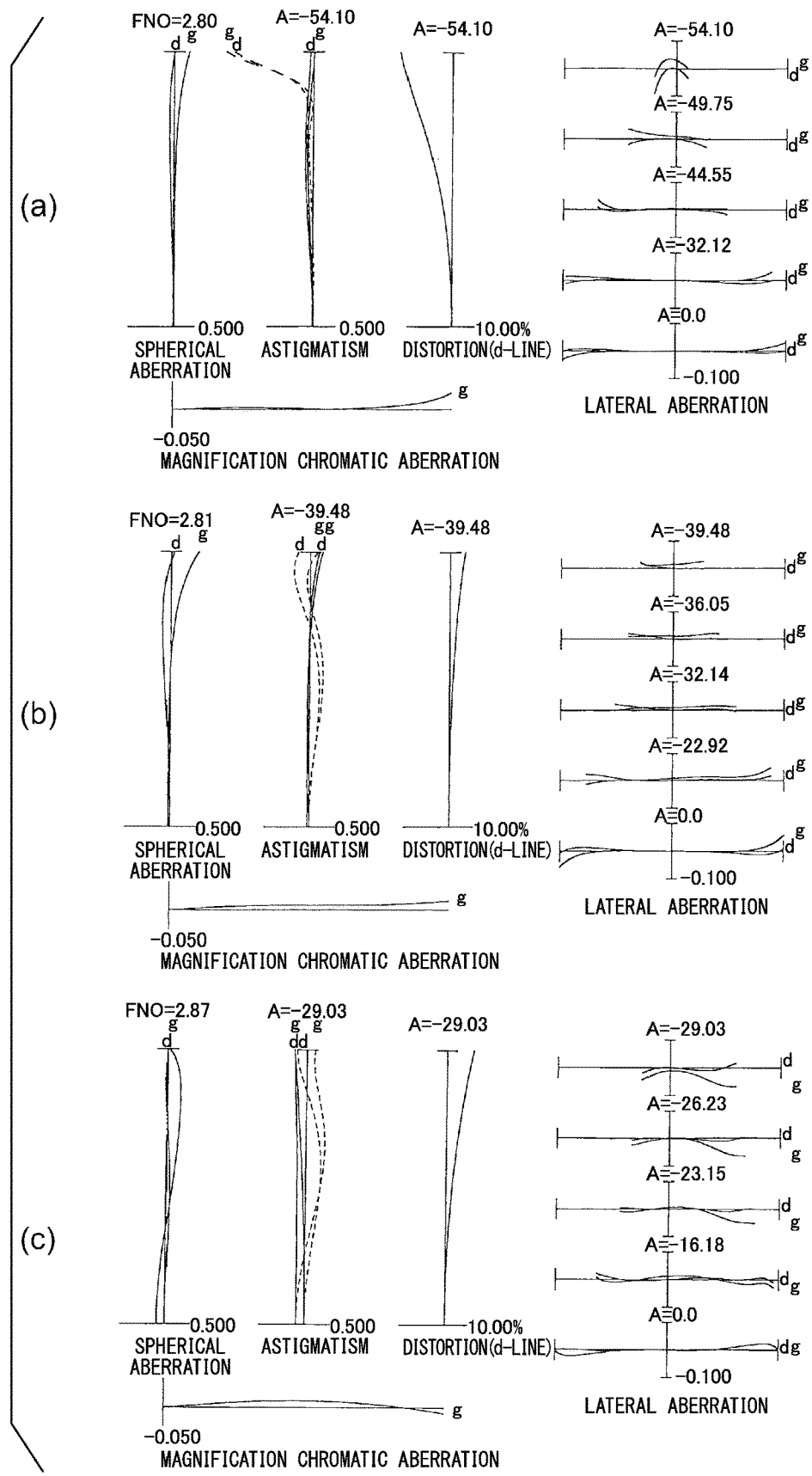
FIG. 18 shows graphs illustrating various aberrations of the variable magnification optical system according to Example 5 upon focusing on an object at infinity, wherein parts (a), (b), and (c) are in the wide-angle end state, the intermediate focal length state, and the telephoto end state, respectively.
Figure 19:
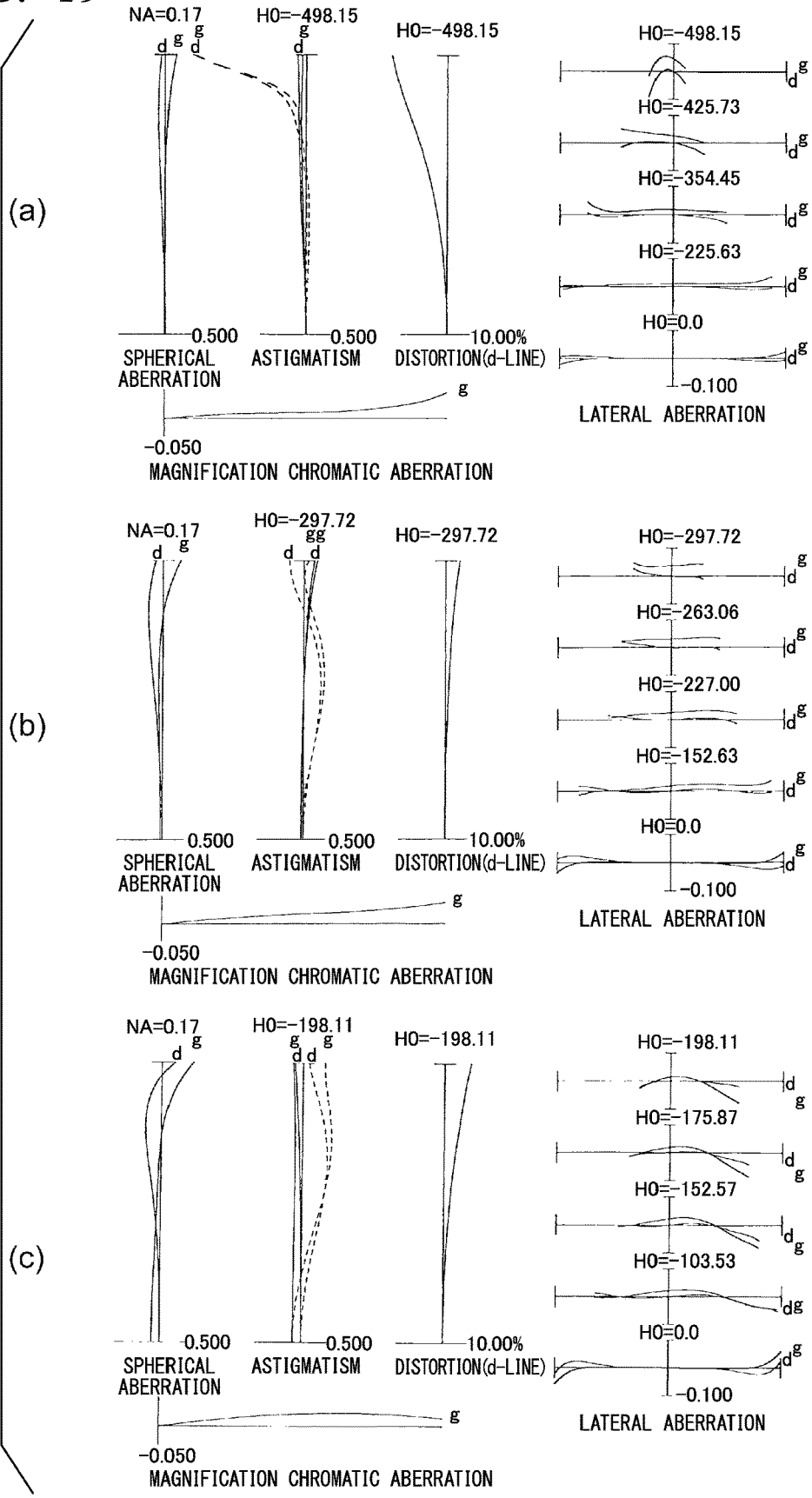
FIG. 19 shows graphs illustrating various aberrations of the variable magnification optical system according to Example 5 upon focusing on an object at a close point, wherein parts (a), (b), and (c) are in the wide-angle end state, the intermediate focal length state, and the telephoto end state, respectively.

FIG. 18 shows graphs illustrating various aberrations (spherical aberration, astigmatism, distortion, magnification chromatic aberration, and lateral aberration) upon focusing on an object at infinity, of the variable magnification optical system ZL3 according to Example 5, in which part (a) illustrates the wide-angle end state, part (b) illustrates the intermediate focal length state, and part (c) illustrates the telephoto end state. FIG. 19 shows graphs illustrating various aberrations (spherical aberration, astigmatism, distortion, magnification chromatic aberration, and lateral aberration) upon focusing on an object at a close point, of the variable magnification optical system ZL3 according to Example 5, in which part (a) illustrates the wide-angle end state, part (b) illustrates the intermediate focal length state, and part (c) illustrates the telephoto end state. FIG. 20 shows graphs illustrating lateral aberration of the variable magnification optical system ZL3 according to Example 5 when image blur correction is performed upon focusing on an object at infinity, in which part (a) illustrates the wide-angle end state, part (b) illustrates the intermediate focal length state, and part (c) illustrates the telephoto end state.

It can be understood from FIGS. 18 to 20 that the variable magnification optical system ZL3 according to Example 5 has a satisfactory optical performance such that various aberrations are satisfactorily corrected in states ranging from the wide-angle end state to the telephoto end state and from the focusing-on-infinity state to the focusing-on-close-point state. Moreover, it can be understood that the variable magnification optical system ZL3 has an excellent imaging performance upon image blur correction.

According to the above-described examples, it is possible to implement a variable magnification optical system which has a bright F-value of approximately F2.8 and such a wide angle of view that the half-angle of view is approximately 50° or more, and in which various aberrations are corrected satisfactorily.

While the present invention has been described by assigning reference symbols to elements of the embodiment for better understanding of the present invention, the aspect of the present invention is not limited to this. The following content can be appropriately employed within a range where the optical performance of the variable magnification optical system is not diminished.

Although the numbered examples of a five-group configuration have been illustrated as numbered examples of the variable magnification optical system ZL, the present invention is not limited to this and can be applied to other group configurations (for example, a six-group configuration or the like). Specifically, a configuration in which a lens or a lens group is added to the side closest to the object side and a configuration in which a lens or a lens group is added to the side closest to the image side may be employed. The first lens group G1 may be divided into a plurality of lens groups, and the respective lens groups may be moved along different trajectories upon varying magnification or one of them may be fixed. Moreover, as described above, the third lens group G3 may have a negative refractive power or a positive refractive power. A lens group refers to a portion having at least one lens isolated by air space which changes upon varying magnification or focusing.

In the variable magnification optical system ZL, a portion of a lens group, an entire lens group, or a plurality of lens groups may be moved in the optical axis direction as a focusing lens group in order to perform focusing from an object at infinity to an object at a close distance. Moreover, such a focusing lens group can be applied to autofocus and is also suitable for driving based on an autofocus motor (for example, an ultrasonic motor, a step motor, a voice coil motor, or the like). In particular, although it is preferable that a portion of the second lens group G2 be configured as a focusing lens group, the entire second lens group G2 may be configured as a focusing lens group. Moreover, although the focusing lens group may include one single lens and one cemented lens described above, the number of lenses is not particularly limited and the focusing lens group may include one or more lens components.

In the variable magnification optical system ZL, an entire arbitrary lens group or a partial lens group may be moved so as to have a component in the direction orthogonal to the optical axis or may be rotated (oscillated) in an in-plane direction including the optical axis so as to function as a vibration-reduction lens group that corrects image blur occurring due to camera shake or the like. As described above, although it is preferable that the entire fourth lens group G4 be configured as a vibration-reduction lens group, a portion of the fourth lens group G4 may be configured as a vibration-reduction lens group. Moreover, although the vibration-reduction lens group may be constituted by one cemented lens as described above, the number of lenses is not particularly limited and the vibration-reduction lens group may be constituted by one single lens or a plurality of lens components. Moreover, the vibration-reduction lens group may have a positive refractive power and it is preferable that the entire fourth lens group G4 have a negative refractive power.

In the variable magnification optical system ZL, the lens surface may be formed as a spherical surface or a flat surface and may be formed as an aspherical surface. When the lens surface is a spherical surface or a flat surface, it is possible to facilitate lens processing, assembly, and adjustment and to prevent deterioration of optical performance resulting from errors in the processing, assembly and adjustment. Moreover, deterioration of the rendering performance is little even when the image plane is shifted. When the lens surface is an aspherical surface, the aspherical surface may be an aspherical surface obtained by grinding a glass-molded aspherical surface obtained by molding glass into an aspherical surface, or a composite aspherical surface obtained by forming a resin on the surface of glass into an aspherical shape. Moreover, the lens surface may be a diffraction surface and may be a refractive index distributed lens (a GRIN lens) or a plastic lens.

In the variable magnification optical system ZL, it is preferable that the aperture stop S be disposed in the third lens group G3 so as to be integrated with the third lens group G3 particularly. However, the aperture stop S may be configured so as to be movable separately from the third lens group G3. Moreover, the role of the aperture stop may be substituted by the frame of a lens without providing a separate member as the aperture stop.

In the variable magnification optical system ZL, each lens surface may be coated with an anti-reflection film which has high transmittance in a wide wavelength region in order to decrease flare and ghosting and achieve satisfactory optical performance with high contrast. The type of the anti-reflection film may be selected appropriately. Moreover, the number of anti-reflection films and the position thereof may be selected appropriately. In the above-described examples, it is preferable that any one of the image-side surface of the lens L11, the object-side surface of the lens L12, the image-side surface of the lens L12, the object-side surface of the lens L13, the image-side surface of the lens L13, and the object-side surface of the lens L14 of the first lens group G1 or a plurality of surfaces be coated with anti-reflection film which has high transmittance in a wavelength region.

The variable magnification ratio of the variable magnification optical system ZL may be between approximately 1.5 and 2.5, for example. Moreover, the focal length (a value converted in terms of a 35-mm thick plate) in the wide-angle end state of the variable magnification optical system ZL may be between approximately 15 and 20 mm, for example. Moreover, the F-value in the wide-angle end state of the variable magnification optical system ZL may be between approximately 2.7 and 3.5, for example. Moreover, the F-value in the telephoto end state of the variable magnification optical system ZL may be between approximately 2.7 and 3.5, for example. Furthermore, when the focusing state of the variable magnification optical system ZL changes from the wide-angle end state to the telephoto end state, the F-value may be approximately constant (a variation is equal to or smaller than 10 percent of the F-value in the telephoto end state).

Figure 21:
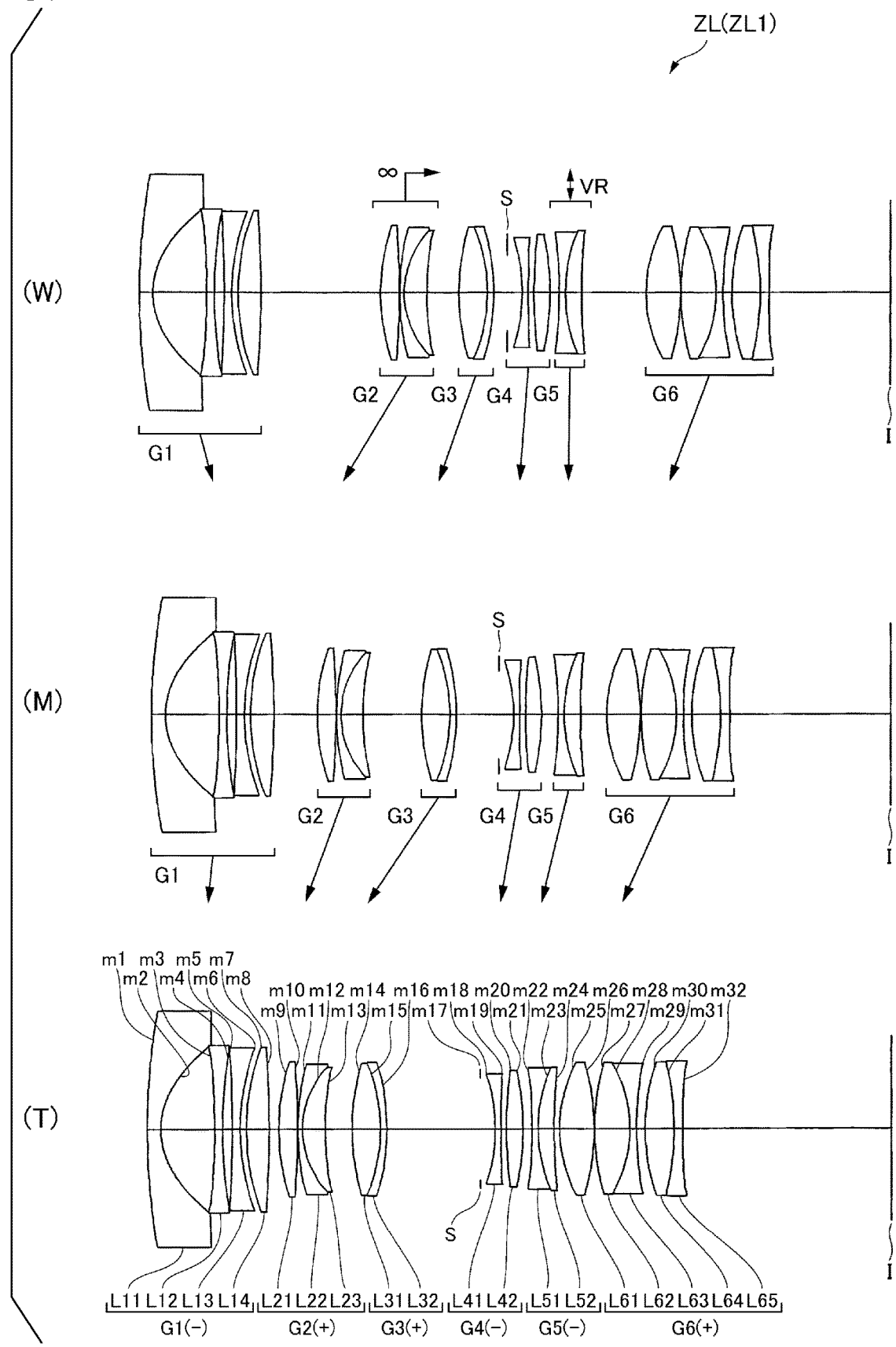
FIG. 21 is a cross-sectional view of a variable magnification optical system according to Example 6, wherein parts (W), (M), and (T) are in a wide-angle end state, an intermediate focal length state, and a telephoto end state, respectively.

Another embodiment will now be described with reference to the drawings. FIG. 21 illustrates an example of a configuration of a variable magnification optical system ZL.

In other examples, the number of lens groups, a lens configuration of each lens group, and the like can be changed appropriately.

In an embodiment, a variable magnification optical system includes, in order from an object, a first lens group G1 having a negative refractive power, a second lens group G2 having a positive refractive power, a third lens group G3 having a positive refractive power, a fourth lens group G4, a fifth lens group G5 having a negative refractive power, and a sixth lens group G6 having a positive refractive power, the system performing varying magnification by changing the distance between the first and second lens groups G1 and G2, the distance between the second and third lens groups G2 and G3, the distance between the third and fourth lens groups G3 and G4, the distance between the fourth and fifth lens groups G4 and G5, and the distance between the fifth and sixth lens groups G5 and G6, and at least a portion of any one lens group among the first to sixth lens groups G1 to G6 is configured to be movable so as to have a component in the direction orthogonal to an optical axis.

Alternatively, a variable magnification optical system ZL includes, in order from an object, a first lens group G1 having a negative refractive power, a second lens group G2 having a positive refractive power, a third lens group G3 having a positive refractive power, a fourth lens group G4, a fifth lens group G5 having a negative refractive power, and a sixth lens group G6 having a positive refractive power, the system performing varying magnification by changing the distances between the respective lens groups, and at least a portion of any one lens group among the first to sixth lens groups G1 to G6 may be configured to be movable so as to have a component in the direction orthogonal to an optical axis in order to correct image blur as a vibration-reduction lens group VR.

The variable magnification optical system has the first lens group G1 having a negative refractive power, the second lens group G2 having a positive refractive power, the third lens group G3 having a positive refractive power, the fourth lens group G4, the fifth lens group G5 having a negative refractive power, and the sixth lens group G6 having a positive refractive power and changes the distances between the respective lens groups. Therefore, it is possible to secure the degree of freedom in aberration correction and to implement a bright variable magnification optical system having a wide angle of view. Moreover, at least a portion of any one lens group among the first to sixth lens groups G1 to G6 is moved so as to have a component in the direction orthogonal to the optical axis to perform image blur correction. Therefore, it is possible to suppress the occurrence of eccentric coma aberration and one-sided blur during image blur correction and to obtain satisfactory imaging performance.

The fourth lens group G4 may have a positive refractive power or a negative refractive power.

In the variable magnification optical system ZL, it is preferable that at least a portion of the fifth lens group G5 be configured to be movable so as to have a component in the direction orthogonal to the optical axis in order to correct image blur as a vibration-reduction lens group VR.

When the fifth lens group G5 having a negative refractive power is selected as a lens group (a vibration-reduction lens group VR) that is moved to perform image blur correction, it is possible to suppress the occurrence of eccentric aberration (particularly, eccentric coma aberration and eccentric image plane tilting (one-sided blur)) occurring when the fifth lens group G5 is shifted eccentrically and to obtain satisfactory imaging performance during image blur correction.

Moreover, the fifth lens group G5 can be constituted by lenses having a relatively small lens diameter, and it is possible to effectively decrease the size of an image blur correction mechanism and the entire lens.

The fifth lens group G5 may include one or more lenses which are immovable during image blur correction in addition to the vibration-reduction lens group VR.

The variable magnification optical system ZL satisfies Conditional Expression (9) below.

$$-0.500 < f5/f4 < 0.500 \tag{9}$$

where
f5: a focal length of the fifth lens group G5
f4: a focal length of the fourth lens group G4

Conditional Expression (9) is a conditional expression for defining an appropriate value of the focal length of the fifth lens group G5 with respect to the focal length of the fourth lens group G4. When Conditional Expression (9) is satisfied, it is possible to set an appropriate moving distance of the fifth lens group G5 for image blur correction while correcting eccentric aberration when the fifth lens group G5 is shifted eccentrically during image blur correction.

If the focal length ratio exceeds the upper limit value of Conditional Expression (9), the negative focal length of the fourth lens group G4 is decreased, aberration correction balance in combination with the adjacent fifth lens group G5 for image blur correction collapses, and it is difficult to secure imaging performance during image blur correction. Moreover, since the focal length of the fifth lens group G5 is increased toward the negative side, the moving distance of the fifth lens group G5 for image blur correction increases, and the sizes of the image blur correction mechanism and the entire lens are increased undesirably.

In order to obtain the effect reliably, it is preferable that the upper limit value of Conditional Expression (9) be set to 0.400. In order to obtain the effect more reliably, it is preferable that the upper limit value of Conditional Expression (9) be set to 0.350.

If the focal length ratio is smaller than the lower limit value of Conditional Expression (9), the positive focal length of the fourth lens group G4 is decreased, aberration correction balance in combination with the adjacent fifth lens group G5 for image blur correction collapses, and it is difficult to secure imaging performance during image blur correction. Moreover, since the focal length of the fifth lens group G5 is increased toward the negative side, the moving distance of the fifth lens group G5 for image blur correction increases, and the sizes of the image blur correction mechanism and the entire lens are increased undesirably.

In order to obtain the effect reliably, it is preferable that the lower limit value of Conditional Expression (9) be set to −0.400. In order to obtain the effect more reliably, it is preferable that the lower limit value of Conditional Expression (9) be set to −0.300.

Preferably, the variable magnification optical system ZL satisfies Conditional Expression (10) below.

$$0.300 < (-f1)/f6 < 0.900 \tag{10}$$

where
f1: a focal length of the first lens group G1
f6: a focal length of the sixth lens group G6

Conditional Expression (10) is a conditional expression for defining the focal length of the first lens group G1 with respect to the sixth lens group G6. When Conditional Expression (10) is satisfied, it is possible to satisfactorily correct curvature of field and coma aberration while obtaining a wide angle of view (a half-angle of view of approximately 50° or more) in the wide-angle end state.

If the focal length ratio exceeds the upper limit value of Conditional Expression (10), the negative focal length of the first lens group G1 is increased, and it is difficult to obtain a wide angle of view (a half-angle of view of approximately 50° or more) in the wide-angle end state. In some cases, the effective diameter of the first lens group G1 is increased and the entire lens size is increased undesirably.

In order to obtain the effect reliably, it is preferable that the upper limit value of Conditional Expression (10) be set to 0.800. In order to obtain the effect more reliably, it is preferable that the upper limit value of Conditional Expression (10) be set to 0.700.

If the focal length ratio is smaller than the lower limit value of Conditional Expression (10), the negative focal length of the first lens group G1 is decreased, astigmatism and coma aberration in the wide-angle end state are aggravated, and it is difficult to correct these aberrations.

In order to obtain the effect reliably, it is preferable that the lower limit value of Conditional Expression (10) be set to 0.400. In order to obtain the effect more reliably, it is preferable that the lower limit value of Conditional Expression (10) be set to 0.500.

Preferably, the variable magnification optical system ZL satisfies Conditional Expression (11) below.

$$-0.400 < f1/f4 < 0.400 \tag{11}$$

where
f1: a focal length of the first lens group G1
f4: a focal length of the fourth lens group G4

Conditional Expression (11) is a conditional expression for defining the focal length of the first lens group G1 with respect to the fourth lens group G4. More specifically, Conditional Expression (11) is a conditional expression for defining the focal length of the fourth lens group G4 appropriate for correcting eccentric aberration when the adjacent fifth lens group G5 is shifted eccentrically in order to perform image blur correction and the focal length of the first lens group G1 for decreasing the entire lens size while obtaining a wide angle of view (a half-angle of view of approximately 50° or more) in the wide-angle end state.

If the focal length ratio exceeds the upper limit value of Conditional Expression (11), the negative focal length of the fourth lens group G4 is decreased, aberration correction balance in combination with the adjacent fifth lens group G5 for image blur correction collapses, and it is difficult to secure imaging performance during image blur correction. In some cases, the negative focal length of the first lens group G1 is increased, and it is difficult to obtain a wide angle of view (a half-angle of view of approximately 50° or more) in the wide-angle end state. In some cases, the effective diameter of the first lens group G1 is increased and the entire lens size is increased undesirably.

In order to obtain the effect reliably, it is preferable that the upper limit value of Conditional Expression (11) be set to 0.300. In order to obtain the effect more reliably, it is preferable that the upper limit value of Conditional Expression (11) be set to 0.200.

If the focal length ratio is smaller than the lower limit value of Conditional Expression (11), the negative focal length of the fourth lens group G4 is decreased, aberration correction balance in combination with the adjacent fifth lens group G5 for image blur correction collapses, and it is difficult to secure imaging performance during image blur correction. In some cases, the negative focal length of the first lens group G1 is increased, and it is difficult to obtain a wide angle of view (a half-angle of view of approximately 50° or more) in the wide-angle end state. In some cases, the effective diameter of the first lens group G1 is increased and the entire lens size is increased undesirably.

In order to obtain the effect reliably, it is preferable that the lower limit value of Conditional Expression (11) be set to −0.300. In order to obtain the effect more reliably, it is preferable that the lower limit value of Conditional Expression (11) be set to −0.200.

In the variable magnification optical system ZL, it is preferable that the fourth lens group G4 have a negative lens and a positive lens.

According to this configuration, it is possible to effectively correct eccentric coma aberration and one-sided blur when the fifth lens group G5 is moved to perform image blur correction. Moreover, it is possible to effectively correct various aberrations including spherical aberration and astigmatism upon varying magnification.

In the variable magnification optical system ZL, it is preferable that the fifth lens group G5 be constituted by a cemented lens including a positive lens and a negative lens.

According to this configuration, it is possible to effectively correct eccentric coma aberration and one-sided blur when the fifth lens group G5 is moved to perform image blur correction. Moreover, it is possible to decrease the size and the weight of a lens that moves for image blur correction and to effectively decrease the size and the cost of an image blur correction mechanism.

The fifth lens group G5 may include two lenses (separated from a bonding surface) instead of bonding a positive lens and a negative lens as described above.

In the variable magnification optical system ZL, it is preferable that the lens surface closest to an image, of the fifth lens group G5 be an aspherical surface.

According to this configuration, it is possible to effectively correct eccentric coma aberration and one-sided blur when the fifth lens group G5 is moved to perform image blur correction.

Preferably, the variable magnification optical system ZL satisfies Conditional Expression (12) below.

$$1.100 < A(T3.5)/A(T4.0) < 5.000 \qquad (12)$$

where

A(T3.5): an asphericity at a point on the aspherical surface where light corresponding to F-value of 3.5 passes through the aspherical surface in a telephoto end state A(T4.0): an asphericity at a point on the aspherical surface where light corresponding to F-value of 4.0 passes through the aspherical surface in a telephoto end state The asphericity refers to an amount of sag, with respect to an approximately spherical surface, in the aspherical surface along the optical axis.

Conditional Expression (12) is a Conditional Expression for defining an appropriate value of the asphericity of the aspherical surface closest to an image, of the fifth lens group G5. When Conditional Expression (12) is satisfied, it is possible to satisfactorily correct one-sided blur and eccentric coma aberration when the fifth lens group G5 is moved to perform image blur correction.

When the asphericity ratio exceeds the upper limit value of Conditional Expression (12), the asphericity of the fifth lens group G5 becomes too large and it is difficult to correct one-sided blur and eccentric coma aberration when the fifth lens group G5 is moved to perform image blur correction.

In order to obtain the effect reliably, it is preferable that the upper limit value of Conditional Expression (12) be set to 4.000. In order to obtain the effect more reliably, it is preferable that the upper limit value of Conditional Expression (12) be set to 3.000.

When the asphericity ratio is smaller than the lower limit value of Conditional Expression (12), the asphericity of the fifth lens group G5 is insufficient and it is difficult to correct one-sided blur and eccentric coma aberration when the fifth lens group G5 is moved to perform image blur correction.

In order to obtain the effect reliably, it is preferable that the lower limit value of Conditional Expression (12) be set to 1.250. In order to obtain the effect more reliably, it is preferable that the lower limit value of Conditional Expression (12) be set to 1.400.

In the variable magnification optical system ZL, it is preferable that the first lens group G1 be immovable in relation to the image plane upon varying magnification.

According to this configuration, it is possible to effectively simplify a varying magnification mechanism and to increase the durability of a lens barrel.

In the variable magnification optical system ZL, it is preferable that the fourth lens group G4 be immovable in relation to the image plane upon varying magnification.

According to this configuration, it is possible to simplify a varying magnification mechanism and to effectively decrease the size and the cost and to secure an imaging performance due to a reduced eccentric error. Moreover, this effect is significant when a diaphragm is integrated with the fourth lens group G4.

In the variable magnification optical system ZL, it is preferable that the fifth lens group G5 be immovable in relation to the image plane upon varying magnification.

According to this configuration, it is possible to simplify a varying magnification mechanism and to effectively decrease the size and the cost. Particularly, when the fifth lens group G5 is used as a vibration-reduction lens group VR, it is not necessary to move an image blur correction mechanism in the optical axis direction and it is possible to particularly effectively reduce the entire lens size.

In the variable magnification optical system ZL, it is preferable that focusing be performed by moving at least a portion of any one lens group among the second to sixth lens groups G2 to G6 in the optical axis direction as a focusing lens group.

According to this configuration, since a lens group other than the first lens group G1 which is large and heavy is used as a focusing lens group, it is possible to reduce the size and the weight of the focusing lens group and to increase a focusing speed.

In the variable magnification optical system ZL, it is preferable that focusing be performed by moving the second lens group G2 in the optical axis direction as a focusing lens group.

According to this configuration, it is possible to decrease the size and the weight of a focusing lens group and to reliably increase a focusing speed. Moreover, the moving distance for focusing in the wide-angle end state can be controlled to be approximately equal to that in the wide-angle end state, and a focusing error when varying magnification is performed upon focusing on an object at a close point can be reduced.

Preferably, the variable magnification optical system ZL satisfies Conditional Expression (13) below.

$$0.500 < f2/f3 < 2.000 \qquad (13)$$

where f2: a focal length of the second lens group G2 f3: a focal length of the third lens group G3

Conditional Expression (13) is a conditional expression for defining an appropriate focal length ratio between the second and third lens groups G2 and G3 when focusing is performed using the second lens group G2. When Conditional Expression (13) is satisfied, it is possible to decrease a difference in a focusing moving distance between in the wide-angle end state and the telephoto end state.

When the focal length ratio exceeds the upper limit value of Conditional Expression (13), the focal length of the second lens group G2 is increased and the focusing moving distance is increased. Due to this, the focusing mechanism becomes complex and the focusing speed is decreased. Particularly, the focusing moving distance in the telephoto end state is increased and a focusing error when varying magnification is performed upon focusing on an object at a close point is increased undesirably.

In order to obtain the effect reliably, it is preferable that the upper limit value of Conditional Expression (13) be set to 1.900. In order to obtain the effect more reliably, it is preferable that the upper limit value of Conditional Expression (13) be set to 1.800.

If the focal length ratio is smaller than the lower limit value of Conditional Expression (13), the focal length of the second lens group G2 is decreased and the focusing moving distance in the wide-angle end state is increased. Due to this, a difference in a focusing moving distance between in the wide-angle end state and the telephoto end state is increased, and a focusing error when varying magnification is performed upon focusing on an object at a close point is increased undesirably.

In order to obtain the effect reliably, it is preferable that the lower limit value of Conditional Expression (13) be set to 0.700. In order to obtain the effect more reliably, it is preferable that the lower limit value of Conditional Expression (13) be set to 0.900.

In this way, it is possible to implement the variable magnification optical system ZL which has a bright F-value and a wide angle of view and in which various aberrations are corrected satisfactorily.

The above-described variable magnification optical system ZL may be included in the camera (an optical apparatus) illustrated in FIG. 33.

As can be understood from respective examples to be described later, the variable magnification optical system ZL mounted on the camera 1 as the image capturing lens 2 has a bright F-value and a wide angle of view and has a satisfactory optical performance such that various aberrations are corrected satisfactorily due to its characteristic lens configuration. Therefore, according to the camera 1, it is possible to implement an optical apparatus which has a bright F-value and a wide angle of view and has a satisfactory optical performance such that various aberrations are corrected satisfactorily.

Although a mirrorless camera has been described as an example of the camera 1, the camera is not limited to this. For example, the same effect as the camera 1 can be obtained even when the above-described variable magnification optical system ZL is mounted on a single-lens reflex camera which has a quick return mirror on a camera body and views a subject using a finder optical system.

Figure 38:
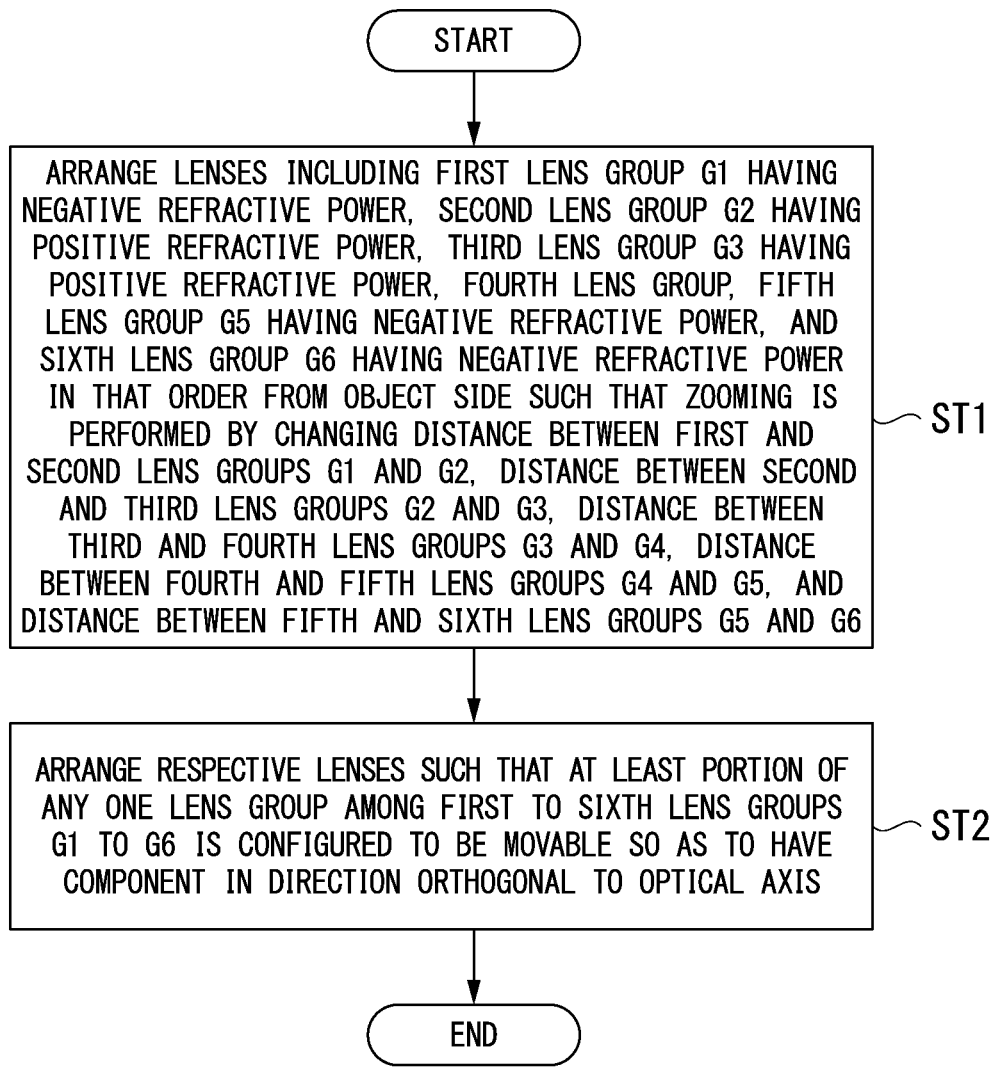
FIG. 38 is a diagram illustrating an outline of another example of a method for manufacturing a variable magnification optical system.
Figure 39:
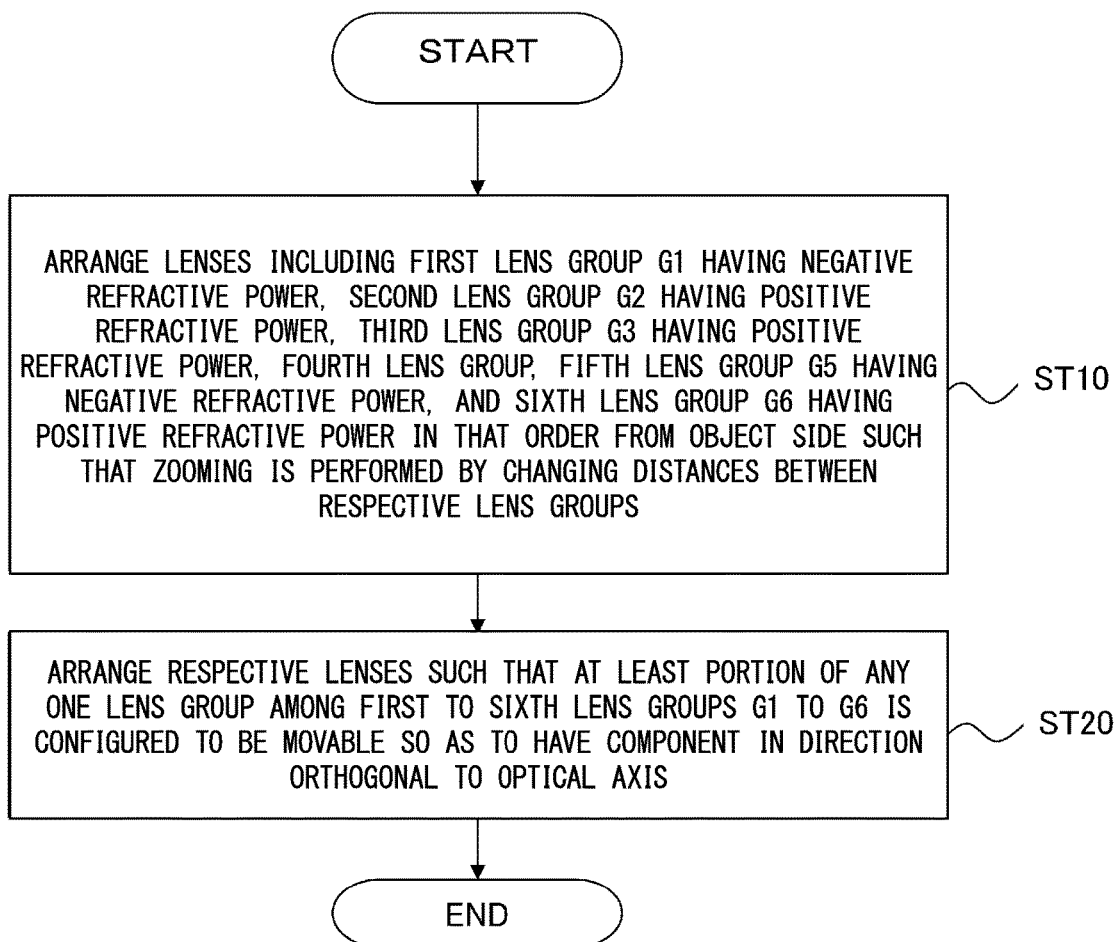
FIG. 39 is a diagram illustrating an outline of another example of a method for manufacturing a variable magnification optical system.

Next, an example of a method for manufacturing the above-described variable magnification optical system ZL will be described. FIGS. 38 and 39 illustrate an example of a method for manufacturing the variable magnification optical system ZL.

In the example illustrated in FIG. 38, first, respective lenses including a first lens group G1 having a negative refractive power; a second lens group G2 having a positive refractive power; a third lens group G3 having a positive refractive power; a fourth lens group G4; a fifth lens group G5 having a negative refractive power; and a sixth lens group G6 having a positive refractive power are arranged, in order from the object, in a lens barrel such that varying magnification is performed by changing the distance between the first and second lens groups G1 and G2, the distance between the second and third lens groups G2 and G3, the distance between the third and fourth lens groups G3 and G4, the distance between the fourth and fifth lens groups G4 and G5, and the distance between the fifth and sixth lens groups G5 and G6 (step ST1). The respective lenses are arranged such that at least a portion of any one lens group among the first to sixth lens groups G1 to G6 is configured to be movable so as to have a component in the direction orthogonal to the optical axis (step ST2).

In the example illustrated in FIG. 39, first, respective lenses including a first lens group G1 having a negative refractive power; a second lens group G2 having a positive refractive power; a third lens group G3 having a positive refractive power; a fourth lens group G4; a fifth lens group G5 having a negative refractive power; and a sixth lens group G6 having a positive refractive power are arranged, in order from the object, in a lens barrel such that varying magnification is performed by changing the distances between the respective lens groups (step ST10). The respective lenses are arranged such that at least a portion of any one lens group among the first to sixth lens groups G1 to G6 is configured to be movable so as to have a component in the direction orthogonal to the optical axis in order to correct image blur (step ST20).

According to an example of a lens arrangement, as illustrated in FIG. 21, a negative meniscus lens L11 having a concave surface oriented toward an image side, a biconcave lens L12, a biconcave lens L13, and a biconvex lens L14 are arranged, in order from the object, to form the first lens group G1. A biconvex lens L21 and a cemented lens including a negative meniscus lens L22 having a concave surface oriented toward the image side and a positive meniscus lens L23 having a convex surface oriented toward the object side are arranged, in order from the object, to form the second lens group G2. A cemented lens including a biconvex lens L31 and a negative meniscus lens L32 having a concave surface oriented toward the object side arranged in order from the object forms the third lens group G3. A biconcave lens L41 and a biconvex lens L42 are arranged, in order from the object, to form the fourth lens group G4. A cemented lens including a biconcave lens L51 and a positive meniscus lens L52 having a convex surface oriented toward the object side arranged in order from the object forms the fifth lens group G5. A biconvex lens L61, a cemented lens including a biconvex lens L62 and a biconcave lens L63, and a cemented lens including a biconvex lens L64 and a biconcave lens L65 are arranged, in order from the object, to form the sixth lens group G6. The respective lens groups prepared in this manner are arranged in the above-described order to manufacture the variable magnification optical system ZL.

According to the above-described manufacturing method, it is possible to manufacture the variable magnification optical system ZL which has a bright F-value and a wide angle of view and in which various aberrations are corrected satisfactorily.

Hereinafter, respective examples will be described with reference to the drawings.

Figure 25:
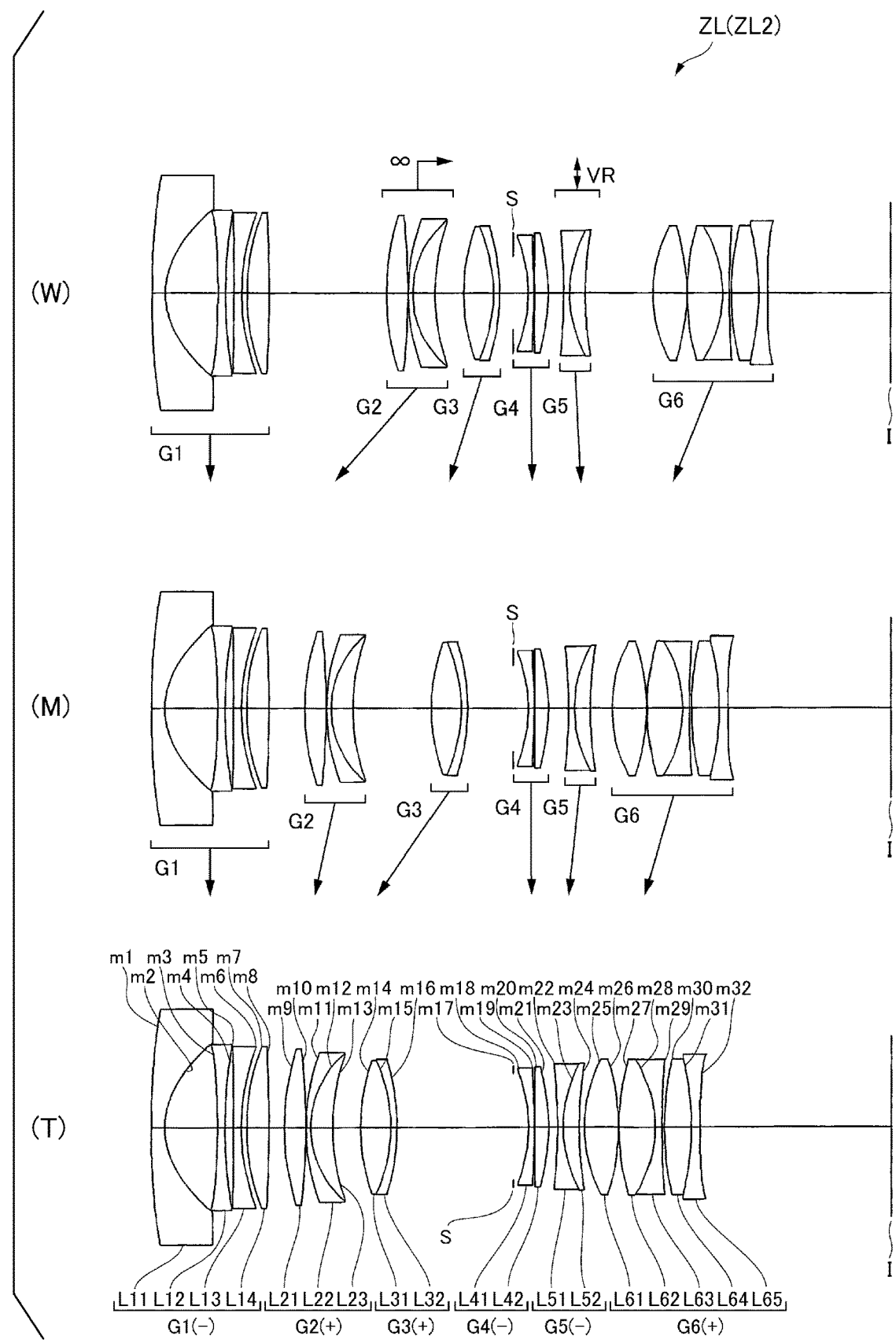
FIG. 25 is a cross-sectional view of a variable magnification optical system according to Example 7, wherein parts (W), (M), and (T) are in a wide-angle end state, an intermediate focal length state, and a telephoto end state, respectively.
Figure 29:
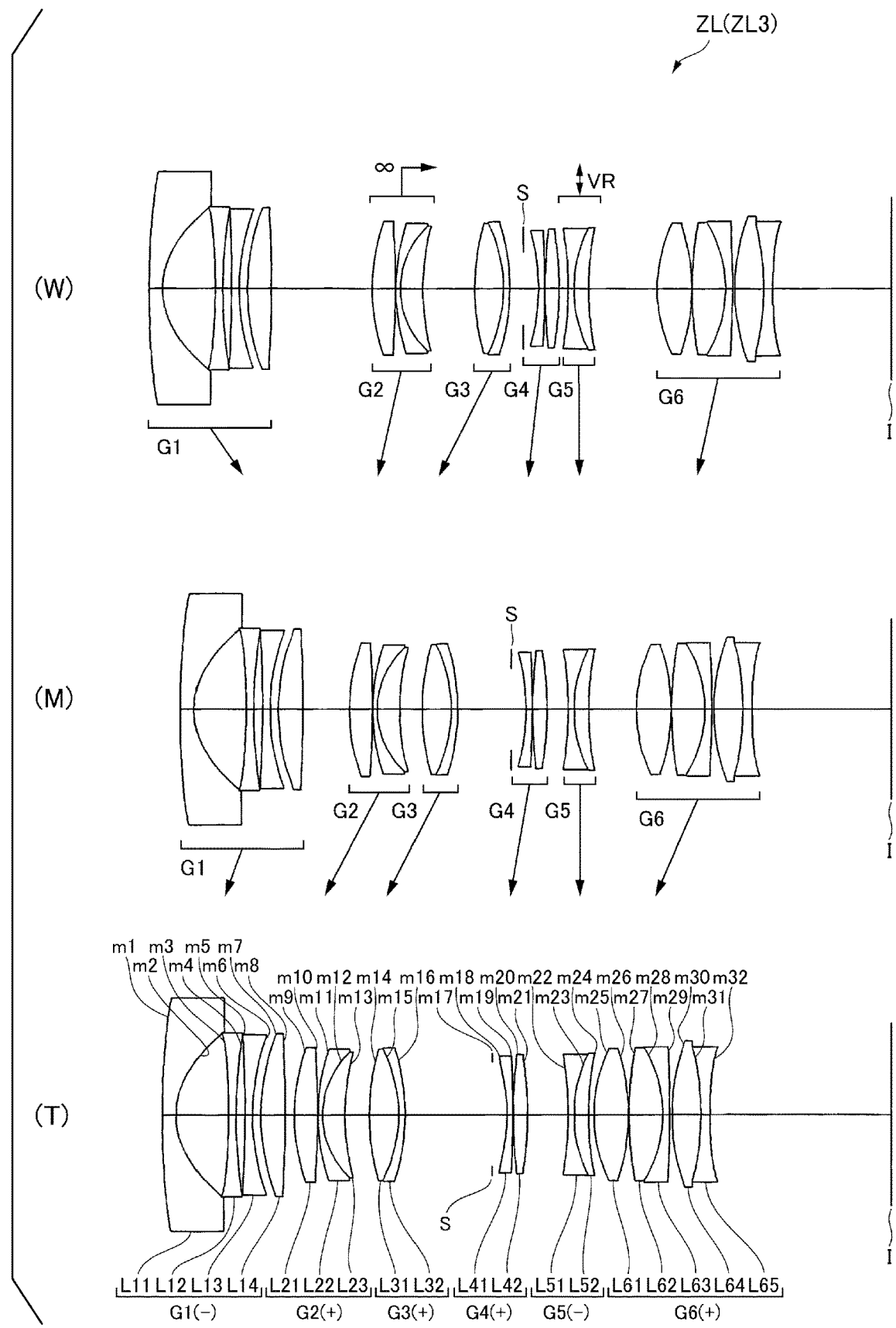
FIG. 29 is a cross-sectional view of a variable magnification optical system according to Example 8, wherein parts (W), (M), and (T) are in a wide-angle end state, an intermediate focal length state, and a telephoto end state, respectively.

FIGS. 21, 25, and 29 are cross-sectional views illustrating the configuration and the refractive power allocation of variable magnification optical systems ZL (ZL1 to ZL3) according to respective examples. In the lower part of the cross-sectional views of the variable magnification optical systems ZL1 to ZL3, the moving directions along the optical axis of each lens group upon varying magnification from the wide-angle end state (W) to the telephoto end state (T) via the intermediate focal length state (M) are indicated by arrows. In the upper part of the cross-sectional views of the variable magnification optical systems ZL1 to ZL3, the moving direction of the focusing lens group upon focusing from an object at infinity to an object at a close distance is indicated by an arrow and the state of the vibration-reduction lens group VR when correcting image blur is also illustrated.

Respective reference symbols in FIG. 21 associated with Example 6 are used independently in respective examples in order to avoid complication of description due to an increased number of reference symbol characters. Therefore, even when components in diagrams associated with other examples are denoted by the same reference symbols as used in FIG. 21, these components do not necessarily have the same configuration as those of other examples.

Tables 6 to 8 illustrated below are tables of respective specifications of Examples 6 to 8.

In the respective examples, the d-line (wavelength: 587.562 nm) and the g-line (wavelength: 435.835 nm) are selected as an aberration characteristics calculation target.

In [Lens Specification] in tables, a surface number indicates a sequence number of an optical surface from an object side along a traveling direction of light, R indicates a radius of curvature of each optical surface, D indicates a surface distance which is the distance on the optical axis from each optical surface to the next optical surface (or an image plane), nd indicates a refractive index for the d-line, of a material of an optical member, and vd indicates the Abbe number for the d-line, of a material of an optical member. Moreover, Di indicates a surface distance between an i-th surface and an (i+1)th surface and Aperture stop indicates an aperture stop S. When the optical surface is an aspherical surface, a mark "*" is assigned to the surface number and a paraxial radius of curvature is shown in the radius of curvature column R.

In [Aspheric Data] in tables, the shape of an aspherical surface shown in [Lens Specification] is expressed by Equation (a) below. X(y) indicates the distance along the optical axis direction from a tangential plane at the vertex of an aspherical surface to a position on the aspherical surface at a height y, R indicates a radius of curvature (a paraxial radius of curvature) of a reference spherical surface, κ indicates a conic constant, and Ai indicates an aspheric coefficient at degree i. "E-n" indicates "×10$^{-n}$". For example, 1.234E−05=1.234×10$^{-5}$. An aspheric coefficient A2 at degree 2 is 0 and is not illustrated.

$$X(y)=(y^2/R)/\{1+(1-\kappa\times y^2/R^2)^{1/2}\}+A4\times y^4+A6\times y^6+A8\times y^8+A10\times y^{10} \qquad (a)$$

In [Various Data] in tables, f indicates a focal length of an entire lens system, FNo indicates the F-number, ω indicates a half-angle of view (unit: °), Y indicates the maximum image height, BF indicates the distance (an air-conversion length) from the last lens surface to the image plane I on the optical axis upon focusing on an object at infinity, and TL indicates the sum of BF and the distance from the frontmost lens surface to the last lens surface on the optical axis upon focusing on an object at infinity.

In [Variable Distance Data] in tables, Di indicates a surface distance between an i-th surface and an (i+1)th surface, D0 indicates an axial air distance between an object plane and a lens surface closest to an object, of the first lens group G1, f indicates the focal length of an entire lens system, and β indicates an imaging magnification.

In [Lens Group Data] in tables, the starting surface and the focal length of the lens groups are shown.

In [Conditional Expression Correspondence Values] in tables, values corresponding to Conditional Expressions (9) to (13) are illustrated.

Hereinafter, "mm" is generally used as the unit of the focal length f, the radius of curvature R, the surface distance D, and other lengths and the like described in all specification values unless particularly stated otherwise. However, the unit is not limited to this since an equivalent optical performance is obtained even when the optical system is proportionally expanded or reduced. Moreover, the unit is not limited to "mm" and other appropriate units may be used.

The above description of tables is common to all examples, and description thereof will not be provided below.

Example 6

Example 6 will be described with reference to FIGS. 21 to 24 and Table 6. As illustrated in FIG. 21, a variable magnification optical system ZL (ZL1) according to Example 6 is constituted by, in order from an object, a first lens group G1 having a negative refractive power; a second lens group G2 having a positive refractive power; a third lens group G3 having a positive refractive power; a fourth lens group G4 having a negative refractive power; a fifth lens group G5 having a negative refractive power; and a sixth lens group G6 having a positive refractive power.

The first lens group G1 is constituted by, in order from the object, a negative meniscus lens L11 having a concave surface oriented toward the image side, a biconcave lens L12, a biconcave lens L13, and a biconvex lens L14. The negative meniscus lens L11 has an aspherical surface on both sides thereof. Moreover, the biconcave lens L12 has an aspherical object-side surface.

The second lens group G2 is constituted by, in order from the object, a biconvex lens L21 and a cemented lens including a negative meniscus lens L22 having a concave surface oriented toward the image side and a positive meniscus lens L23 having a convex surface oriented toward the object side.

The third lens group G3 is constituted by a cemented lens including, in order from the object, a biconvex lens L31 and a negative meniscus lens L32 having a concave surface oriented toward the object side.

The fourth lens group G4 is constituted by, in order from the object, a biconcave lens L41 and a biconvex lens L42.

The fifth lens group G5 is constituted by a cemented lens including, in order from the object, a biconcave lens L51 and a positive meniscus lens L52 having a convex surface oriented toward the object side. The positive meniscus lens L52 has an aspherical image-side surface.

The sixth lens group G6 is constituted by, in order from the object, a biconvex lens L61, a cemented lens including a biconvex lens L62 and a biconcave lens L63, and a cemented lens including a biconvex lens L64 and a biconcave lens L65. The biconcave lens L65 has an aspherical image-side surface.

An aperture stop S is provided between the third lens group G3 and the fourth lens group G4, and the aperture stop S forms the fourth lens group G4.

Varying magnification from the wide-angle end state to the telephoto end state is performed by moving the first lens group G1 toward the image side and moving the same toward the object side, moving the second lens group G2 toward the object side, moving the third lens group G3 toward the object side, moving the fourth lens group G4 toward the object side, moving the fifth lens group G5 toward the object side, and moving the sixth lens group G6 toward the object side such that the distances between the respective lens groups (the distance between the first and second lens groups G1 and G2, the distance between the second and third lens groups G2 and G3, the distance between the third and fourth lens groups G3 and G4, the distance between the fourth and fifth lens groups G4 and G5, and the distance between the fifth and sixth lens groups G5 and G6) are changed. The aperture stop S is moved toward the object side integrally with the fourth lens group G4.

Focusing from an object at infinity to an object at a close distance is performed by moving the second lens group G2 toward the image side.

When image blur occurs, image blur correction (vibration reduction) on the image plane I is performed by moving the fifth lens group G5 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 6, in the wide-angle end state, since the vibration reduction coefficient is −0.64 and the focal length is 16.40 mm, the moving distance of the vibration-reduction lens group VR for correcting the rotation blur of 0.81° is −0.36 mm. In the intermediate focal length state, since the vibration reduction coefficient is −0.76 and the focal length is 23.50 mm, the moving distance of the vibration-reduction lens group VR for correcting the rotation blur of 0.68° is −0.36 mm. In the telephoto end state, since the vibration reduction coefficient is −0.93 and the focal length is 34.00 mm, the moving distance of the vibration-reduction lens group VR for correcting the rotation blur of 0.57° is −0.36 mm.

Table 6 illustrates the values of respective specifications of Example 6. Surface numbers 1 to 32 in Table 6 correspond to optical surfaces of m1 to m32 illustrated in FIG. 21.

TABLE 6

| [Lens Specification] | | | | |
| --- | --- | --- | --- | --- |
| Surface number | R | D | nd | vd |
| *1 | 151.57543 | 3.000 | 1.76690 | 46.9 |
| *2 | 16.71640 | 11.694 | 1.00000 | |
| *3 | −185.40568 | 1.700 | 1.76690 | 46.9 |
| 4 | 99.91509 | 2.170 | 1.00000 | |
| 5 | −274.19230 | 1.700 | 1.49700 | 81.7 |
| 6 | 49.10090 | 1.360 | 1.00000 | |
| 7 | 48.81906 | 5.099 | 1.75520 | 27.6 |
| 8 | −219.36815 | (D8) | 1.00000 | |
| 9 | 46.26831 | 4.082 | 1.64769 | 33.7 |
| 10 | −187.68256 | 0.100 | 1.00000 | |
| 11 | 56.37531 | 1.000 | 1.84666 | 23.8 |
| 12 | 19.88291 | 4.835 | 1.60342 | 38.0 |
| 13 | 62.23978 | (D13) | 1.00000 | |
| 14 | 50.91403 | 6.157 | 1.49700 | 81.7 |
| 15 | −37.11951 | 1.400 | 1.84666 | 23.8 |
| 16 | −49.12403 | (D16) | 1.00000 | |
| 17 | (Aperture stop) | 3.263 | 1.00000 | |
| 18 | −37.34848 | 1.300 | 1.90366 | 31.3 |
| 19 | 339.67895 | 1.232 | 1.00000 | |
| 20 | 109.52156 | 3.549 | 1.84666 | 23.8 |
| 21 | −57.24803 | (D21) | 1.00000 | |
| 22 | −96.39093 | 1.300 | 1.80400 | 46.6 |
| 23 | 33.70480 | 3.529 | 1.80518 | 25.4 |
| *24 | 130.78415 | (D24) | 1.00000 | |
| 25 | 30.94169 | 7.448 | 1.49700 | 81.7 |
| 26 | −51.16421 | 0.100 | 1.00000 | |
| 27 | 51.26380 | 7.685 | 1.49700 | 81.7 |
| 28 | −28.22102 | 1.500 | 1.74950 | 35.2 |
| 29 | 70.36935 | 1.879 | 1.00000 | |
| 30 | 44.36240 | 6.229 | 1.49700 | 81.7 |
| 31 | −60.00000 | 2.000 | 1.80610 | 41.0 |
| *32 | 8552.25410 | (D32) | 1.00000 | |

| [Aspheric Data] | | | | | |
| --- | --- | --- | --- | --- | --- |
| Surface | κ | A4 | A6 | A8 | A10 |
| 1 | 1.00000e+00 | 1.52765e−06 | −2.32063e−09 | −3.31568e−12 | 6.28041e−15 |
| 2 | 0.00000e+00 | 8.58810e−06 | −3.90468e−10 | 8.78796e−11 | −3.06104e−13 |
| 3 | 1.00000e+00 | −2.38304e−06 | 2.33737e−10 | 4.37038e−11 | −1.95636e−13 |
| 24 | 1.00000e+00 | −1.34495e−06 | −1.30741e−09 | 1.88294e−11 | −4.98252e−14 |
| 32 | 1.00000e+00 | 1.59358e−05 | 1.01734e−08 | 8.62033e−12 | 3.21603e−14 |

TABLE 6-continued

[Various Data]

|   | W | M | T |
|---|---|---|---|
| f | 16.40 | 23.50 | 34.00 |
| FNo | 2.88 | 2.88 | 2.93 |
| ω | 54.0 | 40.5 | 29.6 |
| Y | 20.00 | 20.00 | 20.00 |
| TL | 163.818 | 161.015 | 162.021 |
| BF | 26.430 | 35.126 | 45.401 |

[Variable Distance Data]

|   | Focusing on infinity | | | Focusing on close point | | |
|---|---|---|---|---|---|---|
|   | W | M | T | W | M | T |
| D0 | ∞ | ∞ | ∞ | 336.18 | 338.99 | 337.98 |
| β | — | — | — | −0.0457 | −0.0652 | −0.0949 |
| f | 16.40 | 23.50 | 34.00 | — | — | — |
| D8 | 25.987 | 9.457 | 2.038 | 27.527 | 11.210 | 3.979 |
| D13 | 7.006 | 12.655 | 5.930 | 5.466 | 10.902 | 3.989 |
| D16 | 3.000 | 9.141 | 20.142 | 3.000 | 9.141 | 20.142 |
| D21 | 2.000 | 3.664 | 2.000 | 2.000 | 3.664 | 2.000 |
| D24 | 14.086 | 5.661 | 1.200 | 14.086 | 5.661 | 1.200 |
| D32 | 26.430 | 35.126 | 45.401 | 26.430 | 35.126 | 45.401 |

[Lens Group Data]

| Lens group | Starting surface | Focal distance |
|---|---|---|
| 1st lens group | 1 | −22.97 |
| 2nd lens group | 9 | 85.91 |
| 3rd lens group | 14 | 57.96 |
| 4th lens group | 17 | −366.64 |
| 5th lens group | 22 | −68.50 |
| 6th lens group | 25 | 41.25 |

[Conditional Expression Correspondence Values]

Conditional Expression (9)  f5/f4 = 0.187
Conditional Expression (10) (−f1)/f6 = 0.557
Conditional Expression (11) f1/f4 = 0.063
Conditional Expression (12) A(T3.5)/A(T4.0) = 1.735
                            (A(T3.5) = −0.0111, A(T4.0) = −0.0064)
Conditional Expression (13) f2/f3 = 1.482

It can be understood from Table 6 that the variable magnification optical system ZL1 according to Example 6 satisfies Conditional Expressions (9) to (13).

Figure 22:
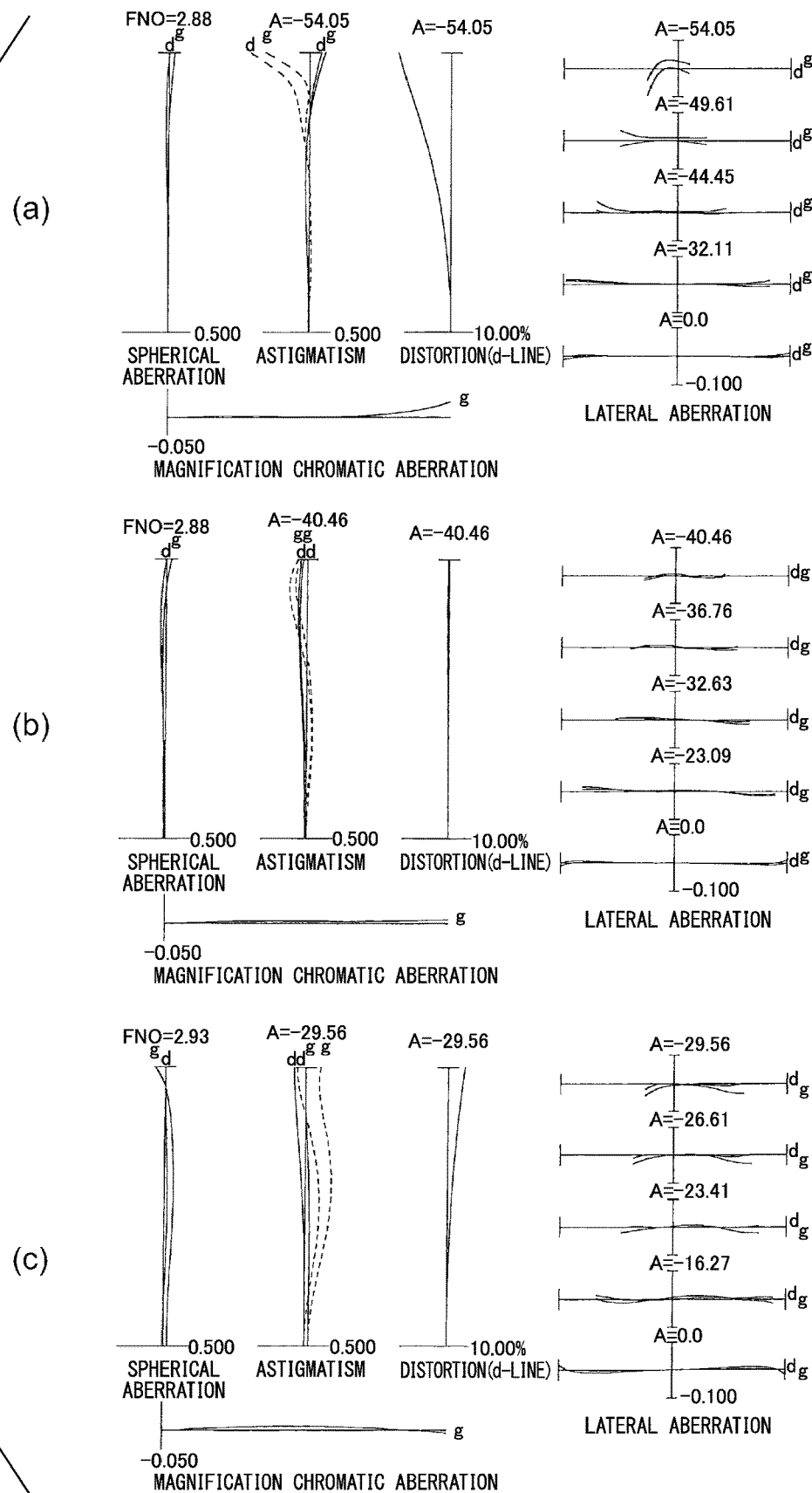
FIG. 22 shows graphs illustrating various aberrations of the variable magnification optical system according to Example 6 upon focusing on an object at infinity, wherein parts (a), (b), and (c) are in the wide-angle end state, the intermediate focal length state, and the telephoto end state, respectively.
Figure 23:
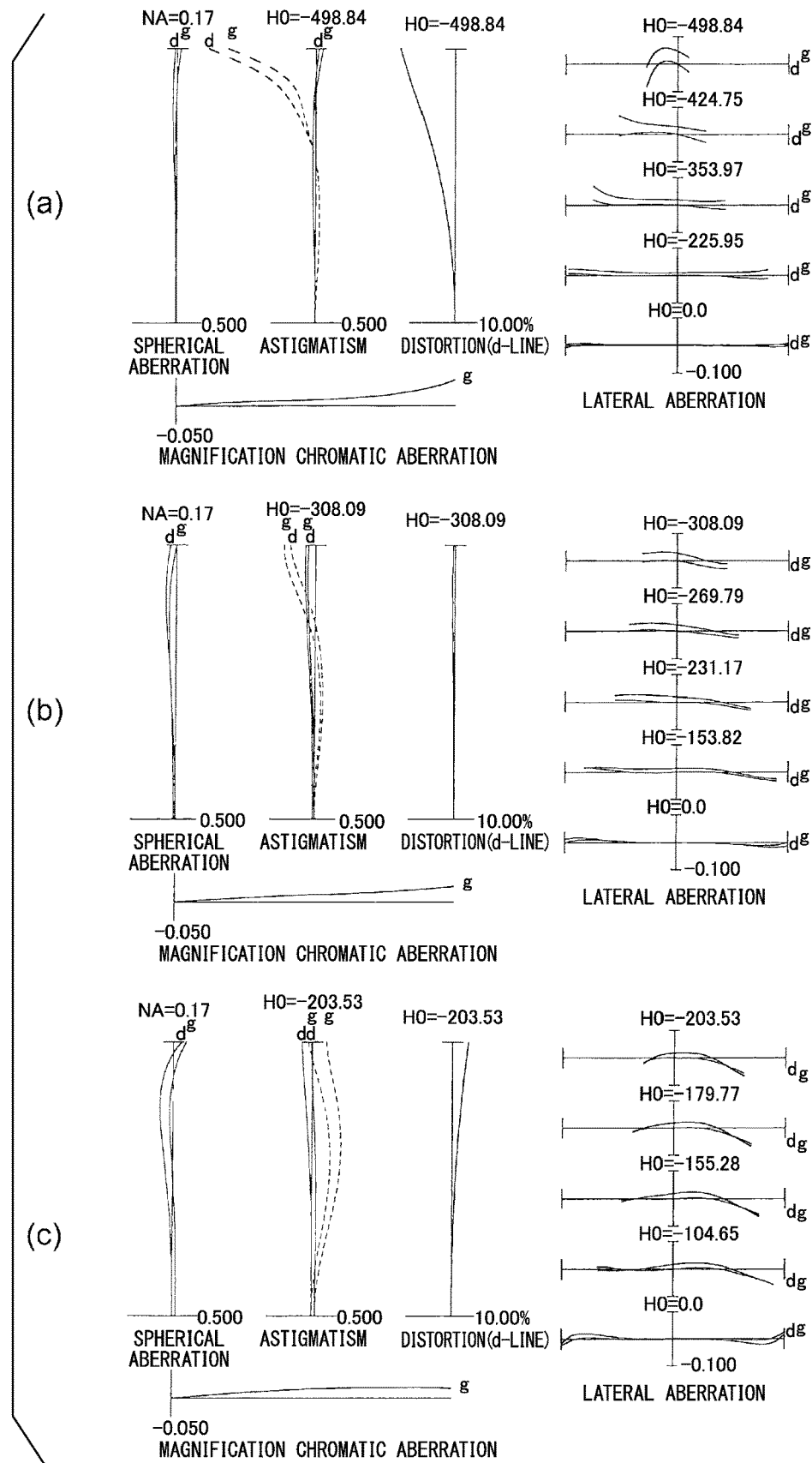
FIG. 23 shows graphs illustrating various aberrations of the variable magnification optical system according to Example 6 upon focusing on an object at a close point, wherein parts (a), (b), and (c) are in the wide-angle end state, the intermediate focal length state, and the telephoto end state, respectively.

FIG. 22 shows graphs illustrating various aberrations (spherical aberration, astigmatism, distortion, magnification chromatic aberration, and lateral aberration) upon focusing on an object at infinity, of the variable magnification optical system ZL1 according to Example 6, in which part (a) illustrates the wide-angle end state, part (b) illustrates the intermediate focal length state, and part (c) illustrates the telephoto end state. FIG. 23 shows graphs illustrating various aberrations (spherical aberration, astigmatism, distortion, magnification chromatic aberration, and lateral aberration) upon focusing on an object at a close point, of the variable magnification optical system ZL1 according to Example 6, in which part (a) illustrates the wide-angle end state, part (b) illustrates the intermediate focal length state, and part (c) illustrates the telephoto end state. FIG. 24 shows graphs illustrating lateral aberration of the variable magnification optical system ZL1 according to Example 6 when image blur correction is performed upon focusing on an object at infinity, in which part (a) illustrates the wide-angle end state, part (b) illustrates the intermediate focal length state, and part (c) illustrates the telephoto end state.

In the graphs illustrating respective aberrations, FNO indicates the F-number, NA indicates a numerical aperture, A indicates a half-angle of view (unit: °) at each image height, and H0 indicates an object height. d indicates aberration at the d-line and g indicates aberration at the g-line. Moreover, aberrations without these characters indicate aberrations at the d-line. In the graphs illustrating the spherical aberration upon focusing on an object at infinity, the F-number values corresponding to the maximum aperture are illustrated. In the graphs illustrating the spherical aberration upon focusing on an object at a close point, the numerical aperture values corresponding to the maximum aperture are illustrated. In the graphs illustrating the astigmatism, a solid line indicates the sagittal image plane and a broken line indicates the meridional image plane.

The same reference symbols as in this example are used in the aberration graphs of respective examples to be described later.

It can be understood from FIGS. 22 to 24 that the variable magnification optical system ZL1 according to Example 6 has a satisfactory optical performance such that various aberrations are satisfactorily corrected in states ranging from the wide-angle end state to the telephoto end state and from the focusing-on-infinity state to the focusing-on-close-point state. Moreover, it can be understood that the variable magnification optical system ZL1 has an excellent imaging performance upon image blur correction.

Example 7

Example 7 will be described with reference to FIGS. 25 to 28 and Table 7. As illustrated in FIG. 25, a variable magnification optical system ZL (ZL2) according to Example 7 is constituted by, in order from an object, a first lens group G1 having a negative refractive power; a second lens group G2 having a positive refractive power; a third lens group G3 having a positive refractive power; a fourth lens group G4 having a negative refractive power; a fifth lens group G5 having a negative refractive power; and a sixth lens group G6 having a positive refractive power.

The first lens group G1 is constituted by, in order from the object, a negative meniscus lens L11 having a concave surface oriented toward the image side, a biconcave lens L12, a biconcave lens L13, and a biconvex lens L14. The negative meniscus lens L11 has an aspherical surface on both sides thereof. Moreover, the biconcave lens L12 has an aspherical object-side surface.

The second lens group G2 is constituted by, in order from the object, a biconvex lens L21 and a cemented lens including a negative meniscus lens L22 having a concave surface oriented toward the image side and a positive meniscus lens L23 having a convex surface oriented toward the object side.

The third lens group G3 is constituted by a cemented lens including, in order from the object, a biconvex lens L31 and a negative meniscus lens L32 having a concave surface oriented toward the object side.

The fourth lens group G4 is constituted by, in order from the object, a negative meniscus lens L41 having a concave surface oriented toward the object side and a biconvex lens L42.

The fifth lens group G5 is constituted by a cemented lens including, in order from the object, a biconcave lens L51 and a positive meniscus lens L52 having a convex surface oriented toward the object side. The positive meniscus lens L52 has an aspherical image-side surface.

The sixth lens group G6 is constituted by, in order from the object, a biconvex lens L61, a cemented lens including a biconvex lens L62 and a biconcave lens L63, and a cemented lens including a biconvex lens L64 and a biconcave lens L65. The biconcave lens L65 has an aspherical image-side surface.

An aperture stop S is provided between the third lens group G3 and the fourth lens group G4, and the aperture stop S forms the fourth lens group G4.

Varying magnification from the wide-angle end state to the telephoto end state is performed by fixing the first lens group G1 in relation to the image plane, moving the second lens group G2 toward the object side, moving the third lens group G3 toward the object side, fixing the fourth lens group G4 in relation to the image plane, moving the fifth lens group G5 toward the image side and then moving the same toward the object side, and moving the sixth lens group G6 toward the object side such that the distances between the respective lens groups (the distance between the first and second lens groups G1 and G2, the distance between the second and third lens groups G2 and G3, the distance between the third and fourth lens groups G3 and G4, the distance between the fourth and fifth lens groups G4 and G5, and the distance between the fifth and sixth lens groups G5 and G6) are changed. The aperture stop S is fixed in relation to the image plane integrally with the fourth lens group G4.

Focusing from an object at infinity to an object at a close distance is performed by moving the second lens group G2 toward the image side.

When image blur occurs, image blur correction (vibration reduction) on the image plane I is performed by moving the fifth lens group G5 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 7, in the wide-angle end state, since the vibration reduction coefficient is −0.68 and the focal length is 16.40 mm, the moving distance of the vibration-reduction lens group VR for correcting the rotation blur of 0.81° is −0.34 mm. In the intermediate focal length state, since the vibration reduction coefficient is −0.83 and the focal length is 23.50 mm, the moving distance of the vibration-reduction lens group VR for correcting the rotation blur of 0.68° is −0.34 mm. In the telephoto end state, since the vibration reduction coefficient is −0.95 and the focal length is 34.00 mm, the moving distance of the vibration-reduction lens group VR for correcting the rotation blur of 0.57° is −0.35 mm.

Table 7 illustrates the values of respective specifications of Example 7. Surface numbers 1 to 32 in Table 7 correspond to optical surfaces of m1 to m32 illustrated in FIG. 25.

TABLE 7

| [Lens Specification] | | | | |
| --- | --- | --- | --- | --- |
| Surface number | R | D | nd | νd |
| *1 | 200.42947 | 3.000 | 1.76690 | 46.9 |
| *2 | 17.07497 | 11.709 | 1.00000 | |
| *3 | −200.00000 | 1.700 | 1.76690 | 46.9 |
| 4 | 109.91543 | 1.900 | 1.00000 | |
| 5 | −693.49354 | 1.700 | 1.49700 | 81.7 |
| 6 | 49.25847 | 1.200 | 1.00000 | |
| 7 | 50.08128 | 4.923 | 1.75520 | 27.6 |
| 8 | −295.12270 | (D8) | 1.00000 | |
| 9 | 56.93713 | 4.745 | 1.64769 | 33.7 |
| 10 | −156.65949 | 0.100 | 1.00000 | |
| 11 | 47.36415 | 1.000 | 1.84666 | 23.8 |
| 12 | 21.40251 | 4.835 | 1.60342 | 38.0 |
| 13 | 47.99942 | (D13) | 1.00000 | |
| 14 | 45.23118 | 6.615 | 1.49700 | 81.7 |
| 15 | −36.27556 | 1.400 | 1.84666 | 23.8 |
| 16 | −49.02120 | (D16) | 1.00000 | |

TABLE 7-continued

| | | | | |
|---|---|---|---|---|
| 17 | (Aperture stop) | 3.263 | 1.00000 | |
| 18 | −34.76577 | 1.300 | 1.90366 | 31.3 |
| 19 | −208.11349 | 0.100 | 1.00000 | |
| 20 | 1901.47190 | 3.098 | 1.84666 | 23.8 |
| 21 | −49.48608 | (D21) | 1.00000 | |
| 22 | −126.18353 | 1.300 | 1.80400 | 46.6 |
| 23 | 29.00114 | 3.536 | 1.80518 | 25.4 |
| *24 | 83.38799 | (D24) | 1.00000 | |
| 25 | 32.33148 | 7.547 | 1.49700 | 81.7 |
| 26 | −47.61976 | 0.100 | 1.00000 | |
| 27 | 54.51882 | 7.863 | 1.49700 | 81.7 |
| 28 | −28.00000 | 1.500 | 1.74950 | 35.2 |
| 29 | 206.04990 | 0.500 | 1.00000 | |
| 30 | 66.17138 | 6.083 | 1.49700 | 81.7 |
| 31 | −60.00000 | 2.000 | 1.80610 | 41.0 |
| *32 | 861.15398 | (D32) | 1.00000 | |

[Aspheric Data]

| Surface | κ | A4 | A6 | A8 | A10 |
|---|---|---|---|---|---|
| 1 | 1.00000e+00 | 7.17332e−07 | 5.06827e−10 | −3.44033e−12 | 4.39234e−15 |
| 2 | 0.00000e+00 | 2.76313e−06 | 5.96322e−09 | 1.96762e−11 | −9.83208e−14 |
| 3 | 1.00000e+00 | −3.91032e−06 | 1.30563e−09 | 7.32124e−12 | −8.19441e−14 |
| 24 | 1.00000e+00 | −1.84007e−06 | −1.52537e−09 | 3.88829e−11 | −1.13936e−13 |
| 32 | 1.00000e+00 | 1.32449e−05 | 9.98520e−09 | −1.19528e−11 | 7.08648e−14 |

[Various Data]

| | W | M | T |
|---|---|---|---|
| f | 16.40 | 23.50 | 34.00 |
| FNo | 2.89 | 2.89 | 2.88 |
| ω | 54.1 | 40.7 | 29.4 |
| Y | 20.00 | 20.00 | 20.00 |
| TL | 163.818 | 163.818 | 163.818 |
| BF | 27.200 | 36.104 | 42.239 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 336.18 | 336.18 | 336.18 |
| β | — | — | — | −0.0457 | −0.0658 | −0.0954 |
| f | 16.40 | 23.50 | 34.00 | — | — | — |
| D8 | 26.014 | 8.000 | 3.463 | 27.625 | 9.934 | 5.532 |
| D13 | 6.348 | 17.201 | 6.207 | 4.737 | 15.267 | 4.137 |
| D16 | 3.000 | 10.164 | 25.693 | 3.000 | 10.164 | 25.693 |
| D21 | 3.470 | 4.520 | 2.000 | 3.470 | 4.520 | 2.000 |
| D24 | 14.768 | 4.813 | 1.200 | 14.768 | 4.813 | 1.200 |
| D32 | 27.200 | 36.102 | 42.239 | 27.200 | 36.102 | 42.239 |

[Lens Group Data]

| Lens group | Starting surface | Focal distance |
|---|---|---|
| 1st lens group | 1 | −23.00 |
| 2nd lens group | 9 | 92.82 |
| 3rd lens group | 14 | 54.87 |
| 4th lens group | 17 | −326.41 |
| 5th lens group | 22 | −61.92 |
| 6th lens group | 25 | 38.74 |

[Conditional Expression Correspondence Values]

Conditional Expression (9) f5/f4 = 0.190
Conditional Expression (10) (−f1)/f6 = 0.594
Conditional Expression (11) f1/f4 = 0.070
Conditional Expression (12) A(T3.5)/A(T4.0) = 1.707
(A(T3.5) = −0.0102, A(T4.0) = −0.0060)
Conditional Expression (13) f2/f3 = 1.692

It can be understood from Table 7 that the variable magnification optical system ZL2 according to Example 7 satisfies Conditional Expressions (9) to (13).

Figure 26:
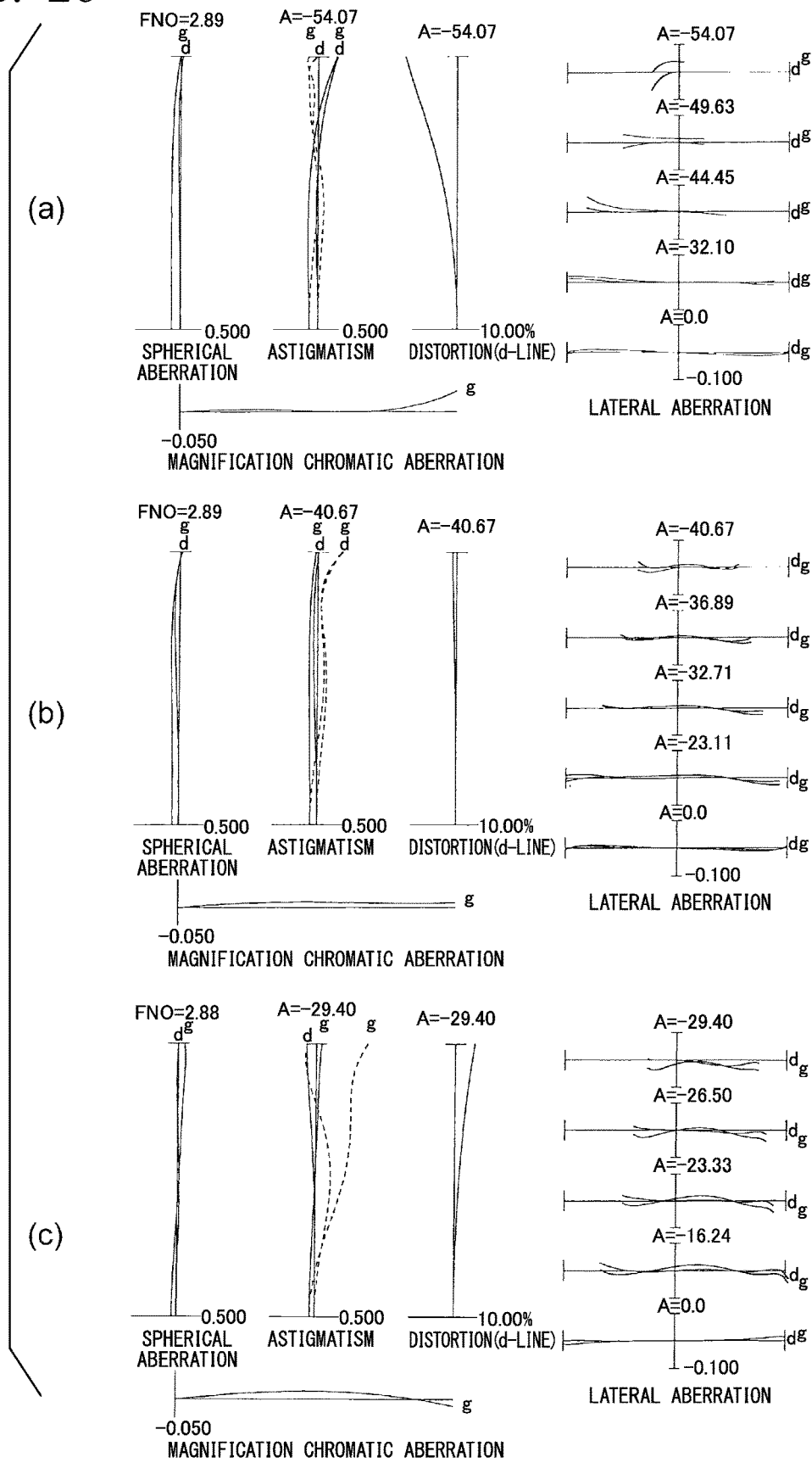
FIG. 26 shows graphs illustrating various aberrations of the variable magnification optical system according to Example 7 upon focusing on an object at infinity, wherein parts (a), (b), and (c) are in the wide-angle end state, the intermediate focal length state, and the telephoto end state, respectively.
Figure 27:
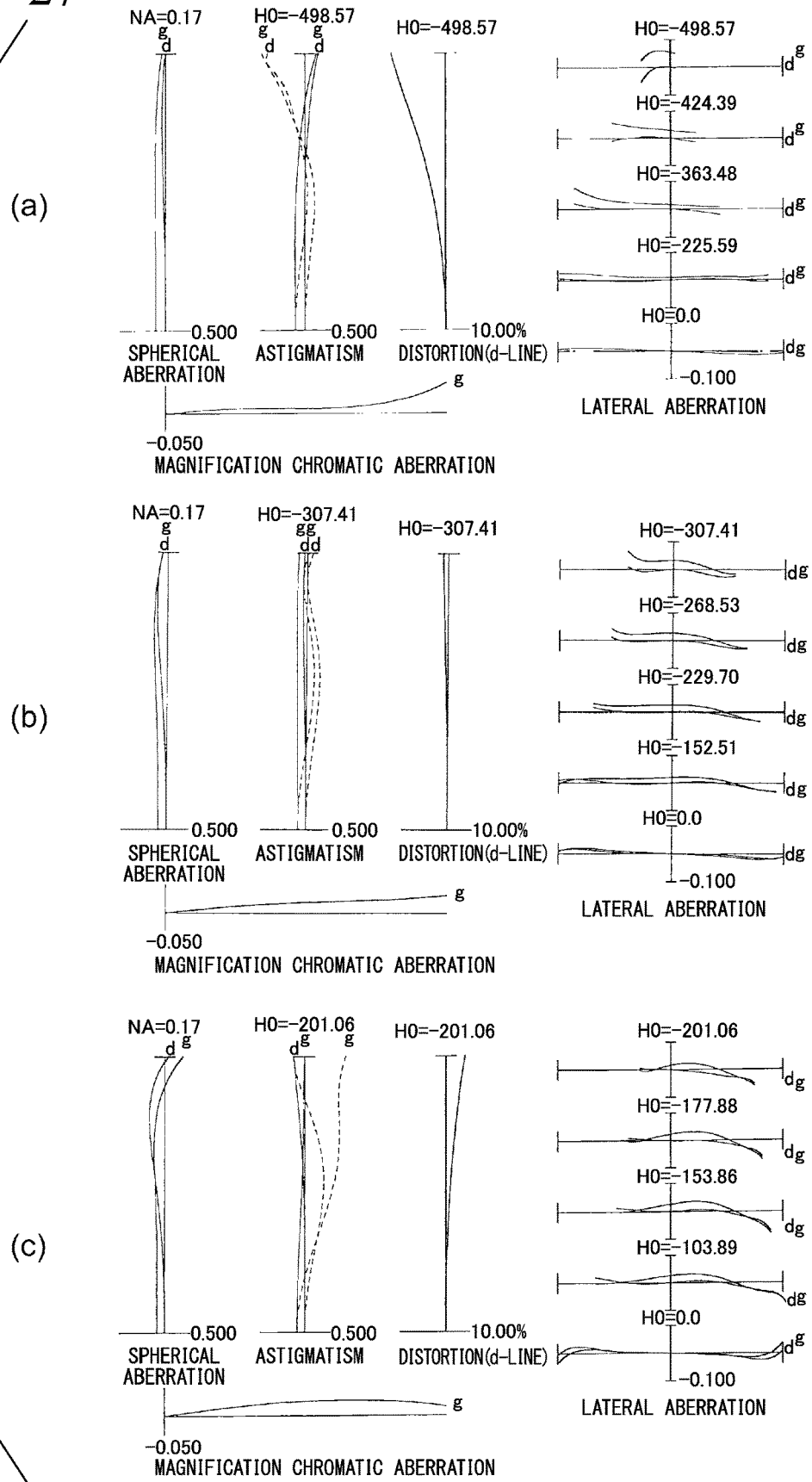
FIG. 27 shows graphs illustrating various aberrations of the variable magnification optical system according to Example 7 upon focusing on an object at a close point, wherein parts (a), (b), and (c) are in the wide-angle end state, the intermediate focal length state, and the telephoto end state, respectively.

FIG. 26 shows graphs illustrating various aberrations (spherical aberration, astigmatism, distortion, magnification chromatic aberration, and lateral aberration) upon focusing on an object at infinity, of the variable magnification optical system ZL2 according to Example 7, in which part (a) illustrates the wide-angle end state, part (b) illustrates the intermediate focal length state, and part (c) illustrates the telephoto end state. FIG. 27 shows graphs illustrating various aberrations (spherical aberration, astigmatism, distortion, magnification chromatic aberration, and lateral aberration) upon focusing on an object at a close point, of the variable magnification optical system ZL2 according to Example 7, in which part (a) illustrates the wide-angle end state, part (b) illustrates the intermediate focal length state, and part (c) illustrates the telephoto end state. FIG. 28 shows graphs illustrating lateral aberration of the variable magnification optical system ZL2 according to Example 7 when image blur correction is performed upon focusing on an object at infinity, in which part (a) illustrates the wide-angle end state, part (b) illustrates the intermediate focal length state, and part (c) illustrates the telephoto end state.

It can be understood from FIGS. 26 to 28 that the variable magnification optical system ZL2 according to Example 7 has a satisfactory optical performance such that various aberrations are satisfactorily corrected in states ranging from the wide-angle end state to the telephoto end state and from the focusing-on-infinity state to the focusing-on-close-point state. Moreover, it can be understood that the variable magnification optical system ZL2 has an excellent imaging performance upon image blur correction.

Example 8

Example 8 will be described with reference to FIGS. 29 to 32 and Table 8. As illustrated in FIG. 29, a variable magnification optical system ZL (ZL3) according to Example 8 is constituted by, in order from an object, a first lens group G1 having a negative refractive power; a second lens group G2 having a positive refractive power; a third lens group G3 having a positive refractive power; a fourth lens group G4 having a positive refractive power; a fifth lens group G5 having a negative refractive power; and a sixth lens group G6 having a positive refractive power.

The first lens group G1 is constituted by, in order from the object, a negative meniscus lens L11 having a concave surface oriented toward the image side, a biconcave lens L12, a biconcave lens L13, and a biconvex lens L14. The negative meniscus lens L11 has an aspherical surface on both sides thereof. Moreover, the biconcave lens L12 has an aspherical object-side surface.

The second lens group G2 is constituted by, in order from the object, a biconvex lens L21 and a cemented lens including a negative meniscus lens L22 having a concave surface oriented toward the image side and a positive meniscus lens L23 having a convex surface oriented toward the object side.

The third lens group G3 is constituted by, in order from the object, a cemented lens including a biconvex lens L31 and a negative meniscus lens L32 having a concave surface oriented toward the object side.

The fourth lens group G4 is constituted by, in order from the object, a negative meniscus lens L41 having a concave surface oriented toward the object side and a biconvex lens L42. The biconvex lens L42 has an aspherical image-side surface.

The fifth lens group G5 is constituted by a cemented lens including, in order from the object, a biconcave lens L51 and a positive meniscus lens L52 having a convex surface oriented toward the object side. The positive meniscus lens L52 has an aspherical image-side surface.

The sixth lens group G6 is constituted by, in order from the object, a biconvex lens L61, a cemented lens including a biconvex lens L62 and a negative meniscus lens L63 having a concave surface oriented toward the object side, and a cemented lens including a biconvex lens L64 and a biconcave lens L65. The biconvex lens L62 has an aspherical object-side surface. The biconcave lens L65 has an aspherical image-side surface.

An aperture stop S is provided between the third lens group G3 and the fourth lens group G4, and the aperture stop S forms the fourth lens group G4.

Varying magnification from the wide-angle end state to the telephoto end state is performed by moving the first lens group G1 toward the image side and then moving the same toward the object side, moving the second lens group G2 toward the object side, moving the third lens group G3 toward the object side, moving the fourth lens group G4 toward the object side, fixing the fifth lens group G5 in relation to the image plane, and moving the sixth lens group G5 toward the object side such that the distances between the respective lens groups are changed. The aperture stop S is moved toward the object side integrally with the fourth lens group G4.

Focusing from an object at infinity to an object at a close distance is performed by moving the second lens group G2 toward the image side.

When image blur occurs, image blur correction (vibration reduction) on the image plane I is performed by moving the fifth lens group G5 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 8, in the wide-angle end state, since the vibration reduction coefficient is −0.93 and the focal length is 16.40 mm, the moving distance of the vibration-reduction lens group VR for correcting the rotation blur of 0.81° is −0.25 mm. In the intermediate focal length state, since the vibration reduction coefficient is −1.02 and the focal length is 23.50 mm, the moving distance of the vibration-reduction lens group VR for correcting the rotation blur of 0.68° is −0.27 mm. In the telephoto end state, since the vibration reduction coefficient is −1.28 and the focal length is 34.00 mm, the moving distance of the vibration-reduction lens group VR for correcting the rotation blur of 0.57° is −0.26 mm.

Table 8 illustrates the values of respective specifications of Example 8. Surface numbers 1 to 32 in Table 8 correspond to optical surfaces of m1 to m32 illustrated in FIG. 29.

TABLE 8

[Lens Specification]

| Surface number | R | D | nd | νd |
|---|---|---|---|---|
| *1 | 208.62300 | 3.000 | 1.76690 | 46.9 |
| *2 | 16.71640 | 11.616 | 1.00000 | |
| *3 | −175.02069 | 1.700 | 1.76690 | 46.9 |
| 4 | 110.47412 | 1.976 | 1.00000 | |
| 5 | −309.93761 | 1.700 | 1.49700 | 81.7 |
| 6 | 50.80447 | 1.826 | 1.00000 | |
| 7 | 48.81082 | 5.374 | 1.75520 | 27.6 |
| 8 | −305.35584 | (D8) | 1.00000 | |
| 9 | 44.00730 | 5.080 | 1.64769 | 33.7 |
| 10 | −220.95399 | 0.100 | 1.00000 | |
| 11 | 45.68721 | 1.000 | 1.84666 | 23.8 |
| 12 | 18.95011 | 4.835 | 1.60342 | 38.0 |
| 13 | 51.37666 | (D13) | 1.00000 | |
| 14 | 52.59784 | 6.421 | 1.49700 | 81.7 |
| 15 | −32.17632 | 1.400 | 1.84666 | 23.8 |
| 16 | −47.86287 | (D16) | 1.00000 | |
| 17 | (Aperture stop) | 3.263 | 1.00000 | |
| 18 | −46.57030 | 1.300 | 1.90366 | 31.3 |
| 19 | −281.42063 | 0.100 | 1.00000 | |
| 20 | 109.62358 | 3.171 | 1.84666 | 23.8 |
| *21 | −72.38183 | (D21) | 1.00000 | |
| 22 | −78.11006 | 1.300 | 1.80400 | 46.6 |
| 23 | 29.63097 | 3.221 | 1.80518 | 25.4 |
| *24 | 65.36297 | (D24) | 1.00000 | |
| 25 | 33.81626 | 7.605 | 1.49700 | 81.7 |
| 26 | −44.63696 | 0.100 | 1.00000 | |
| *27 | 86.44474 | 7.374 | 1.49700 | 81.7 |
| 28 | −28.00000 | 1.500 | 1.74950 | 35.2 |
| 29 | −250.50625 | 0.500 | 1.00000 | |
| 30 | 46.84110 | 6.390 | 1.49700 | 81.7 |
| 31 | −60.00000 | 2.000 | 1.80610 | 41.0 |
| *32 | 122.72298 | (D32) | 1.00000 | |

[Aspheric Data]

| Surface | κ | A4 | A6 | A8 | A10 |
|---|---|---|---|---|---|
| 1 | 1.00000e+00 | 1.39337e−06 | −1.56403e−09 | −2.43613e−12 | 5.76634e−15 |
| 2 | 0.00000e+00 | 6.81735e−06 | −4.70283e−09 | 9.66754e−11 | −2.75609e−13 |
| 3 | 1.00000e+00 | −2.75105e−06 | −4.68963e−09 | 6.12032e−11 | −2.39910e−13 |
| 21 | 1.00000e+00 | 2.96251e−06 | −3.94707e−09 | 1.51980e−11 | −4.38181e−14 |
| 24 | 1.00000e+00 | −3.46562e−06 | 2.48929e−09 | 1.12700e−11 | −3.06893e−14 |
| 27 | 1.00000e+00 | 1.85219e−06 | −2.91274e−09 | −1.43450e−11 | 1.77124e−14 |
| 32 | 1.00000e+00 | 1.48107e−05 | 7.00561e−09 | −1.17225e−11 | 8.02298e−14 |

[Various Data]

| | W | M | T |
|---|---|---|---|
| f | 16.40 | 23.50 | 34.00 |
| FNo | 2.84 | 2.84 | 2.89 |
| ω | 54.1 | 39.9 | 29.4 |
| Y | 20.00 | 20.00 | 20.00 |
| TL | 163.819 | 156.784 | 160.573 |
| BF | 26.203 | 30.775 | 40.005 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 336.18 | 343.22 | 339.43 |
| β | — | — | — | −0.0457 | −0.0645 | −0.0945 |
| f | 16.40 | 23.50 | 34.00 | — | — | — |
| D8 | 22.206 | 10.203 | 2.000 | 23.643 | 11.741 | 3.714 |
| D13 | 11.561 | 4.934 | 5.407 | 10.123 | 3.396 | 3.693 |
| D16 | 3.000 | 11.883 | 19.173 | 3.000 | 11.883 | 19.173 |
| D21 | 2.000 | 4.717 | 8.936 | 2.000 | 4.717 | 8.936 |
| D24 | 14.997 | 10.421 | 1.200 | 14.997 | 10.421 | 1.200 |
| D32 | 26.203 | 30.775 | 40.005 | 26.203 | 30.775 | 40.005 |

TABLE 8-continued

[Lens Group Data]

| Lens group | Starting surface | Focal distance |
|---|---|---|
| 1st lens group | 1 | −22.37 |
| 2nd lens group | 9 | 76.68 |
| 3rd lens group | 14 | 62.47 |
| 4th lens group | 17 | 268.42 |
| 5th lens group | 22 | −43.69 |
| 6th lens group | 25 | 37.51 |

[Conditional Expression Correspondence Values]

Conditional Expression (9)  f5/f4 = −0.163
Conditional Expression (10) (−f1)/f6 = 0.596
Conditional Expression (11) f1/f4 = −0.083
Conditional Expression (12) A(T3.5)/A(T4.0) = 1.719
  (A(T3.5) = −0.0152, A(T4.0) = −0.0089)
Conditional Expression (13) f2/f3 = 1.227

It can be understood from Table 8 that the variable magnification optical system ZL3 according to Example 8 satisfies Conditional Expressions (9) to (13).

Figure 30:
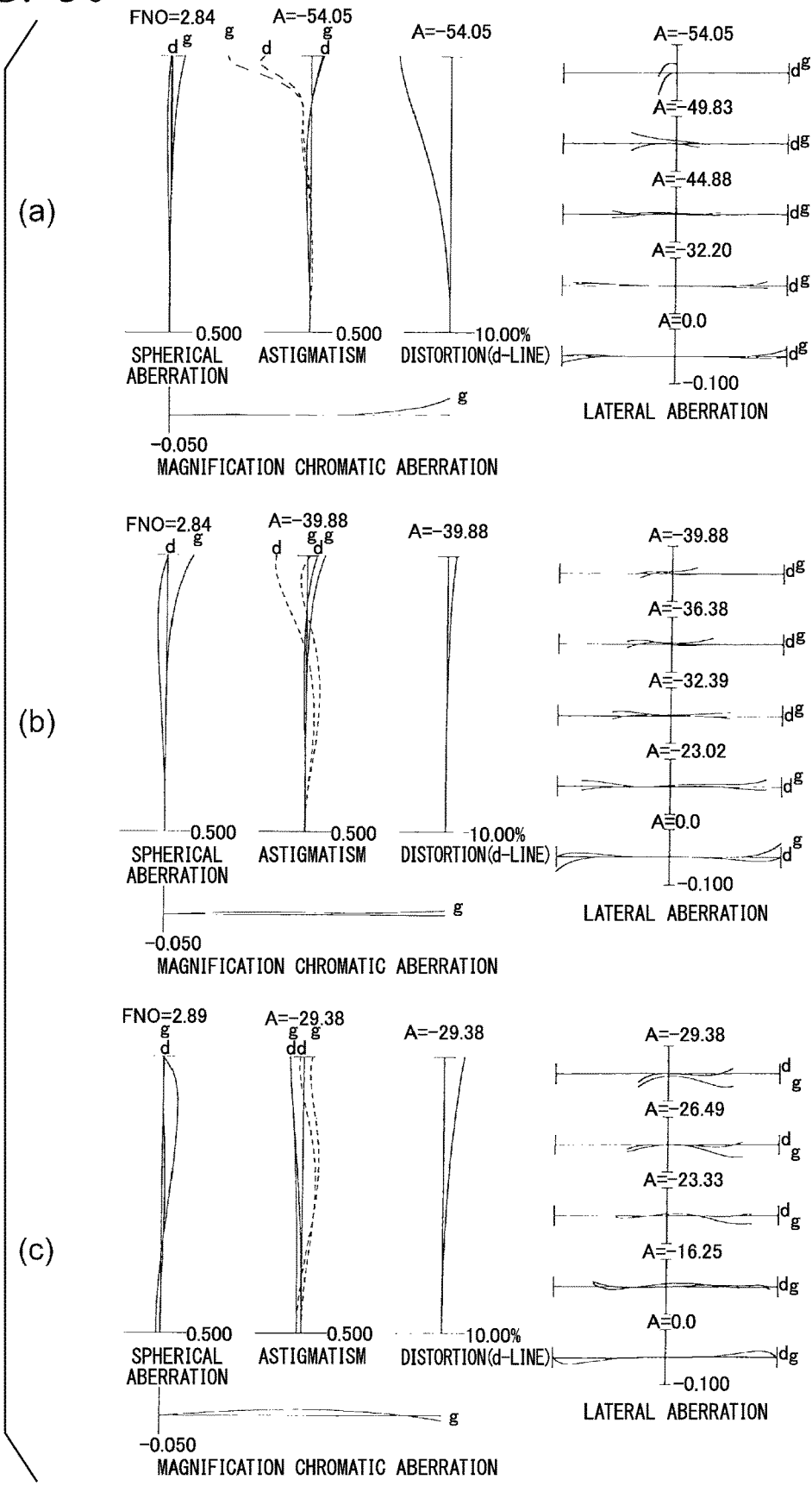
FIG. 30 shows graphs illustrating various aberrations of the variable magnification optical system according to Example 8 upon focusing on an object at infinity, wherein parts (a), (b), and (c) are in the wide-angle end state, the intermediate focal length state, and the telephoto end state, respectively.
Figure 31:
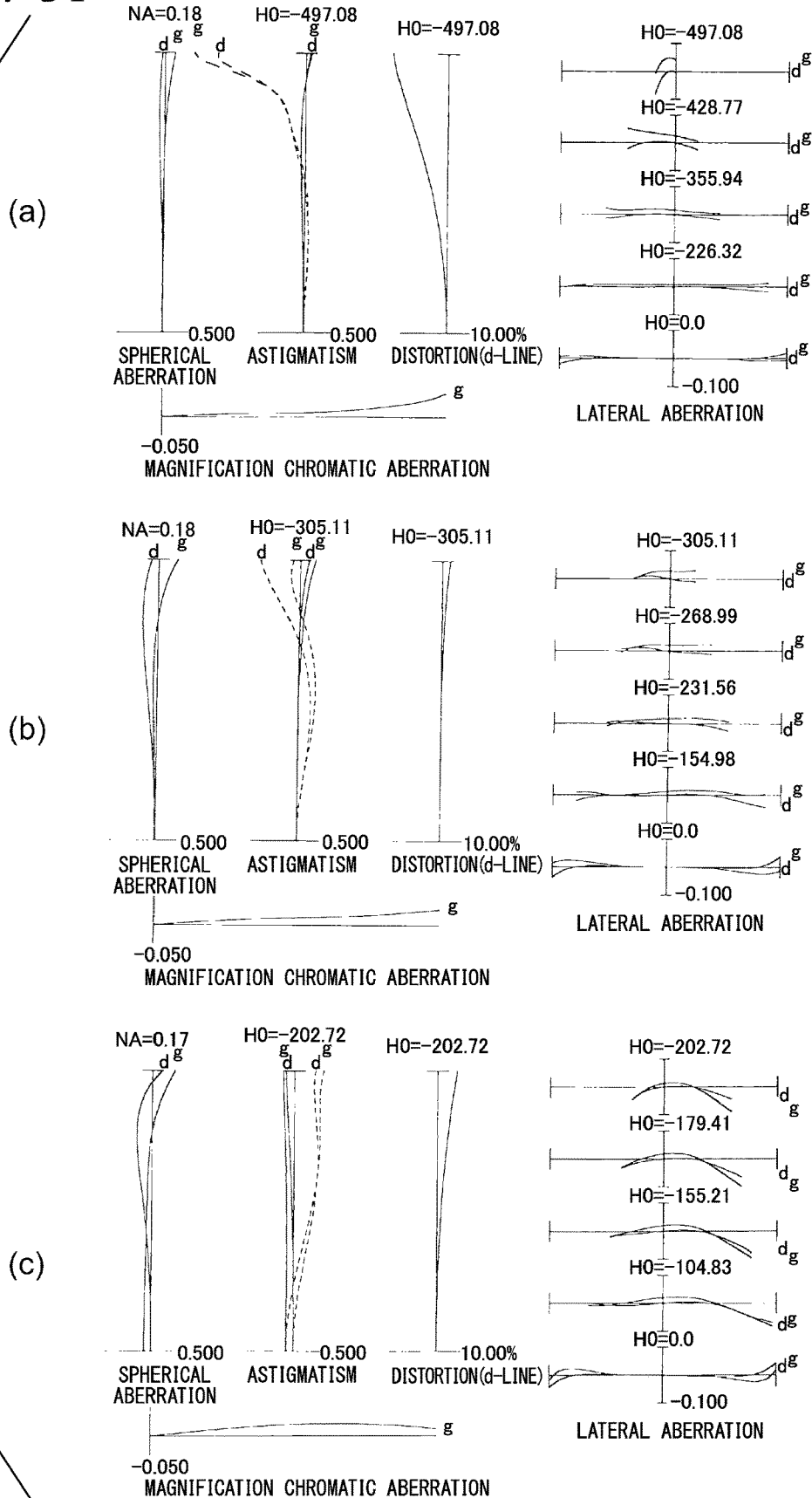
FIG. 31 shows graphs illustrating various aberrations of the variable magnification optical system according to Example 8 upon focusing on an object at a close point, wherein parts (a), (b), and (c) are in the wide-angle end state, the intermediate focal length state, and the telephoto end state, respectively.

FIG. 30 shows graphs illustrating various aberrations (spherical aberration, astigmatism, distortion, magnification chromatic aberration, and lateral aberration) upon focusing on an object at infinity, of the variable magnification optical system ZL3 according to Example 8, in which part (a) illustrates the wide-angle end state, part (b) illustrates the intermediate focal length state, and part (c) illustrates the telephoto end state. FIG. 31 shows graphs illustrating various aberrations (spherical aberration, astigmatism, distortion, magnification chromatic aberration, and lateral aberration) upon focusing on an object at a close point, of the variable magnification optical system ZL3 according to Example 8, in which part (a) illustrates the wide-angle end state, part (b) illustrates the intermediate focal length state, and part (c) illustrates the telephoto end state. FIG. 32 shows graphs illustrating lateral aberration of the variable magnification optical system ZL3 according to Example 8 when image blur correction is performed upon focusing on an object at infinity, in which part (a) illustrates the wide-angle end state, part (b) illustrates the intermediate focal length state, and part (c) illustrates the telephoto end state.

It can be understood from FIGS. 30 to 32 that the variable magnification optical system ZL3 according to Example 8 has a satisfactory optical performance such that various aberrations are satisfactorily corrected in states ranging from the wide-angle end state to the telephoto end state and from the focusing-on-infinity state to the focusing-on-close-point state. Moreover, it can be understood that the variable magnification optical system ZL3 has an excellent imaging performance upon image blur correction.

According to the above-described examples, it is possible to implement a variable magnification optical system which has a bright F-value of approximately F2.8 and such a wide angle of view that the half-angle of view is approximately 50° or more, and in which various aberrations are corrected satisfactorily.

While the present invention has been described by assigning reference symbols to elements of the embodiment for better understanding of the present invention, the aspect of the present invention is not limited to this. The following content can be appropriately employed within a range where the optical performance of the variable magnification optical system is not diminished.

Although the numbered examples of a six-group configuration have been illustrated as numbered examples of the variable magnification optical system ZL, the present invention is not limited to this and can be applied to other group configurations (for example, a seven-group configuration or the like). Specifically, a configuration in which a lens or a lens group is added to the side closest to the object side and a configuration in which a lens or a lens group is added to the side closest to the image side may be employed. The first lens group G1 may be divided into a plurality of lens groups, and the respective lens groups may be moved along different trajectories upon varying magnification or one of them may be fixed. Moreover, as described above, the fourth lens group G4 may have a negative refractive power or a positive refractive power. A lens group refers to a portion having at least one lens isolated by air space which changes upon varying magnification or focusing.

In the variable magnification optical system ZL, a portion of a lens group, an entire lens group, or a plurality of lens groups may be moved in the optical axis direction as a focusing lens group in order to perform focusing from an object at infinity to an object at a close distance. Moreover, such a focusing lens group can be applied to autofocus and is also suitable for driving based on an autofocus motor (for example, an ultrasonic motor, a step motor, a voice coil motor, or the like). As described above, although it is most preferable that entire the second lens group G2 be configured as a focusing lens group, a portion of second lens group G2 may be configured as a focusing lens group. At least a portion of the fifth lens group G5 may be used as a focusing lens group. Moreover, although the focusing lens group may include one single lens and one cemented lens described above, the number of lenses is not particularly limited and the focusing lens group may include one or more lens components.

In the variable magnification optical system ZL, an entire arbitrary lens group or a partial lens group may be moved so as to have a component in the direction orthogonal to the optical axis or may be rotated (oscillated) in an in-plane direction including the optical axis so as to function as a vibration-reduction lens group that corrects image blur occurring due to camera shake or the like. Particularly, although it is most preferable that the entire fifth lens group G5 be configured as a vibration-reduction lens group, a portion of the fifth lens group G5 may be configured as a vibration-reduction lens group. Moreover, at least a portion of the second lens group G2 or at least a portion of the third lens group G3 may be used as a vibration-reduction lens group.

In the variable magnification optical system ZL, the lens surface may be formed as a spherical surface or a flat surface and may be formed as an aspherical surface. When the lens surface is a spherical surface or a flat surface, it is possible to facilitate lens processing, assembly, and adjustment and to prevent deterioration of optical performance resulting from errors in the processing, assembly and adjustment. Moreover, deterioration of the rendering performance is little even when the image plane is shifted. When the lens surface is an aspherical surface, the aspherical surface may be an aspherical surface obtained by grinding a glass-molded aspherical surface obtained by molding glass into an aspherical surface, or a composite aspherical surface obtained by forming a resin on the surface of glass into an aspherical shape. Moreover, the lens surface may be a diffraction surface and may be a refractive index distributed lens (a GRIN lens) or a plastic lens.

In the variable magnification optical system ZL, it is preferable that the aperture stop S be disposed in the fourth lens group G4 so as to be integrated with the fourth lens group G4 particularly. However, the aperture stop S may be configured so as to be movable separately from the fourth lens group G4. In addition, the aperture stop S may be arranged in the fifth lens group G5. Moreover, the role of the aperture stop may be substituted by the frame of a lens without providing a separate member as the aperture stop.

In the variable magnification optical system ZL, each lens surface may be coated with an anti-reflection film which has high transmittance in a wide wavelength region in order to decrease flare and ghosting and achieve satisfactory optical performance with high contrast. The type of the anti-reflection film may be selected appropriately. Moreover, the number of anti-reflection films and the position thereof may be selected appropriately. In Examples 6, 7, and 8 described above, it is preferable that any one of the image-side surface of the lens L11, the object-side surface of the lens L12, the image-side surface of the lens L12, the object-side surface of the lens L13, the image-side surface of the lens L13, and the object-side surface of the lens L14 of the first lens group G1 or a plurality of surfaces be coated with an anti-reflection film which has high transmittance in a wavelength region.

The variable magnification ratio of the variable magnification optical system ZL may be between approximately 1.5 and 2.5, for example. Moreover, the focal length (a value converted in terms of a 35-mm thick plate) in the wide-angle end state of the variable magnification optical system ZL may be between approximately 15 and 20 mm, for example. Moreover, the F-value in the wide-angle end state of the variable magnification optical system ZL may be between approximately 2.7 and 3.5, for example. Moreover, the F-value in the telephoto end state of the variable magnification optical system ZL may be between approximately 2.7 and 3.5, for example. Furthermore, when the focusing state of the variable magnification optical system ZL changes from the wide-angle end state to the telephoto end state, the F-value may be approximately constant (a variation is equal to or smaller than 10 percent of the F-value in the telephoto end state).

EXPLANATION OF NUMERALS AND CHARACTERS

ZL (ZL1 to ZL3) Variable magnification optical system
G1 First lens group
G2 Second lens group
G3 Third lens group
G4 Fourth lens group
G21 21st lens group
G22 22nd lens group
G41 41st lens group
G42 42nd lens group
G5 Fifth lens group
G6 Sixth lens group
VR Vibration-reduction lens group
S Aperture stop
I Image plane
1 Camera (Optical apparatus)

The invention claimed is:

1. A variable magnification optical system constituted by, in order from an object:
a first lens group having a negative refractive power; a second lens group having a positive refractive power; a third lens group having a positive refractive power; a fourth lens group having a negative refractive power; and a fifth lens group having a positive refractive power, wherein
the system performs varying magnification by changing the distance between the first lens group and the second lens group, the distance between the second lens group and the third lens group, the distance between the third lens group and the fourth lens group, and the distance between the fourth lens group and the fifth lens group,
the first lens group has, in order from an object side, a first negative lens, a second negative lens and a third negative lens,
a lens, which is closest to an image side, of the first lens group is a positive lens,
one lens group among the first to fifth lens groups is immovable in an optical axis direction upon varying magnification, and
the system satisfies the following conditional expression:
0.350<f1/f4<0.750
where
f1: a focal length of the first lens group
f4: a focal length of the fourth lens group.

2. The variable magnification optical system according to claim 1, wherein
the fourth lens group includes four lenses.

3. The variable magnification optical system according to claim 1, wherein
the fourth lens group has a vibration-reduction group arranged to be movable so as to have a movement component in a direction orthogonal to an optical axis, and
the system satisfies the following conditional expression:
0.700<f42/f4<1.700
where
f42: a focal length of the vibration-reduction group
f4: a focal length of the fourth lens group.

4. The variable magnification optical system according to claim 3, wherein
the fourth lens group has an object side group disposed to an object side of the vibration-reduction group, and
the system satisfies the following conditional expression:
−0.400<f4/f41<0.500
where
f4: a focal length of the fourth lens group
f41: a focal length of the object side group.

5. The variable magnification optical system according to claim 4, wherein
the object side group has a negative lens and a positive lens.

6. The variable magnification optical system according to claim 3, wherein
the vibration-reduction group is constituted by a cemented lens including a positive lens and a negative lens.

7. The variable magnification optical system according to claim 1, wherein
a lens surface closest to an image, of the fourth lens group is an aspherical surface, and
the system satisfies the following conditional expression:
1.100<A(T3.5)/A(T4.0)<5.000
where
A(T3.5): an asphericity at a point on the aspherical surface where light corresponding to F-value of 3.5 passes through the aspherical surface in a telephoto end state
A(T4.0): an asphericity at a point on the aspherical surface where light corresponding to F-value of 4.0 passes through the aspherical surface in a telephoto end state.

8. An optical apparatus having the variable magnification optical system of claim 1 mounted thereon.

9. A method for manufacturing a variable magnification optical system, wherein
the variable magnification optical system is constituted by, in order from an object: a first lens group having a negative refractive power; a second lens group having a positive refractive power; a third lens group having a positive refractive power; a fourth lens group having a negative refractive power; and a fifth lens group having a positive refractive power, the system performing varying magnification by changing the distance between the first lens group and the second lens group, the distance between the second lens group and the third lens group, the distance between the third lens group and the fourth lens group, and the distance between the fourth lens group and the fifth lens group, and wherein
the method comprises:
arranging the respective lens groups in a lens barrel such that
the first lens group has, in order from an object side, a first negative lens, a second negative lens and a third negative lens,
a lens, which is closest to an image side, of the first lens group is a positive lens,
one lens group among the first to fifth lens groups is immovable in an optical axis direction upon varying magnification, and
the system satisfies the following conditional expression:
0.350<f1/f4<0 75
where
f1: a focal length of the first lens group
f4: a focal length of the fourth lens group.

10. A variable magnification optical system comprising, in order from an object:
a first lens group having a negative refractive power; a second lens group having a positive refractive power; a third lens group; a fourth lens group; and a fifth lens group having a positive refractive power, wherein
the system performs varying magnification by changing the distance between the first lens group and the second lens group, the distance between the second lens group and the third lens group, the distance between the third lens group and the fourth lens group, and the distance between the fourth lens group and the fifth lens group,
at least a portion of the fourth lens group is configured to be movable so as to have a component in a direction orthogonal to an optical axis, and
the system satisfies the following conditional expressions:
−0.400<(D34T−D34W)/(D23T−D23W)<1.000
−0.400<f4/f3<0.450
where
D34T: an air distance between the third and fourth lens groups in a telephoto end state
D34W: an air distance between the third and fourth lens groups in a wide-angle end state
D23T: an air distance between the second and third lens groups in a telephoto end state
D23W: an air distance between the second and third lens groups in a wide-angle end state
f4: a focal length of the fourth lens group
f3: a focal length of the third lens group.

11. The variable magnification optical system according to claim 10, wherein
the fourth lens group has a negative refractive power.

12. The variable magnification optical system according to claim 10, wherein
the system satisfies the following conditional expression:
0.200<f1/f4<0.900
where
f1: a focal length of the first lens group.

13. The variable magnification optical system according to claim 10, wherein
the third lens group has a negative lens and a positive lens.

14. The variable magnification optical system according to claim 10, wherein
the fourth lens group is constituted by a cemented lens including a positive lens and a negative lens.

15. The variable magnification optical system according to claim 10, wherein
a lens surface closest to an image, of the fourth lens group is an aspherical surface, and
the system satisfies the following conditional expression:
1.100<A(T3.5)/A(T4.0)<5.000
where
A(T3.5): an asphericity at a point on the aspherical surface where light corresponding to F-value of 3.5 passes through the aspherical surface in a telephoto end state
A(T4.0): an asphericity at a point on the aspherical surface where light corresponding to F-value of 4.0 passes through the aspherical surface in a telephoto end state.

16. An optical apparatus having the variable magnification optical system of claim 10 mounted thereon.

17. A method for manufacturing a variable magnification optical system, wherein
the variable magnification optical system comprises, in order from an object: a first lens group having a negative refractive power; a second lens group having a positive refractive power; a third lens group; a fourth lens group; and a fifth lens group having a positive refractive power, the system performing varying magnification by changing the distance between the first lens group and the second lens group, the distance between the second lens group and the third lens group, the distance between the third lens group and the fourth lens group, and the distance between the fourth lens group and the fifth lens group, wherein at least a portion of the fourth lens group is configured to be movable so as to have a component in a direction orthogonal to an optical axis, and wherein the method comprises:

arranging the respective groups in a lens barrel so as to satisfy the following conditional expressions:

−0.400<(D34T−D34W)/(D23T−D23W)<1.000

−0.400<f4/f3<0.450 where

D34T: an air distance between the third and fourth lens groups in a telephoto end state D34W: an air distance between the third and fourth lens groups in a wide-angle end state D23T: an air distance between the second and third lens groups in a telephoto end state D23W: an air distance between the second and third lens groups in a wide-angle end state f4: a focal length of the fourth lens group f3: a focal length of the third lens group.

18. A variable magnification optical system comprising, in order from an object:

a first lens group having a negative refractive power; a second lens group having a positive refractive power; a third lens group having a positive refractive power; a fourth lens group; a fifth lens group having a negative refractive power; and a sixth lens group having a positive refractive power, wherein the system performs varying magnification by changing the distance between the first lens group and the second lens group, the distance between the second lens group and the third lens group, the distance between the third lens group and the fourth lens group, the distance between the fourth lens group and the fifth lens group, and the distance between the fifth lens group and the sixth lens group, at least a portion of any one lens group among the first to sixth lens groups is configured to be movable so as to have a component in a direction orthogonal to an optical axis, and the system satisfies the following conditional expression:

−0.500<f5/f4<0.500 where f5: a focal length of the fifth lens group f4: a focal length of the fourth lens group.

19. The variable magnification optical system according to claim 18, wherein at least a portion of the fifth lens group is configured to be movable so as to have a component in the direction orthogonal to the optical axis in order to correct image blur.

20. The variable magnification optical system according to claim 18, wherein the system satisfies the following conditional expression:

0.300<(−f1)/f6<0.900 where f1: a focal length of the first lens group f6: a focal length of the sixth lens group.

21. The variable magnification optical system according to claim 18, wherein the system satisfies the following conditional expression:

−0.400<f1/f4<0.400 where f1: a focal length of the first lens group f4: a focal length of the fourth lens group.

22. The variable magnification optical system according to claim 18, wherein the fourth lens group has a negative lens and a positive lens.

23. The variable magnification optical system according to claim 18, wherein the fifth lens group is constituted by a cemented lens including a positive lens and a negative lens.

24. The variable magnification optical system according to claim 18, wherein a lens surface closest to an image, of the fourth lens group is an aspherical surface, and the system satisfies the following conditional expression:

1.100<A(T3.5)/A(T4.0)<5.000 where

A(T3.5): an asphericity at a point on the aspherical surface where light corresponding to F-value of 3.5 passes through the aspherical surface in a telephoto end state A(T4.0): an asphericity at a point on the aspherical surface where light corresponding to F-value of 4.0 passes through the aspherical surface in a telephoto end state.

25. The variable magnification optical system according to claim 18, wherein the system satisfies the following conditional expression:

0.500<f2/f3<2.000 where f2: a focal length of the second lens group f3: a focal length of the third lens group.

26. An optical apparatus having the variable magnification optical system of claim 18 mounted thereon.

27. A method for manufacturing a variable magnification optical system, wherein the variable magnification optical system comprises, in order from an object: a first lens group having a negative refractive power; a second lens group having a positive refractive power; a third lens group having a positive refractive power; a fourth lens group; a fifth lens group having a negative refractive power; and a sixth lens group having a positive refractive power, the system performing varying magnification by changing the distance between the first lens group and the second lens group, the distance between the second lens group and the third lens group, the distance between the third lens group and the fourth lens group, the distance between the fourth lens group and the fifth lens group, and the distance between the fifth lens group and the sixth lens group, and wherein the method comprises:

arranging the respective groups in a lens barrel such that at least a portion of any one lens group among the first to sixth lens groups is configured to be movable so as to have a component in a direction orthogonal to an optical axis, and the system satisfies the following conditional expression:

−0.500<f5/f4<0.500 where f5: a focal length of the fifth lens group f4: a focal length of the fourth lens group.

* * * * *